(12) United States Patent
Kawasaki et al.

(10) Patent No.: US 11,160,136 B2
(45) Date of Patent: Oct. 26, 2021

(54) TERMINAL APPARATUS, SESSION MANAGEMENT ENTITY (SME), AND COMMUNICATION CONTROL METHOD

(71) Applicants: SHARP KABUSHIKI KAISHA, Sakai (JP); FG INNOVATION COMPANY LIMITED, Tuen Mun (HK)

(72) Inventors: Yudai Kawasaki, Sakai (JP); Masafumi Aramoto, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/302,627

(22) PCT Filed: May 16, 2017

(86) PCT No.: PCT/JP2017/018371
§ 371 (c)(1),
(2) Date: Nov. 17, 2018

(87) PCT Pub. No.: WO2017/199955
PCT Pub. Date: Nov. 23, 2017

(65) Prior Publication Data
US 2019/0297669 A1    Sep. 26, 2019

(30) Foreign Application Priority Data

May 17, 2016  (JP) .............................. JP2016-098567

(51) Int. Cl.
*H04W 80/10*  (2009.01)
*H04W 76/11*  (2018.01)
(Continued)

(52) U.S. Cl.
CPC ............. *H04W 80/10* (2013.01); *H04L 29/08* (2013.01); *H04L 61/3075* (2013.01);
(Continued)

(58) Field of Classification Search
CPC . H04W 80/10; H04W 8/24; H04W 12/00516; H04W 76/20; H04W 88/06; H04W 76/11; H04L 29/08
See application file for complete search history.

(56) References Cited

U.S. PATENT DOCUMENTS

| | | | |
|---|---|---|---|
| 2009/0180445 A1* | 7/2009 | Ue .......................... | H04W 28/24 370/332 |
| 2014/0078986 A1* | 3/2014 | Kaippallimalil ...... | H04W 76/10 370/329 |

(Continued)

OTHER PUBLICATIONS

"3rd Generation Partnership Project; Technical Specification Group Services and System Aspects; Study on Architecture for Next Generation System (Release 14)", 3GPP TR 23.799 V0.4.0 (Apr. 2016).

*Primary Examiner* — Omer S Mian
(74) *Attorney, Agent, or Firm* — ScienBiziP, P.C.

(57) ABSTRACT

To provide a communication control means for establishing a session between a terminal apparatus and a network in a network-initiated manner and/or a connection control means for supporting service continuity and/or a session establishment control means for supporting service continuity and/or a communication control means for service continuity, and the like. These provide a communication control method for establishing an optimal session for service continuity through which service is continued by switching between sessions for communication, an optimal communication control method for service continuity, and the like.

12 Claims, 23 Drawing Sheets

(51) Int. Cl.
*H04L 29/12* (2006.01)
*H04W 8/08* (2009.01)
*H04W 8/24* (2009.01)
*H04W 88/06* (2009.01)
*H04L 29/08* (2006.01)

(52) U.S. Cl.
CPC ............... *H04W 8/08* (2013.01); *H04W 8/24* (2013.01); *H04W 76/11* (2018.02); *H04W 88/06* (2013.01)

(56) References Cited

U.S. PATENT DOCUMENTS

| | | |
|---|---|---|
| 2015/0195743 A1 | 7/2015 | Sirotkin et al. |
| 2015/0350988 A1 | 12/2015 | Himayat et al. |
| 2016/0073441 A1* | 3/2016 | Faccin ................. H04W 12/06 370/329 |
| 2017/0288972 A1* | 10/2017 | Li ....................... H04L 41/0803 |

* cited by examiner

FIG. 6B

| IMSI |
|---|
| EMM State |
| GUTI |
| ME Identity |
| UE Access Network Capability |
| NW Access Network Capability |
| Network-initiated Session Establishment Capability |

FIG. 6C

| APN in Use (Data Network Identifier) |
|---|
| Assigned Session Type (Assigned PDN Type) |
| IP Address(es) |
| Default Bearer |
| Mobility Type |

FIG. 6D

| EPS Bearer ID |
|---|
| TI |
| TFT |
| Radio Bearer Type |

| User Identity |
| --- |
| APN in Use (Data Network Identifier) |
| EPS Bearer ID |
| Serving Node Information |

| |
|---|
| IMSI |
| MSISDN |
| MM State |
| GUTI |
| ME Identity |
| UE Radio Access Capability |
| UE Network Capability |
| MS Network Capability |
| Access Restriction |
| MME F-TEID |
| SGW F-TEID |
| MME Address |
| eNB Address |
| MME UE S1AP ID |
| eNB UE S1AP ID |
| 5GBS Address |
| 5GBS ID |
| WAG Address |
| WAG ID |
| UE Access Network Capability |
| NW Access Network Capability |
| Network-initiated Session Establishment Capability |

| APN in Use (Data Network Identifier) |
|---|
| Assigned Session Type (PDN Type) |
| IP Address(es) |
| PGW F-TEID |
| SCEF ID |
| Default bearer |
| Mobility Type |

FIG. 13D

| EPS Bearer ID |
|---|
| TI |
| TFT |
| SGW F-TEID |
| PGW F-TEID |
| MME F-TEID |
| eNB/5GBS/WAG Address |
| eNB/5GBS/WAG ID |
| Radio Bearer Type |

FIG. 15B

| IMSI |
| --- |
| ME Identity |
| MSISDN |
| MME F-TIED |
| SGW F-TIED |
| Network-initiated Session Establishment Capability |

FIG. 15C

| APN in Use (Data Network Identifier) |
| --- |
| Assigned Session Type (PDN Type) |
| IP Address(es) |
| SGW F-TEID |
| PGW F-TEID |
| Default Bearer |
| Mobility Type |

FIG. 15D

| EPS Bearer ID |
| --- |
| TFT |
| PGW F-TEID |
| SGW F-TEID |
| MME/eNB/5GBS/WAG address |
| MME/eNB/5GBS/WAG ID |

FIG. 17B

| |
|---|
| IMSI |
| ME Identity |
| MSISDN |
| RAT type |
| Network-initiated Session Establishment Capability |

FIG. 17C

| |
|---|
| APN in Use (Data Network Identifier) |

FIG. 17D

| |
|---|
| Assigned Session Type (PDN Type) |
| IP Address(es) |
| SGW F-TEID |
| PGW F-TEID |
| Default Bearer |
| Mobility Type |

FIG. 17E

| |
|---|
| EPS Bearer ID |
| TFT |
| SGW F-TEID |
| PGW F-TEID |

TERMINAL APPARATUS, SESSION MANAGEMENT ENTITY (SME), AND COMMUNICATION CONTROL METHOD

TECHNICAL FIELD

The present invention relates to a terminal apparatus, a Session Management Entity (SME), and a communication control method. This application claims priority based on JP 2016-98567 filed on May 17, 2016 in Japan, the contents of which are incorporated herein in its entirety by reference.

BACKGROUND ART

The 3rd Generation Partnership Project (3GPP), which undertakes activities for standardizing recent mobile communication systems, discusses System Architecture Enhancement (SAE), which is system architecture of the Long Term Evolution (LTE). 3GPP is in the process of creating specifications for the Evolved Packet System (EPS) as a communication system for realizing an all-IP architecture. Note that a core network constituting EPS is called an Evolved Packet Core (EPC).

In addition, recently, the 3GPP has also been conducting a study on next-generation communication technologies and system architectures of the 5G (5th Generation) mobile communication system, which is a next generation communication system. As a study on a next-generation communication technology, a study on NextGen (Architecture for Next Generation System) has been conducted. In NextGen, technical problems for connecting various terminals to a cellular network are extracted, and solutions are standardized.

For example, optimization and diversification of a communication procedure for supporting a continuous mobile communication service, optimization of a system architecture according to the optimization and diversification of the communication procedure, and the like for various terminals are proposed as requirements.

CITATION LIST

Non Patent Literature

NPL 1: 3rd Generation Partnership Project; Technical Specification Group Services and System Aspects; Study on Architecture for Next Generation System; (Release 14)

SUMMARY OF INVENTION

Technical Problem

In NextGen, a study on optimization of session management in a mobile communication service between a terminal and a network apparatus has been conducted.

More specifically, a study has been conducted to provide a continuous mobile communication service suitable for a terminal and a network apparatus through diversification of a session establishment procedure and granularity of continuity of the mobile communication service.

However, a means for establishing a session, a means for enabling continuity of an optimized mobile communication service, and the like for various terminals and network apparatuses have not been proposed.

The present invention has been made in view of such a circumstance, and an object of the present invention is to provide a means for session establishment, a communication control means for enabling continuity of an optimized mobile communication service, and the like. An object of the present invention is to provide a communication control means for providing mobility suitable for a terminal and a communication path.

Solution to Problem

A terminal apparatus according to the present invention includes: a transmission and/or reception unit configured to receive an attach accept message including at least first identification information and/or second identification information from a core network in an attach procedure, the first identification information being capability information of the core network indicating that service continuity between sessions is supported, the second identification information being information indicating that the service continuity is allowed to be possible to be performed after the attach procedure; and a controller configured to establish a first session associated with a first IP address with a first gateway, wherein the controller establishes a second session associated with a second IP address with a second gateway, and the controller continues communication by switching the first session to the second session.

A Session Management Entity (SME) according to the present invention includes: a transmission and/or reception unit configured to transmit, to a terminal apparatus, an attach accept message including at least first identification information and/or second identification information, in an attach procedure, wherein the first identification information is capability information of a core network indicating that service continuity between sessions is supported, and the second identification information is information indicating that the service continuity is allowed to be possible to be performed after the attach procedure.

A communication control method for a terminal apparatus includes the steps of: receiving an attach accept message including at least first identification information and/or second identification information from a core network in an attach procedure, the first identification information being capability information of the core network indicating that service continuity between sessions is supported, the second identification information being information indicating that the service continuity is allowed to be possible to be performed after the attach procedure; establishing a first session associated with a first IP address with a first gateway; establishing a second session associated with a second IP address with a second gateway; and switching the first session to the second session for communication.

A communication control method for a Session Management Entity (SME) includes the step of: transmitting, to a terminal apparatus, an attach accept message including at least first identification information and/or second identification information, in an attach procedure, wherein the first identification information is capability information of a core network indicating that service continuity between sessions is supported, and the second identification information is information indicating that the service continuity is allowed to be possible to be performed after the attach procedure.

Advantageous Effects of Invention

According to the present invention, it is possible for a terminal to establish a session under the initiative of the network and also to establish connectivity according to continuity of an optimized mobile communication service. Moreover, it is possible for the core network to establish a session under the initiative of the network and also to establish a communication path according to continuity of an optimized mobile communication service.

BRIEF DESCRIPTION OF DRAWINGS

FIGS. 2A and 2B are diagrams illustrating an example of a configuration of a mobile communication network and the like.

FIGS. 3A and 3B are diagrams illustrating an example of a configuration of the mobile communication network and the like.

FIGS. 6B to 6D are diagrams illustrating a storage unit of the UE.

FIG. 12B is a diagram illustrating a storage unit of the MME.

FIGS. 13C and 13D are diagrams illustrating the storage unit of the MME.

FIGS. 15B to 15D are diagrams illustrating a storage unit of the SGW.

FIGS. 17B to 17E are diagrams illustrating a storage unit of the PGW.

DESCRIPTION OF EMBODIMENTS

Hereinafter, a preferred embodiment for carrying out the present invention will be described with reference to the drawings. Note that as an example, the present embodiment describes an embodiment of a mobile communication system to which the present invention is applied.

1. System Overview

Figure 1:
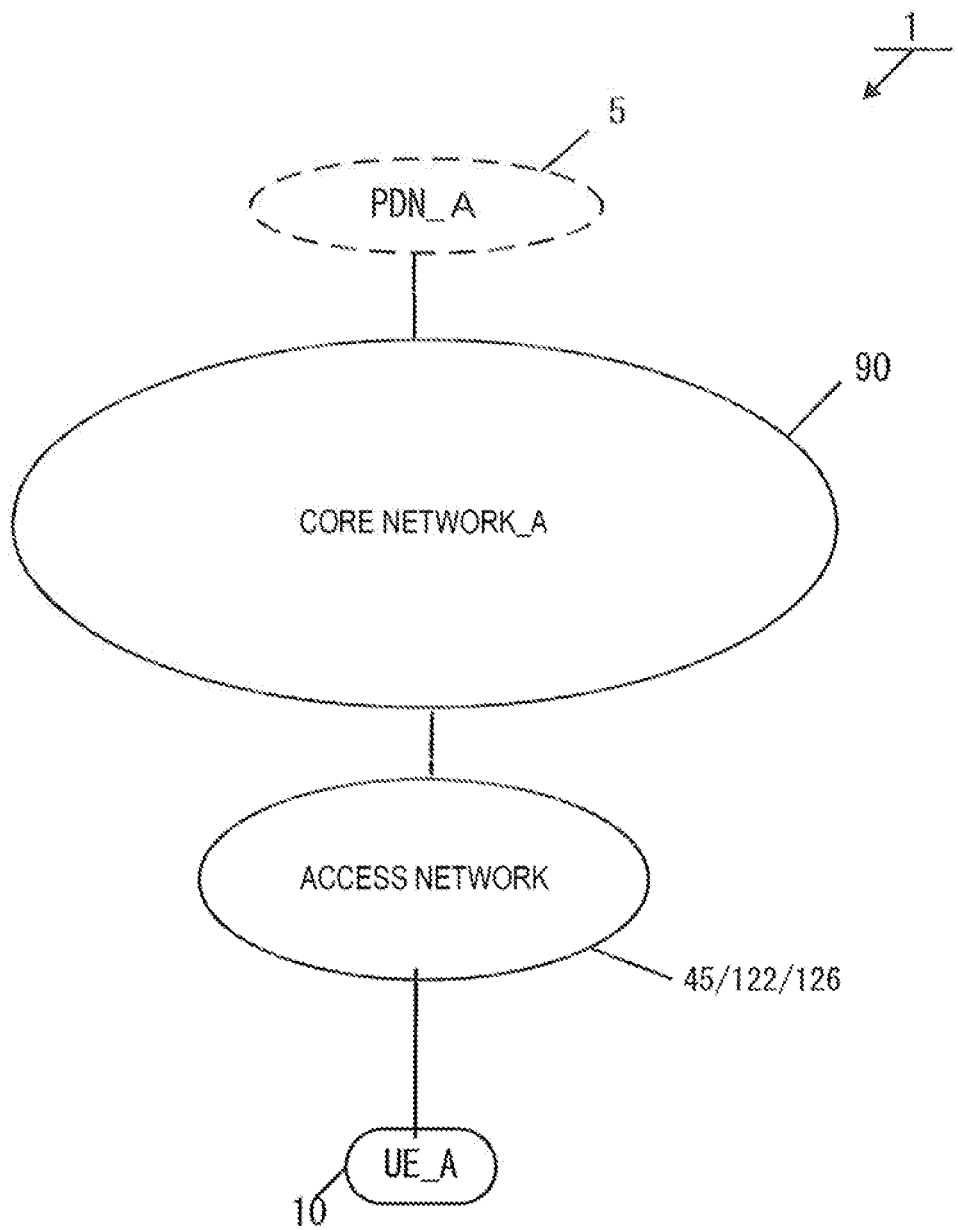
FIG. 1 is a diagram illustrating an overview of a mobile communication system.

FIG. 1 is a diagram illustrating an overview of a mobile communication system according to the present embodiment. As illustrated in FIG. 1, a mobile communication system 1 includes a mobile terminal apparatus UE_A 10, an access network, a core network_A 90, and a PDN_A 5.

Here, the UE_A 10 may be any wirelessly connectable terminal apparatus, and may be a User equipment (UE), a Mobile equipment (ME), or a Mobile Station (MS).

The UE_A 10 may be a Cellular Internet of Things (CIoT) terminal. Note that the CIoT terminal may be an Internet of Things (IoT) terminal connectable with the core network_A 90, and the IoT terminal may include a mobile phone terminal such as a smartphone and may be any of various IT devices such as a personal computer and a sensor device.

Here, the core network_A 90 refers to an IP mobile communication network run by a Mobile Operator.

For example, the core network_A 90 may be a core network for the mobile operator that runs and manages the mobile communication system 1, or may be a core network for a virtual mobile operator such as a Mobile Virtual Network Operator (MVNO).

Alternatively, the core network_A 90 may be a core network for accommodating the CIoT terminal.

Furthermore, the access network may be a 3GPP access network or may be a non-3GPP access network.

The 3GPP access network may be a Long Term Evolution (LTE) Access Network (LTE AN)_A 80, an Evolved Universal Terrestrial Radio Access Network (E-UTRAN), a UMTS Terrestrial Radio Access Network (UTRAN)_A 20, a GSM EDGE Radio Access Network (GERAN)_A 25, or a 5G Radio Access Network (RAN) 120, and the non-3GPP access network may be a WLAN ANb 75, a WLAN ANa 70, or a WLAN ANc 125.

The UE_A 10 connects to the core network_A 90 via the access network.

Additionally, the core network_A 90 is connected to the PDN_A 5. The PDN_A 5 is a Data Network (DN) which provides a communication service to the UE_A 10, and the DN, as a packet data service network, may be configured for each service. A communication terminal is connected to the PDN, the UE_A 10 can transmit and/or receive user data to/from the communication terminal located in the PDN_A 5. Note that the user data may be data transmitted and/or received between the UE_A 10 and an apparatus included in the PDN_A 5. The UE_A 10 transmits the user data to the PDN_A 5 via the core network_A 90. In other words, the UE_A 10 transmits and/or receives the user data to and/or from the core network_A 90, to transmit and/or receive the user data to and/or from the PDN_A 5. More specifically, the UE_A 10 transmits and/or receives the user data to and/or from a gateway device in the core network_A 90, such as a PGW_A 30, and a gateway device such as a SCEF_A 46, to transmit and/or receive the user data to and/or from the PDN_A 5. The communication of user data may be non-IP communication without being limited to IP communication.

Next, examples of a configuration of the core network_A 90 will be described. In the present embodiment, two configuration examples of the core network_A 90 will be described.

Figure 2A:
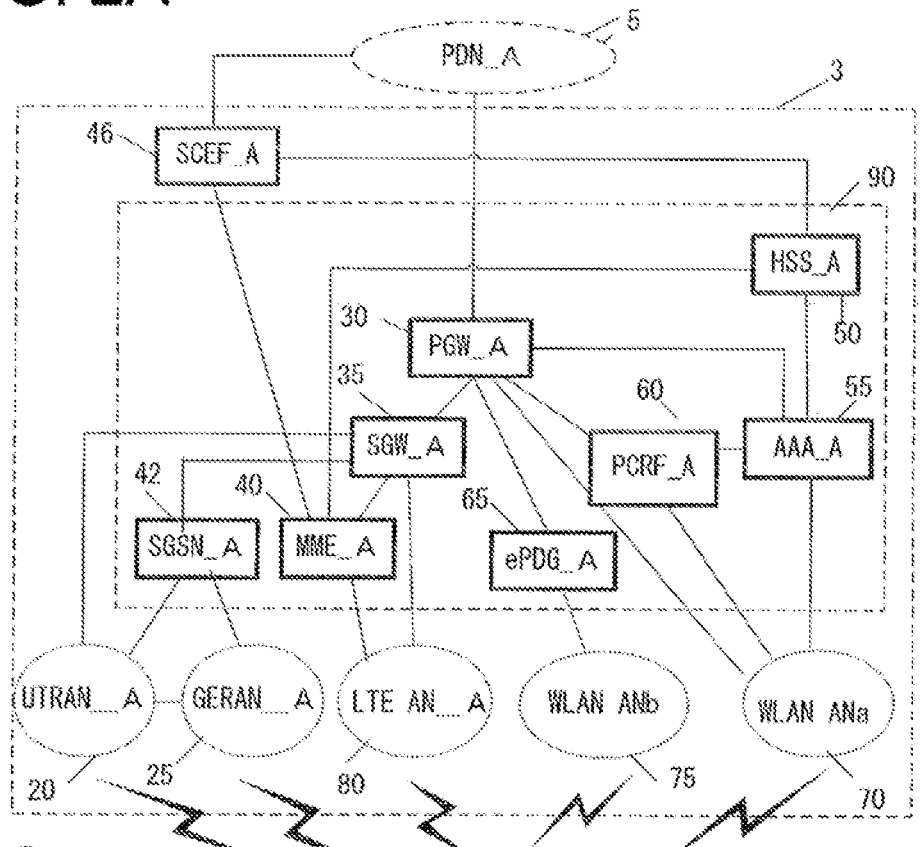
Figure 2B:
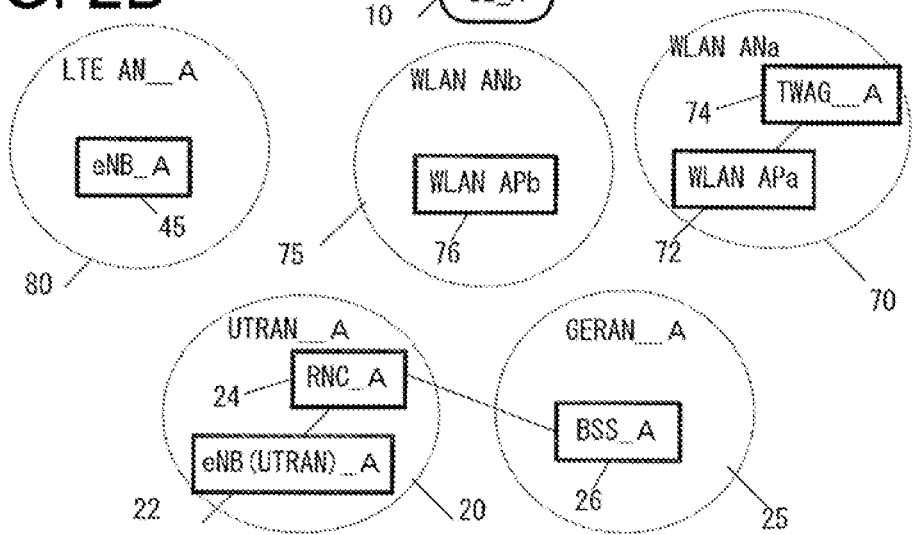

FIGS. 2A and 2B illustrate an example of the configuration of the core network_A 90. The core network_A 90 in FIG. 2A includes a Home Subscriber Server (HSS)_A 50, an Authentication, Authorization, Accounting (AAA)_A 55, a Policy and Charging Rules Function (PCRF)_A 60, a Packet Data Network Gateway (PGW)_A 30, an enhanced Packet Data Gateway (ePDG)_A 65, a Serving Gateway (SGW)_A 35, a Mobility Management Entity (MME)_A 40, a Serving GPRS Support Node (SGSN)_A 42, and a Serving Capability Exposure Function (SCEF)_A 46.

Furthermore, the core network_A 90 is capable of connecting to multiple radio access networks (an LTE AN_A 80, a WLAN ANb 75, a WLAN ANa 70, a UTRAN_A 20, and a GERAN_A 25).

Such a radio access network may be configured by connecting to multiple different access networks, or may be configured by connecting to either one of the access networks. Moreover, the UE_A 10 is capable of wirelessly connecting to the radio access network.

Moreover, a Wireless Local Area Network (LAN) (WLAN) Access Network b (WLAN ANb 75) that connects to the core network via the ePDG_A 65 and a WLAN Access Network a (WLAN ANa 70) that connects to the PGW_A 30, the PCRF_A 60, and the AAA_A 55 can be configured as access networks connectable in a WLAN access system.

Note that each device has a similar configuration to those of the devices of the related art in a mobile communication system using EPS, and thus detailed descriptions thereof will be omitted. Each device will be described briefly hereinafter.

The PGW_A 30 is connected to the PDN_A 5, the SGW_A 35, the ePDG_A 65, the WLAN ANa 70, the PCRF_A 60, and the AAA_A 55, and serves as a relay device configured to transfer user data by functioning as a gateway device between the PDN_A 5 and/or the Data Network (DN) and the core network_A 90. Note that the PGW_A 30 may be a gateway device for IP communication and/or non-IP communication. Further, the PGW_A 30 may have a function of transferring IP communication and/or may have a function of changing between non-IP communication and IP communication. Multiple gateways thus configured may be provided in the core network_A 90. Further, multiple gateways configured to connect the core network_A 90 and a single DN may be provided.

Here, the IP communication is data communication using Internet Protocol (IP) and is data communication performed by transmission and/or reception of an IP packet to which an IP header is attached. Note that a payload part constituting the IP packet may include user data to be transmitted from and/or received by the UE_A 10.

The non-IP communication is data communication not using Internet Protocol (IP) and is data communication performed by transmission and/or reception of data to which no IP header is attached. For example, the non-IP communication may be data communication performed by transmission and/or reception of application data to which no IP packet is attached or may transmit and/or receive user data transmitted from and/or received by the UE_A 10 by attaching another header, such as a MAC header or an Ethernet (trade name) frame header.

The SGW_A 35 is connected to the PGW 30, the MME_A 40, the LTE AN_A 80, the SGSN_A 42, and the UTRAN_A 20, and serves as a relay device configured to transfer user data by functioning as a gateway device between the core network_A 90 and the 3GPP access network (the UTRAN_A 20, the GERAN_A 25, the LTE AN_A 80).

The MME_A 40 is connected to the SGW_A 35, the LTE AN_A 80, the HSS_A 50, and the SCEF_A 46 and serves as a control apparatus configured to perform location information management, which includes mobility management and access control of the UE_A 10 through the LTE AN_A 80. Furthermore, the MME_A 40 may have a function as a session management device configured to manage sessions established by the UE_A 10. Multiple control apparatuses thus configured may be provided in the core network_A 90. For example, a location management device different from the MME_A 40 may be configured. As with the MME_A 40, the location management device different from the MME_A 40 may be connected to the SGW_A 35, the LTE AN_A 80, and the HSS_A 50.

Furthermore, in a case that multiple MMEs are included in the core network_A 90, the MMEs may be connected to each other. With this configuration, the context of the UE_A 10 may be transmitted and/or received between the MMEs.

The MME_A 40 is a management device configured to transmit and/or receive control information associated with mobility management and session management to and from the UE_A 10. In other words, the MME_A 40 may be any control apparatus in a control plane. Moreover, a description has been given of an example in which the MME_A 40 is included in the core network 90. However, in a case that the multiple core networks and network slices are configured, the MME_A 40 may be a management device connected to one or more core networks or may be a management device connected to multiple network slices.

The multiple core networks or network slices may be networks run by a single network operator or may be networks run by different network operators. Here, the network slices may be logical networks configured to classify user data delivered through a service and the like.

The HSS_A 50 is connected to the MME_A 40, the AAA_A 55, and the SCEF_A 46 and serves as a managing node that manages subscriber information. The subscriber information of the HSS_A 50 is referred to during MME_A 40 access control, for example. Moreover, the HSS_A 50 may be connected to the location management device different from the MME_A 40.

The AAA_A 55 is connected to the PGW 30, the HSS_A 50, the PCRF_A 60, and the WLAN ANa 70, and is configured to perform access control for the UE_A 10 connected via the WLAN ANa 70.

The PCRF_A 60 is connected to the PGW_A 30, the WLAN ANa 75, the AAA_A 55, and the PDN_A 5, and is configured to perform QoS management on data delivery. For example, the PCRF_A 60 manages QoS of a communication path between the UE_A 10 and the PDN_A 5.

The ePDG_A 65 is connected to the PGW 30 and the WLAN ANb 75 and is configured to deliver user data by functioning as a gateway device between the core network_A 90 and the WLAN ANb 75.

The SGSN_A 42 is connected to the UTRAN_A 20, the GERAN_A 25, and the SGW_A 35 and is a control apparatus for location management between a 3G/2G access network (UTRAN/GERAN) and the LTE access network (E-UTRAN). In addition, the SGSN_A 42 has functions of: selecting the PGW and the SGW; managing a time zone of the UE; and selecting the MME at the time of handover to the E-UTRAN.

The SCEF_A 46 is connected to the PDN_A 5, the MME_A 40, and the HSS_A 50 and is a relay device configured to transfer user data as a gateway device connecting the PDN_A 5 and/or the Data Network (DN) and the core network_A 90. Note that the SCEF_A 46 may be a gateway device for non-IP communication. Further, the SCEF_A 46 may have a function of changing between non-IP communication and IP communication. Multiple gateways thus configured may be arranged in the core network_A 90. Further, multiple gateways configured to connect the core network_A 90 and a single DN may be arranged.

Additionally, as illustrated in FIG. 2B, each radio access network includes apparatuses to which the UE_A 10 is actually connected (such as a base station apparatus and an access point device), and the like. The apparatuses used in these connections can be thought of as apparatuses adapted to the radio access networks.

In the present embodiment, the LTE AN_A 80 includes the eNB_A 45. The eNB_A 45 is a radio base station to which the UE_A 10 connects in an LTE access system, and the LTE AN_A 80 may include one or multiple radio base stations.

The WLAN ANa 70 includes a WLAN APa 72 and a TWAG_A 74. The WLAN APa 72 is a radio base station (WLAN Access Point (WLAN AP)) to which the UE_A 10 connects in the WLAN access system trusted by the operator running the core network_A 90, and the WLAN ANa 70 may include one or multiple radio base stations. The TWAG_A 74 serves as a gateway device (Trusted WLAN Access Gateway (TWAG) between the core network_A 90 and the WLAN ANa 70. The WLAN APa 72 and the TWAG_A 74 may be configured as a single device.

Even in a case that the operator running the core network_A 90 and the operator running the WLAN ANa 70 are different, such a configuration can be implemented through contracts and agreements between the operators.

Furthermore, the WLAN ANb 75 is configured to include a WLAN APb 76. The WLAN APb 76 is a radio base station to which the UE_A 10 connects in the WLAN access system in a case that no trusting relationship is established with the operator running the core network_A 90, and the WLAN ANb 75 may include one or multiple radio base stations.

In this manner, the WLAN ANb 75 is connected to the core network_A 90 via the ePDG_A 65, which is a device included in the core network_A 90, serving as a gateway. The ePDG_A 65 has a security function for ensuring security.

The UTRAN_A 20 includes a Radio Network Controller (RNC)_A 24 and an eNB (UTRAN)_A 22. The eNB (UTRAN)_A 22 is a radio base station to which the UE_A 10 connects through a UMTS Terrestrial Radio Access (UTRA), and the UTRAN_A 20 may include one or multiple radio base stations. Furthermore, the RNC_A 24 is a controller configured to connect the core network_A 90 and the eNB (UTRAN)_A 22, and the UTRAN_A 20 may include one or multiple RNCs. Moreover, the RNC_A 24 may be connected to one or multiple eNBs (UTRANs)_A 22. In addition, the RNC_A 24 may be connected to a radio base station (Base Station Subsystem (BSS)_A 26) included in the GERAN_A 25.

The GERAN_A 25 includes the BSS_A 26. The BSS_A 26 is a radio base station to which the UE_A 10 connects through GSM (trade name)/EDGE Radio Access (GERA), and the GERAN_A 25 may be constituted of one or multiple radio base station BSSs. Furthermore, the multiple BSSs may be connected to each other. Moreover, the BSS_A 26 may be connected to the RNC_A 24.

Figure 3A:
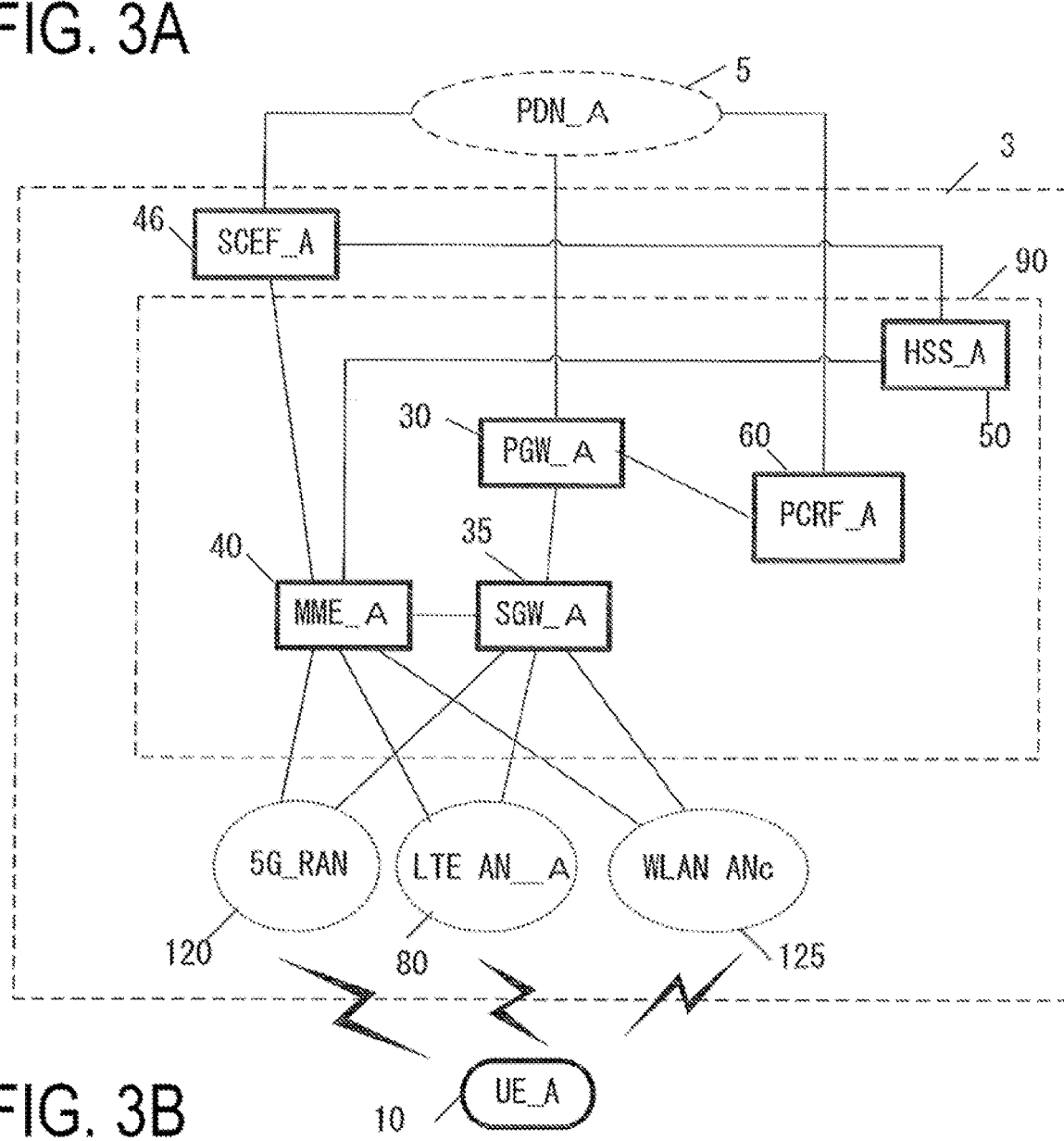

Next, a second example of a configuration of the core network_A 90 will be described. FIG. 3A illustrates an example of the configuration of the core network_A 90. The core network_A 90 in FIG. 2A includes the Home Subscriber Server (HSS)_A 50, the Policy and Charging Rules Function (PCRF)_A 60, the Packet Data Network Gateway (PGW)_A 30, the Serving Gateway (SGW)_A 35, the Mobility Management Entity (MME)_A 40, and the Serving Capability Exposure Function (SCEF)_A 46.

Furthermore, the core network_A 90 can connect to multiple radio access networks (E-UTRAN, the 5G RAN 120, and the WLAN ANc 125).

Such a radio access network may be configured by connecting to multiple different access networks, or may be configured by connecting to either one of the access networks. Moreover, the UE_A 10 is capable of wirelessly connecting to the radio access network.

Moreover, the E-UTRAN and the 5G RAN 120 can be configured as access networks connectable in a 3GPP access system.

Moreover, a WLAN access network c (WLAN ANc 125) connecting to the MME_A 40 and the SGW_A 35 can be configured as an access network connectable in a WLAN access system.

Note that each apparatus has a similar configuration to those of the devices of the related art in a mobile communication system using EPS, and thus detailed descriptions thereof will be omitted. Each device will be described briefly hereinafter.

The SGW_A 35 is connected to the PGW_A 30, the MME_A 40, the E-UTRAN, the 5G RAN 120, and the WLAN ANc 126, and is a relay device configured to transfer user data by functioning as a gateway device between the core network_A 90 and the 3GPP access network (the E-UTRAN and the 5G RAN 120) and/or the non-3GPP access network (WLAN ANc 126).

The MME_A 40 is connected to the SGW_A 35, the E-UTRAN, the 5G RAN 120, the WLAN ANc 126, the HSS_A 50, and the SCEF_A 46, and is an access control apparatus configured to perform location information management and access control of the UE_A 10 via the 3GPP access network and/or the non-3GPP access network. Furthermore, the core network_A 90 may include multiple location management devices. For example, a location management device different from the MME_A 40 may be configured. As with the MME_A 40, the location management device different from the MME_A 40 may be connected to the SGW_A 35, the E-UTRAN, the 5G RAN 120, the WLAN ANc 126, and the HSS_A 50.

The MME_A 40 may be a relay device configured to transfer user data by functioning as a gateway device between the core network_A 90 and the 3GPP access network (the E-UTRAN and the 5G RAN 120) and/or the non-3GPP access network (WLAN ANc 126). Note that the user data transmitted and/or received via the MME_A 40 serving as a gateway device may be small data. Moreover, in a case that multiple MMEs are included in the core network_A 90, the MMEs may be connected to each other. With this configuration, the context of the UE_A 10 may be transmitted and/or received between the MMEs.

Note that the PGW_A 30, the SCEF_A 46, the HSS_A 50, and the PCRF_A 60 may be devices similar to those described in FIGS. 2A and 2B. Therefore, description of the devices will be omitted.

Figure 3B:
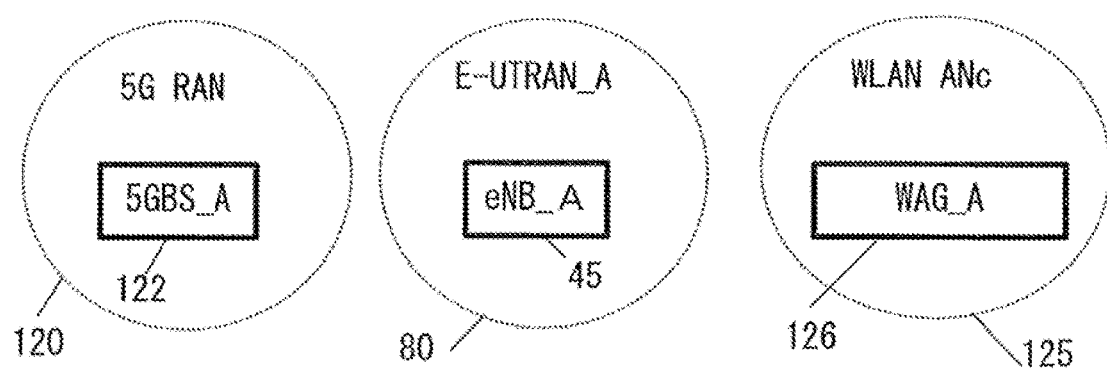

Additionally, as illustrated in FIG. 3B, each radio access network includes apparatuses to which the UE_A 10 is actually connected (such as a base station apparatus and an access point apparatus), and the like. The apparatuses used in these connections can be thought of as apparatuses adapted to the radio access networks.

In the present embodiment, the E-UTRAN includes the eNB_A 45. The eNB_A 45 is a radio base station to which the UE_A 10 connects in the E-UTRAN, and the E-UTRAN may include one or multiple radio base stations.

The 5G RAN 120 is an access network used in 5G mobile communication. The 5G RAN 120 includes a 5GBS_A 122. The 5GBS_A 122 is a radio base station (5G Base Station (5GBS) to which the UE_A 10 connects in the 5G RAN 120, and the 5G RAN 120 may include one or multiple radio base stations.

The WLAN ANc 125 includes a WAG_A 126. The WAG_A 126 is a radio base station (WLAN Access Gateway (WAG)) to which the UE_A 10 connects, and the WLAN ANc 125 may include one or multiple radio base stations. Furthermore, the WAG_A 126 may be a gateway device between the core network_A 90 and the WLAN ANc 125. Moreover, in the WAG_A 126, a function unit as a radio base station and a function unit as a gateway device may be configured by different apparatuses.

A first core network and/or a second core network may be constituted by a system optimized for IoT.

Note that herein, the UE_A 10 being connected to radio access networks refers to the UE_A 10 being connected to a base station apparatus, an access point, or the like included in each of the radio access networks, and data, signals, and the like being transmitted and/or received also pass through those base station apparatuses, access points, or the like.

1.2. Apparatus Configuration

The configuration of each apparatus will be described below.

1.2.1. Configuration of UE

Figure 5:
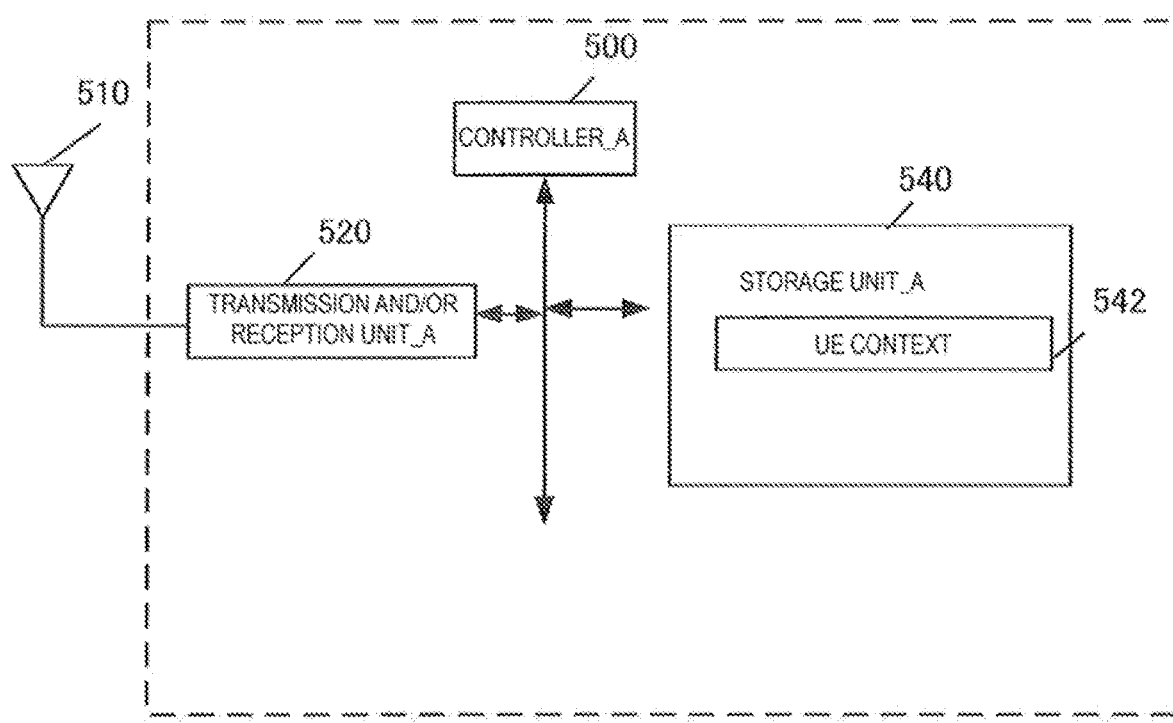
FIG. 5 is a diagram illustrating an apparatus configuration of a UE.

FIG. 5 illustrates an apparatus configuration of the UE_A 10. As illustrated in FIG. 5, the UE_A 10 comprises a transmission and/or reception unit_A 520, a controller_A 500, and a storage unit_A 540. The transmission and/or reception unit_A 520 and the storage unit_A 540 are connected to the controller_A 500 via a bus.

The controller_A 500 is a function unit for controlling the UE_A 10. The controller_A 500 implements various processes by reading out various programs stored in the storage unit_A 540 and performing the programs.

The transmission and/or reception unit_A 520 is a function unit through which the UE_A 10 connects to a base station and/or an access point in an access network to connect to the access network. Furthermore, an external antenna A 510 is connected to the transmission and/or reception unit_A 520.

In other words, the transmission and/or reception unit_A 520 is a function unit through which the UE_A 10 connects to the base station and/or the access point in the access network. Moreover, the transmission and/or reception unit_A 520 is a transmission and/or reception function unit through which the UE_A 10 transmits and/or receives user data and/or control data from the base station and/or the access point in the access network.

The storage unit_A 540 is a function unit for storing programs, data, and the like necessary for each operation of the UE_A 10. The storage_A 540 is constituted of, for example, a semiconductor memory, a Hard Disk Drive (HDD), or the like.

The storage unit_A 540 may store at least identification information and/or control information and/or a flag and/or a parameter included in the control message transmitted and/or received in a communication procedure that will be described later.

As illustrated in FIG. 5, the storage unit_A 540 stores a UE context 542. Hereinafter, information elements stored in the storage_A 540 will be described.

First, FIG. 6B illustrates information elements included in the UE context stored for each UE. As illustrated in FIG. 6B, the UE context stored for each UE includes IMSI, an EMM State, a GUTI, ME Identity, UE Access Network Capability, NW Access Network Capability, and Network-initiated Session Establishment Capability.

The IMSI is permanent identification information of a subscriber.

The EMM State indicates a mobility management state of the UE. For example, the EMM State may be EMM-REGISTERED in which the UE is registered with the network (registered state) or EMM-DEREGISTERD in which the UE is not registered with the network (deregistered state).

GUTI is an abbreviation of "Globally Unique Temporary Identity", and is temporary identification information on the UE. The GUTI includes the identification information about the MME (Globally Unique MME Identifier (GUMMEI)) and the identification information about the UE in a specific MME (M-TMSI).

The ME Identity is an ID of an ME, and may be the IMEI/IMISV, for example.

The UE Access Network Capability is information indicating an access network to which the UE_A 10 is connectable. Here, the access network may be a 3GPP access network or may be a non-3GPP access network. The UE Access Network Capability may include information indicating multiple access networks. In this case, the UE Access Network Capability may further include information indicating priority levels of the access networks together.

The NW Access Network Capability is information indicating an access network to which the core network_A 90 is connectable. The NW Access Network Capability may include information indicating multiple access networks. In this case, the NW Access Network Capability may further include information indicating priority levels of the access networks.

The Network-initiated Session Establishment Capability is information indicating whether a network-initiated session establishment procedure can be performed. The Network-initiated Session Establishment Capability may be further classified into UE Network-initiated Session Establishment Capability indicating that the UE_A 10 allows the network-initiated session establishment procedure and NW Network-initiated Session Establishment Capability indicating that the core network_A 90 allows the network-initiated session establishment procedure.

Next, the UE context for each Packet Data Unit (PDU) session stored for each PDU session is illustrated in FIG. 6C. As illustrated in FIG. 6C, the UE context for each PDU session includes APN in Use (Data Network Identifier), an Assigned Session Type (Assigned PDN Type), an IP Address, a Default Bearer, and a Mobility Type.

Note that the PDU session is a communication path established in order for the UE_A 10 and the core network_A 90 and/or the data network to transmit and/or receive user data. More specifically, the PDU session is a communication path for transmitting and/or receiving a PDU. The PDU session may be a session established between the UE_A 10 and the core network_A 90 and/or the Data Network (DN) or may be a logical communication path constituted by a transfer path(s), such as one or multiple bearers, between apparatuses in the mobile communication system 1.

More specifically, the PDU session may be a connection established by the UE_A 10 between the UE_A 10 and a gateway connecting the core network_A 90 and the DN. Furthermore, the DN may be a Packet Data Network (PDN). Hence, the PDU session may be a connection such as a PDN connection established between the UE_A 10 and the PGW_A 30. A device, such as an application server, provided between the UE_A 10 and the DN can perform transmission and/or reception of user data by using the PDU session. In other words, the PDU session can transfer user data transmitted and/or received by the device, such as an application server, provided between the UE_A 10 and the DN.

Moreover, the Access Point Name (APN) may be identification information for identifying the core network_A 90 or an external network, such as a data network. Further, the APN can also be used as information for selecting a gateway device, such as the PGW_A 30, that connects the core network A_A 90. Note that the APN may be identification information for identifying such a gateway device or may be identification information for identifying an external network, such as a data network. In a case that multiple gateways that connect the core network_A 90 and the DN are provided, there may be multiple gateways selectable based on the APN. Further, in a case that a single gateway is selected from among such multiple gateway devices, the gateway may be selected by another technique using identification information other than the APN. The APN in Use (Data Network Identifier) is an APN recently utilized. This APN may include identification information about the network and identification information about a default operator. Moreover, the APN in Use (Data Network Identifier) may be information for identifying the data network with which the PDU session is to be established.

The Assigned Session Type (Assigned PDN Type) is information indicating a PDU session type. The PDU session type may be of IP type or non-IP type. Moreover, in a case that the PDU session type is of IP type, the Assigned Session Type may further include information indicating the PDN type assigned by the network. Note that the PDN type may be of IPv4 type, IPv6 type, or IPv4v6 type.

The IP Address is an IP address allocated to the UE. The IP address may be an IPv4 address, an IPv6 address, or an IPv6 prefix. Note that, in a case that the Assigned Session Type (Assigned PDN Type) indicates non-IP, the Assigned Session Type may not necessarily include any IP Address element.

The Default Bearer is information acquired from the core network_A 90 at the time of establishing a PDU session and is EPS bearer identification information for identifying a default bearer associated with the PDU session.

Note that the EPS bearer may be a logical communication path established between the UE_A 10 and the PGW_A 30. Also in this case, the EPS bearer may include a Radio Bearer (RB) established between the UE_A 10 and a base station and/or an access point in the access network. Further, the RB and the EPS bearer may be associated with each other in a one-to-one correspondence. Hence, identification information of the RB may be associated with identification information of the EPS bearer in a one-to-one correspondence or may be the same as the identification information of the EPS bearer. The RB may be a Signalling Radio Bearer (SRB) or a Data Radio Bearer (DRB).

The Mobility Type is information indicating the granularity of mobility. Further, the Mobility Type may be information indicating the type of service continuity.

FIG. 6D illustrates the UE context for each bearer stored in the storage unit of the UE. As illustrated in FIG. 6D, the UE context for each bearer includes an EPS Bearer ID, a TI, a TFT, and a Radio Bearer Type.

The UE context for each bearer may include information for identifying a communication path to be an efficient path.

The EPS Bearer ID is identification information of the EPS bearer. The EPS Bearer ID may be identification information for identifying an SRB and/or a CRB or identification information for identifying a DRB.

The TI is an abbreviation of a "Transaction Identifier", and is identification information identifying a bidirectional message flow (Transaction).

The TFT is an abbreviation of a "Traffic Flow Template", and indicates all packet filters associated with the EPS bearer. In other words, the TFT is information for identifying part of user data to be transmitted and/or received, and the UE_A 10 transmits and/or receives the user data identified by the TFT by using the EPS bearer associated with the TFT. Stated further differently, the UE_A 10 transmits and/or receives the user data identified by the TFT by using the RB associated with the TFT.

The TFT may associates user data, such as application data, to be transmitted and/or received with an appropriate transfer path or may be identification information for identifying application data.

The UE_A 10 may transmit and/or receive user data that is not identifiable based on the TFT, by using a default bearer.

The UE_A 10 may store in advance the TFT in association with a default bearer.

The Radio Bearer Type is information indicating a bearer type. The information indicating the bearer type may be a DRB or a SRB.

1.2.2. Configuration of eNB

Figure 7:
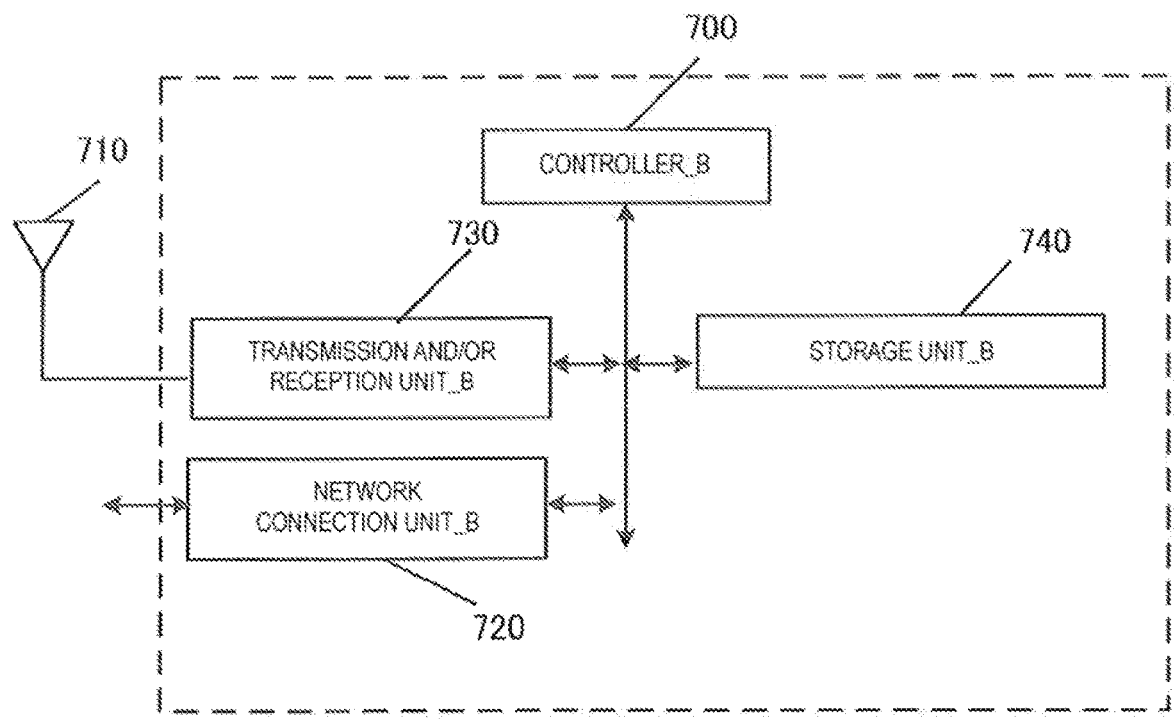
FIG. 7 is a diagram illustrating an apparatus configuration of an eNB.

The configuration of the eNB_A 45 will be described below. FIG. 7 illustrates an apparatus configuration of the eNB_A 45. As illustrated in FIG. 7, the eNB_A 45 comprises a network connection unit_B 720, a transmission and/or reception unit_B 730, a controller_B 700, and a storage unit_B 740. The network connection unit_B 720, the transmission and/or reception unit_B 730, and the storage unit_B 740 are connected to the controller_B 700 via a bus.

The controller_B 700 is a function unit for controlling the eNB_A 45. The controller_B 700 implements various processes by reading out and performing various programs stored in the storage unit_B 740.

The network connection unit_B 720 is a function unit through which the eNB_A 45 connects to the MME_A 40 and/or the SGW_A 35. Furthermore, the network connection unit_B 720 is a transmission and/or reception unit through which the eNB_A 45 transmits and/or receives the user data and/or control data to and/or from the MME_A 40 and/or the SGW_A 35.

The transmission and/or reception unit_B 730 is a function unit through which the eNB_A 45 connects to the UE_A 10. Furthermore, the transmission and/or reception unit_B 730 is a transmission and/or reception function unit through which the eNB_A 45 transmits and/or receives user data and/or control data to and/or from the UE_A 10. Furthermore, an external antenna_B 710 is connected to the transmission and/or reception unit_B 730.

The storage unit_B 740 is a function unit for storing programs, data, and the like necessary for each operation of the eNB_A 45. The storage unit_B 740 is constituted of, for example, a semiconductor memory, a Hard Disk Drive (HDD), or the like.

The storage unit_B 740 may store at least the identification information and/or the control information and/or the flag and/or the parameter included in the control message transmitted and/or received in a communication procedure that will be described later.

1.2.3. Configuration of 5GBS

Figure 8A:
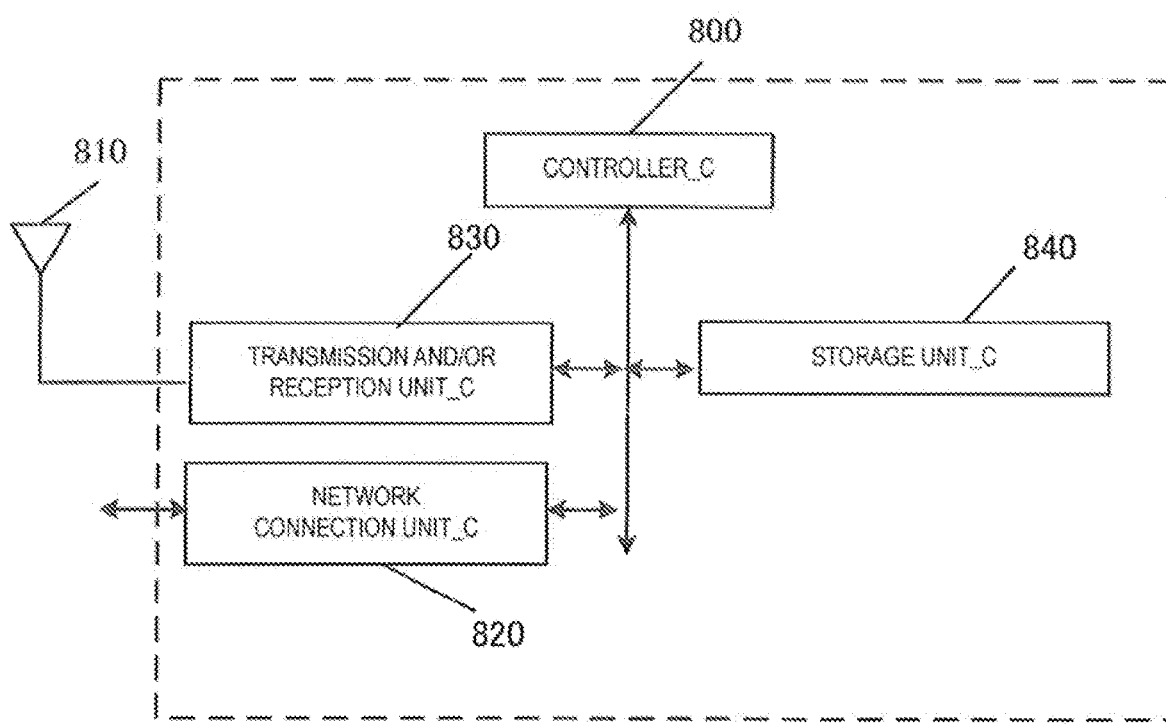
FIG. 8A is a diagram illustrating an apparatus configuration of a 5GBS.

A configuration of the 5GBS_A 122 will be described below. FIG. 8A illustrates an apparatus configuration of the 5GBS_A 122. As illustrated in FIG. 8A, the 5GBS_A 122 comprises a network connection unit_C 820, a transmission and/or reception unit_C 830, a controller_C 800, and a storage unit_C 840. The network connection unit_C 820, the transmission and/or reception unit_C 830, and the storage unit_C 840 are connected to the controller_C 800 via a bus.

The controller_C 800 is a function unit for controlling the 5GBS_A 122. The controller_C 800 implements various processes by reading out and performing various programs stored in the storage unit_C 840.

The network connection unit_C 820 is a function unit through which the 5GBS_A 122 connects to the MME_A 40 and/or the SGW_A 35. Furthermore, the network connection unit_C 820 is a transmission and/or reception unit through which the 5GBS_A 122 transmits and/or receives the user data and/or control data to and/or from the MME_A 40 and/or the SGW_A 35.

The transmission and/or reception unit_C 830 is a function unit through which the 5GBS_A 122 connects to the UE_A 10. Furthermore, the transmission and/or reception unit_C 830 is a transmission and/or reception function unit through which the 5GBS_A 122 transmits and/or receives user data and/or control data to and/or from the UE_A 10. Moreover, an external antenna_C 810 is connected to the transmission and/or reception unit_C 830.

The storage unit_C 840 is a function unit for storing programs, data, and the like necessary for each operation of the 5GBS_A 122. The storage unit_C 840 is constituted of, for example, a semiconductor memory, a Hard Disk Drive (HDD), or the like.

The storage unit_C 840 may store at least the identification information and/or the control information and/or the flag and/or the parameter included in the control message transmitted and/or received in a communication procedure that will be described later.

1.2.4. Configuration of WAG

Figure 9A:
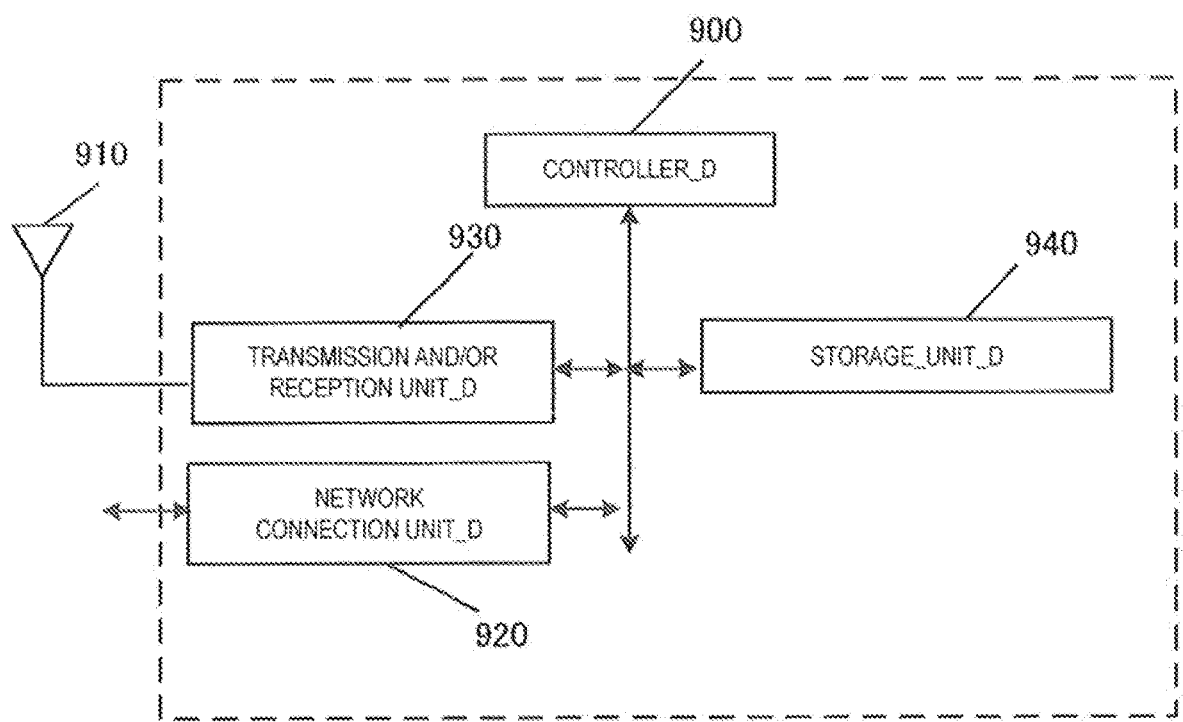
FIG. 9A is a diagram illustrating an apparatus configuration of a WAG.

A configuration of the WAG_A 126 will be described below. FIG. 9A illustrates an apparatus configuration of the WAG_A 126. As illustrated in FIG. 9A, the WAG_A 126 comprises a network connection unit_D 920, a transmission and/or reception unit_D 930, a controller_D 900, and a storage unit_D 940. The network connection unit_D 920, the transmission and/or reception unit_D 930, and the storage unit_D 940 are connected to the controller_D 900 via a bus.

The controller_D 900 is a function unit for controlling the WAG_A 126. The controller_D 900 implements various processes by reading out and performing various programs stored in the storage unit_D 940.

The network connection unit_D 920 is a function unit through which the WAG_A 126 connects to the MME_A 40 and/or the SGW_A 35. Furthermore, the network connection unit_D 920 is a transmission and/or reception unit through which the WAG_A 126 transmits and/or receives user data and/or control data to and/or from the MME_A 40 and/or the SGW_A 35.

The transmission and/or reception unit_D 930 is a function unit through which the WAG_A 126 connects to the UE_A 10. Furthermore, the transmission and/or reception unit_D 930 is a transmission and/or reception function unit through which the WAG_A 126 transmits and/or receives user data and/or control data to and/or from the UE_A 10. Furthermore, an external antenna D 910 is connected to the transmission and/or reception unit_D 930.

The storage unit_D 940 is a function unit for storing programs, data, and the like necessary for each operation of the WAG_A 126. The storage unit_D 940 is constituted of, for example, a semiconductor memory, a Hard Disk Drive (HDD), or the like.

The storage unit_D 940 may store at least the identification information and/or the control information and/or the flag and/or the parameter included in the control message transmitted and/or received in a communication procedure that will be described later.

1.2.5. Configuration of SCEF

Figures 10A, 10B:
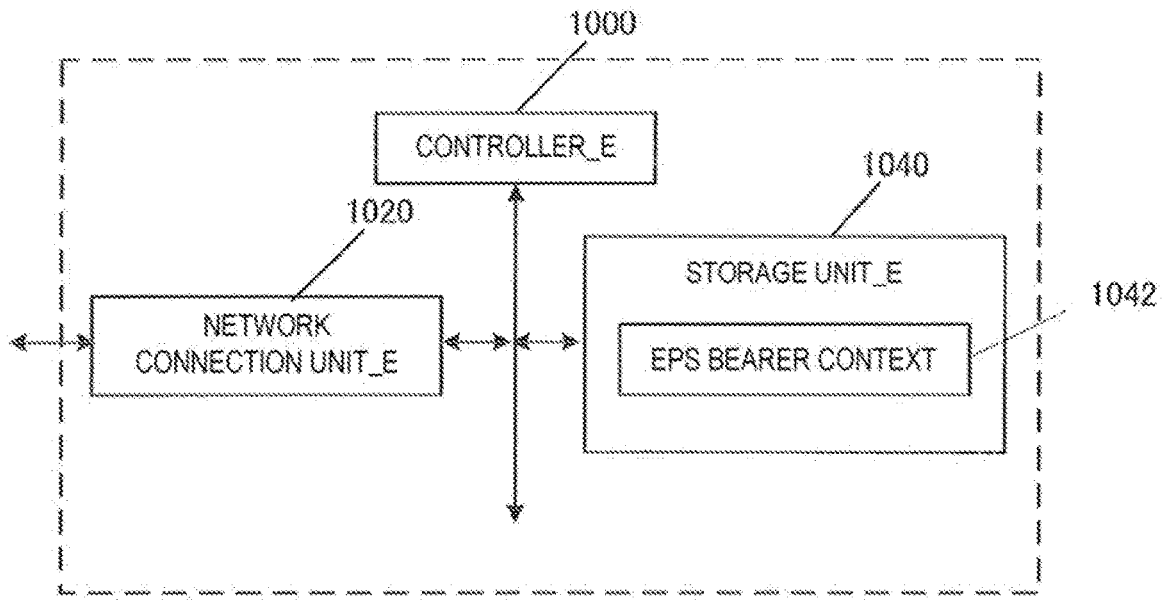
FIGS. 10A and 10B are diagrams illustrating an apparatus configuration of a SCEF.

FIG. 10A illustrates an apparatus configuration of the SCEF_A 46. As illustrated in FIG. 10A, the SCEF_A 46 comprises a transmission and/or reception unit_E 1020, a controller_E 1000, and a storage unit_E 1040. The transmission and/or reception unit_E 1020 and the storage unit_E 1040 are connected to the controller_E 1000 via a bus.

The controller_E 1000 is a function unit for controlling the SCEF_A 46. The controller_E 1000 implements various processes by reading out and performing various programs stored in the storage unit_E 1040.

The transmission and/or reception unit_E 1020 is a function unit through which the SCEF_A 46 connects to the core network A 90. In other words, the transmission and/or reception unit_E 1020 is a function unit through which the SCEF_A 46 connects to the MME_A 40. Furthermore, the transmission and/or reception unit_E 1020 is a transmission and/or reception function unit through which the SCEF_A 46 transmits and/or receives user data and/or control data to and/or from the MME_A 40.

The storage unit_E 1040 is a function unit for storing programs, data, and the like necessary for each operation of the SCEF_A 46. The storage unit_E 1040 is constituted of, for example, a semiconductor memory, a Hard Disk Drive (HDD), or the like.

The storage unit_E 1040 may store at least the identification information and/or the control information and/or the flag and/or the parameter included in the control message transmitted and/or received in a communication procedure that will be described later.

As illustrated in FIG. 10A, the storage unit_E 1040 stores an EPS bearer context 1042. Hereinafter, information elements stored in the storage unit_E 1040 will be described.

FIG. 10B illustrates information elements included in each EPS bearer context. As illustrated in FIG. 10B, the EPS bearer context includes a User Identity, APN in Use (Data Network Identifier), an EPS Bearer ID, and Serving Node Information.

The User Identity is information for identifying a subscriber. The User Identity may be IMSI or may be MSISDN. Furthermore, the User Identity may be identification information other than IMSI and MSISDN.

The APN in Use (Data Network Identifier) is an APN utilized. This APN may include identification information about the network and identification information about a default operator. Moreover, the APN in Use (Data Network Identifier) may be information for identifying the data network with which the PDU session is to be established.

The EPS Bearer ID is identification information of the EPS bearer.

The Serving Node Information is an IP address of the MME_A 40 used in the PDU session.

1.2.6. Configuration of MME

Figure 11A:
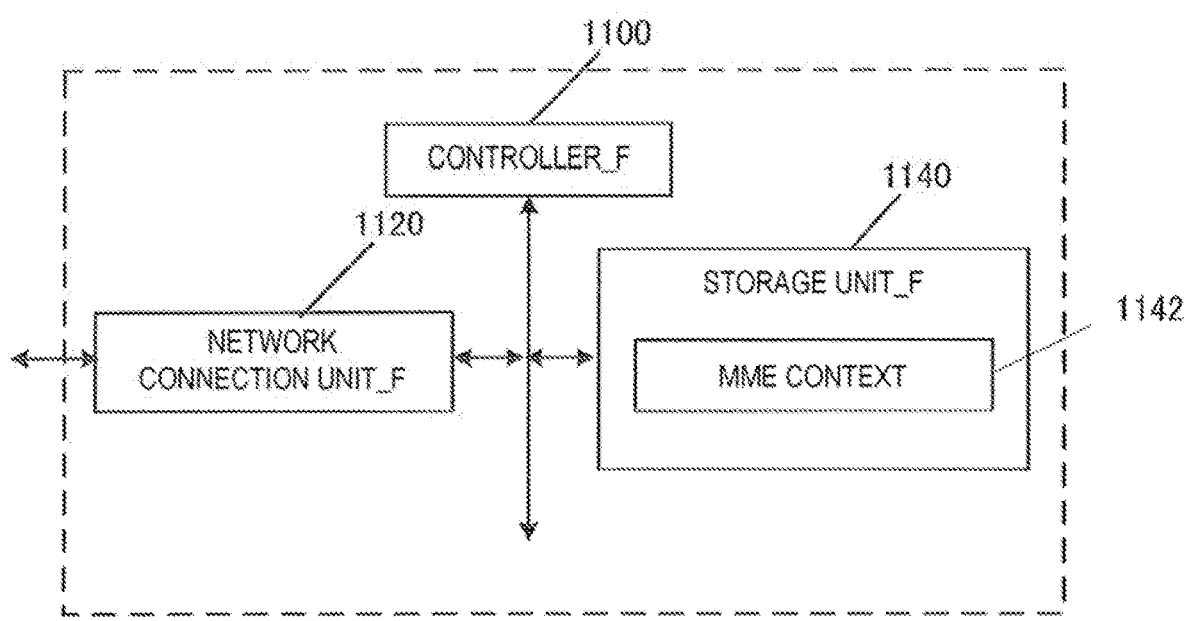
FIG. 11A is a diagram illustrating an apparatus configuration of a MME.

The configuration of the MME_A 40 will be described below. FIG. 11A illustrates an apparatus configuration of the MME_A 40. As illustrated in FIG. 1A, the MME_A 40 comprises a network connection unit_F 1120, a controller_F 1100, and a storage unit_F 1140. The network connection unit_F 1120 and the storage unit_F 1140 are connected to the controller_F 1100 via a bus.

The controller_F 1100 is a function unit for controlling the MME_A 40. The controller_F 1100 implements various processes by reading out and performing various programs stored in the storage unit_F 1140.

The network connection unit_F 1120 is a function unit through which the MME_A 40 connects to a base station in the access network and/or an access point in the access network and/or the SCEF_A 46 and/or the HSS_A 50 and/or the SGW_A 35. Furthermore, the network connection unit_F 1120 is a transmission and/or reception unit through which the MME_A 40 transmits and/or receives user data and/or control data to and/or from the base station in the access network, and/or the access point in the access network, and/or the SCEF_A 46, the HSS_A 50, and/or the SGW_A 35.

The storage unit_F 1140 is a function unit for storing programs, data, and the like necessary for each operation of the MME_A 40. The storage unit_F 1140 is constituted of, for example, a semiconductor memory, a Hard Disk Drive (HDD), or the like.

The storage unit_F 1140 may store at least the identification information and/or the control information and/or the flag and/or the parameter included in the control message transmitted and/or received in a communication procedure that will be described later.

As illustrated in FIG. 11A, the storage_F 1140 stores a MME context 1142. Hereinafter, information elements stored in the storage unit_F 1140 will be described.

First, FIG. 12B illustrates information elements included in the UE context stored for each UE. As illustrated in FIG. 12B, the MME context stored for each UE includes IMSI, MSISDN, a MM State, a GUTI, a ME Identity, UE Radio Access Capability, UE Network Capability, MS Network Capability, Access Restriction, MME F-TEID, SGW F-TEID, a MME Address, an eNB Address, a MME UE S1AP ID, an eNB UE S1AP ID, a 5GBS Address, a 5GBS ID, a WAG Address, a WAG ID, UE Access Network Capability, NW Access Network Capability, and Network-initiated Session Establishment Capability.

The MME context for each UE may include information for identifying a communication path to be an efficient path.

The IMSI is permanent identification information of a user. The IMSI is identical to the IMSI stored in the HSS_A 50.

MSISDN represents the phone number of UE. The MSISDN is indicated by the storage unit of the HSS_A 50.

The MM State indicates a Mobility management state of the MME. This management information indicates an ECM-IDLE state in which a connection between the eNB and the core network is released, an ECM-CONNECTED state in which the connection between the eNB and the core network is not released, or an EMM-DEREGISTERED state in which the MME does not store the location information of the UE.

The Globally Unique Temporary Identity (GUTI) is temporary identification information about the UE. The GUTI includes the identification information about the MME (Globally Unique MME Identifier (GUMMEI)) and the identification information about the UE in a specific MME (M-TMSI).

The ME Identity is an ID of the UE, and may be the IMEI/IMISV, for example.

The UE Radio Access Capability is identification information indicating a radio access capability of the UE.

The UE Network Capability includes an algorithm of security supported by the UE and a key derivative function.

The MS Network Capability is information including at least one kind of information necessary for the SGSN to the UE having the GERAN and/or UTRAN function.

The Access Restriction is registration information for access restriction.

The MME F-TEID is information for identifying the MME_A 40. The MME F-TEID may include an IP address of the MME_A 40 or may include a Tunnel Endpoint Identifier (TEID) of the MME_A 40.

The SGW F-TEID is information for identifying the SGW_A 35. The SGW F-TEID may include the IP address of the SGW_A 35 or may include the TEID of the SGW_A 35.

The MME Address is the IP address of the MME_A 40.

The eNB Address is the IP address of the eNB_A 45.

The MME UE S1AP ID is information for identifying the UE in the MME_A 40.

The eNB UE S1AP ID is information for identifying the UE in the eNB_A 45.

The 5GBS Address is the IP address of the 5GBS_A 122.

The 5GBS ID is information for identifying the UE in the 5GBS_A 122.

The WAG Address is the IP address of the WAG_A 126.

The WAG ID is information for identifying the UE in the WAG_A 126.

The UE Access Network Capability is information indicating an access network to which the UE_A 10 is connectable. Here, the access network may be a 3GPP access network or may be a non-3GPP access network. The UE Access Network Capability may include information indicating multiple access networks. In this case, the UE Access Network Capability may further include information indicating priority levels of the access networks together.

The NW Access Network Capability is information indicating an access network to which the core network_A 90 is connectable. The NW Access Network Capability may include information indicating multiple access networks. In this case, the NW Access Network Capability may further include information indicating priority levels of the access networks.

The Network-initiated Session Establishment Capability is information indicating whether a network-initiated session establishment procedure can be performed. The Network-initiated Session Establishment Capability may be further classified into UE Network-initiated Session Establishment Capability indicating that the UE_A 10 allows the network-initiated session establishment procedure and NW Network-initiated Session Establishment Capability indicating that the core network_A 90 allows the network-initiated session establishment procedure.

Next, UE context for each PDU session stored for each PDU session is illustrated in FIG. 13C. As illustrated in FIG. 13C, the MME context for each PDU session includes APN in Use (Data Network Identifier), an Assigned Session Type (Assigned PDN Type), an IP Address, a PGW F-TEID, a SCEF ID, and a Mobility Type.

The APN in Use (Data Network Identifier) is an APN recently utilized. This APN may include identification information about the network and identification information about a default operator. Moreover, the APN in Use (Data Network Identifier) may be information for identifying the data network with which the PDU session is to be established.

The Assigned Session Type (Assigned PDN Type) is information indicating a PDU session type. The PDU session type may be of IP type or non-IP type. Moreover, in a case that the PDU session type is of IP type, the Assigned Session Type may further include information indicating the PDN type assigned by the network. Note that the PDN type may be of IPv4 type, IPv6 type, or IPv4v6 type.

The IP Address is an IP address allocated to the UE. The IP address may be an IPv4 address, an IPv6 address, or an IPv6 prefix. Note that, in a case that the Assigned Session Type (Assigned PDN Type) indicates non-IP, the Assigned Session Type may not necessarily include any IP Address element.

The PGW F-TEID is information for identifying the PGW_A 30. The PGW F-TEID may include an IP address of the PGW_A 30 or may include a TEID of the PGW_A 30.

The SCEF ID is the IP address of the SCEF_A 46 used in the PDU session.

The Default Bearer is information acquired and/or generated at the time of establishing the PDU session and is EPS bearer identification information for identifying the default bearer associated with the PDU session.

The Mobility Type is information indicating the granularity of mobility. Further, the Mobility Type may be information indicating the type of service continuity.

FIG. 13D illustrates the MME context for each bearer stored for each bearer. As illustrated in FIG. 13D, the MME context stored for each bearer includes an EPS Bearer ID, a TI, a TFT, a SGW F-TEID, a PGW F-TEID, a MME F-TEID, an eNB/5GBS/WAG Address, an eNB/5GBS/WAG ID, and a Radio Bearer Type.

The EPS Bearer ID is the identification information for identifying the EPS bearer for a UE connection via the E-UTRAN.

Note that the EPS Bearer ID may be EPS bearer identification information for identifying a dedicated bearer. Hence, the EPS Bearer ID may be identification information for identifying an EPS bearer different from the default bearer.

The TI is an abbreviation of a "Transaction Identifier", and is identification information identifying a bidirectional message flow (Transaction).

The TFT is an abbreviation of a "Traffic Flow Template", and indicates all packet filters associated with the EPS bearer.

The SGW F-TEID is information for identifying the SGW_A 35. The SGW F-TEID may include the IP address of the SGW_A 35 or may include the Tunnel Endpoint Identifier (TEID) of the SGW_A 35.

The PGW F-TEID is information for identifying the PGW_A 30. The PGW F-TEID may include the IP address of the PGW_A 30 or may include the TEID of the PGW_A 30.

The MME F-TEID is information for identifying the MME_A 40. The MME F-TEID may include the IP address of the MME_A 40 or may include a TEID of the MME_A 40.

The eNB/5GBS/WAG Address is an IP address of the eNB_A 45 and/or the 5GBS_A 122 and/or the WAG_A 126.

The eNB/5GBS/WAG ID is information for identifying the UE in the eNB_A 45 and/or the 5GBS_A 122 and/or the WAG_A 126.

The Radio Bearer Type is information indicating a bearer type. The information indicating the bearer type may be a DRB or a SRB.

Here, the information elements included in the MME context illustrated in FIGS. 12B, 13C and 13D may be included and stored in either a MM context 644 or an EPS bearer context.

The Radio Bearer Type is information indicating a bearer type. The information indicating the bearer type may be a DRB or a SRB.

1.2.7. Configuration of SGW

Figure 14A:
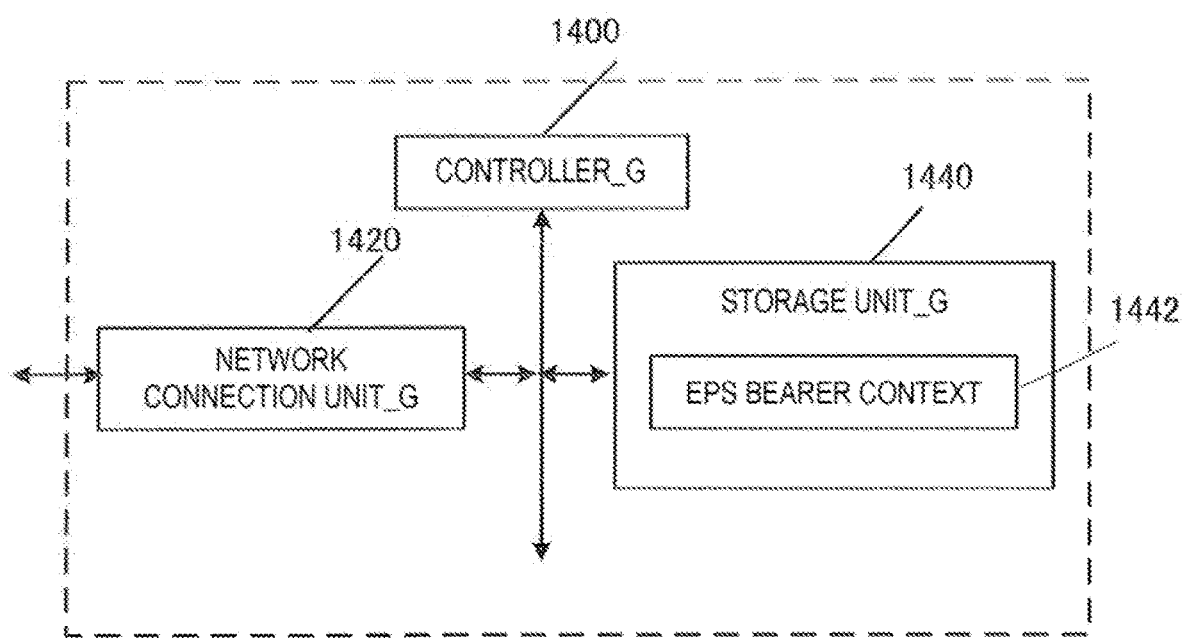
FIG. 14A is a diagram illustrating an apparatus configuration of a SGW.

FIG. 14A illustrates an apparatus configuration of the SGW_A 35. As illustrated in FIG. 14A, the SGW_A 35 comprises a network connection unit_G 1420, a controller_G 1400, and a storage unit_G 1440. The network connection unit_G 1420 and the storage unit_G 1440 are connected to the controller_G 1400 via a bus.

The controller_G 1400 is a function unit for controlling the SGW_A 35. The controller_G 1400 implements various processes by reading out and performing various programs stored in the storage unit_G 1440.

The network connection unit_G 1420 is a function unit through which the SGW_A 35 connects to a base station and/or an access point and/or the MME_A 40 and/or the PGW_A 30 and/or SGSN_A 42 in the access network. Furthermore, the network connection unit_G 1420 is a transmission and/or reception unit through which the SGW_A 35 transmits and/or receives user data and/or control data to and/or from a base station and/or an access point and/or the MME_A 40 and/or the PGW_A 30 and/or SGSN_A 42 in the access network.

The storage unit_G 1440 is a function unit for storing programs, data, and the like necessary for each operation of the SGW_A 35. The storage unit_G 1440 is constituted of, for example, a semiconductor memory, a Hard Disk Drive (HDD), or the like.

The storage unit_G 1440 may store at least the identification information and/or the control information and/or the flag and/or the parameter included in the control message transmitted and/or received in a communication procedure that will be described later.

As illustrated in FIG. 14A, the storage unit_G 1440 stores an EPS bearer context 1442. Note that the EPS bearer context includes an EPS bearer context stored for each UE, an EPS bearer context stored for each PDU session, and an EPS bearer context stored for each bearer.

First, FIG. 15B illustrates information elements of the EPS bearer context stored for each UE. As illustrated in FIG. 15B, the EPS bearer context stored for each UE includes IMSI, a ME Identity, MSISDN, a MME F-TEID, a SGW F-TEID, and Network-initiated Session Establishment Capability.

The IMSI is permanent identification information of a user. The IMSI is identical to the IMSI in the HSS_A 50.

The ME Identity is identification information of the UE, and may be the IMEI/IMISV, for example.

The MSISDN represents a basic phone number of the UE. The MSISDN is indicated by the storage unit of the HSS_A 50.

The MME F-TEID is information for identifying the MME_A 40. The MME F-TEID may include the IP address of the MME_A 40 or may include the TEID of the MME_A 40.

The SGW F-TEID is information for identifying the SGW_A 35. The SGW F-TEID may include the IP address of the SGW_A 35 or may include the TEID of the SGW_A 35.

The Network-initiated Session Establishment Capability is information indicating whether a network-initiated session establishment procedure can be performed. The Network-initiated Session Establishment Capability may be further classified into UE Network-initiated Session Establishment Capability indicating that the UE_A 10 allows the network-initiated session establishment procedure and NW Network-initiated Session Establishment Capability indicating that the core network_A 90 allows the network-initiated session establishment procedure.

Furthermore, the EPS bearer context includes EPS bearer context for each PDU session stored for each PDU session. FIG. 15C illustrates the EPS bearer context for each PDU session. As illustrated in FIG. 15C, the EPS bearer context for each PDU session includes APN in Use (Data Network Identifier), an Assigned Session Type (Assigned PDN Type), an IP Address, a SGW F-TEID, a PGW F-TEID, a Default Bearer, and a Mobility Type.

The APN in Use (Data Network Identifier) is an APN recently utilized. This APN may include identification information about the network and identification information about a default operator. Moreover, the APN in Use (Data Network Identifier) may be information for identifying the data network with which the PDU session is to be established.

The Assigned Session Type (Assigned PDN Type) is information indicating the PDU session type. The PDU session type may be of IP type or non-IP type. Moreover, in a case that the PDU session type is of IP type, the Assigned Session Type may further include information indicating the PDN type assigned by the network. Note that the PDN type may be of IPv4 type, IPv6 type, or IPv4v6 type.

The IP Address is an IP address allocated to the UE. The IP address may be an IPv4 address, an IPv6 address, or an IPv6 prefix. Note that, in a case that the Assigned Session Type (Assigned PDN Type) indicates non-IP, the Assigned Session Type may not necessarily include any IP Address element.

The SGW F-TEID is information for identifying the SGW_A 35. The SGW F-TEID may include the IP address of the SGW_A 35 or may include the TEID of the SGW_A 35.

The PGW F-TEID is information for identifying the PGW_A 30. The PGW F-TEID may include the IP address of the PGW_A 30 or may include the TEID of the PGW_A 30.

The Default Bearer is information acquired from the core network_A 90 at the time of establishment of the PDU session and is EPS bearer identification information for identifying a default bearer associated with the PDU session.

The Mobility Type is information indicating the granularity of mobility. Further, the Mobility Type may be information indicating the type of service continuity.

Furthermore, the EPS bearer context of the SGW includes the EPS bearer context for each bearer. FIG. 15D illustrates the EPS bearer context for each bearer. As illustrated in FIG. 15D, the EPS bearer context stored for each bearer includes an EPS Bearer ID, a TFT, a PGW F-TEID, a SGW F-TEID, a MME/eNB/5GBS/WAG Address, and a MME/eNB/5GBS/WAG ID.

The EPS Bearer ID is the identification information for identifying the EPS bearer for a UE connection via the E-UTRAN.

Note that the EPS Bearer ID may be EPS bearer identification information for identifying the dedicated bearer. Hence, the EPS Bearer ID may be identification information for identifying an EPS bearer different from the default bearer.

The TFT is an abbreviation of a "Traffic Flow Template", and indicates all packet filters associated with the EPS bearer.

The PGW F-TEID is information for identifying the PGW_A 30. The PGW F-TEID may include the IP address of the PGW_A 30 or may include the TEID of the PGW_A 30.

The SGW F-TEID is information for identifying the SGW_A 35. The SGW F-TEID may include the IP address of the SGW_A 35 or may include the TEID of the SGW_A 35.

The MME/eNB/5GBS/WAG Address is the IP address of the MME_A 40 and/or the eNB_A 45 and/or the 5GBS_A 122 and/or the WAG_A 126.

The MME/eNB/5GBS/WAG ID is information for identifying the UE in the MME_A 40 and/or the eNB_A 45 and/or the 5GBS_A 122 and/or the WAG_A 126.

1.2.8. Configuration of PGW

Figure 16A:
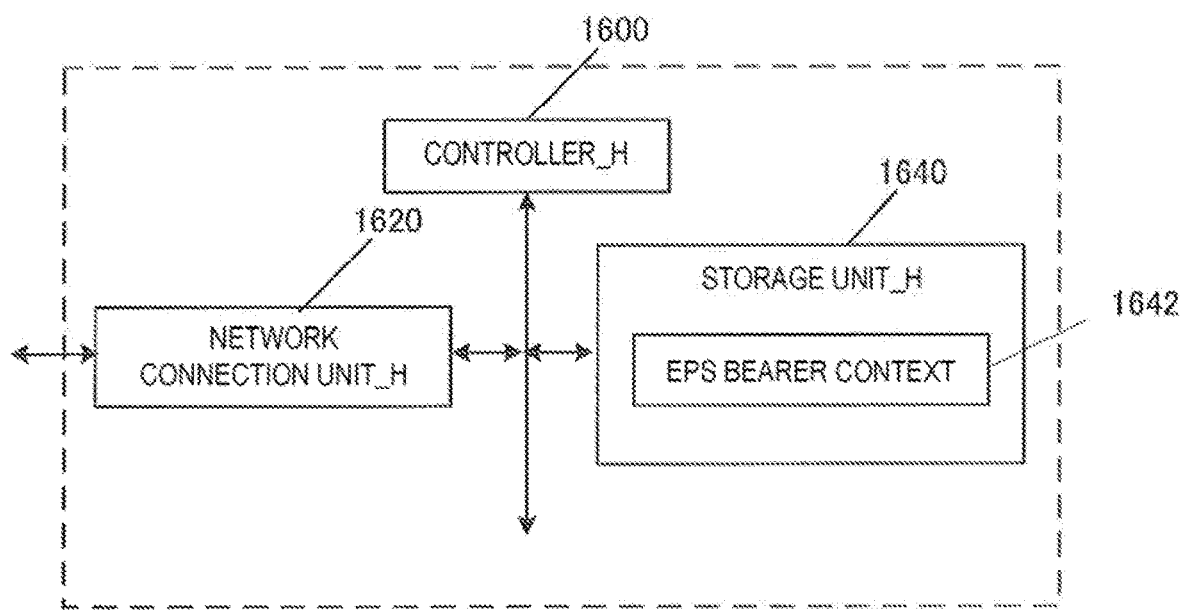
FIG. 16A is a diagram illustrating an apparatus configuration of a PGW.

FIG. 16A illustrates the apparatus configuration of the PGW_A 30. As illustrated in FIG. 16A, the PGW_A 30 comprises a network connection unit_H 1620, a controller_H 1600, and a storage unit_H 1640. The network connection unit_H 1620 and the storage unit_H 1640 are connected to the controller_H 1600 via a bus.

The controller_H 1600 is a function unit for controlling the PGW_A 30. The controller_H 1600 implements various processes by reading out and performing various programs stored in the storage unit_H 1640.

The network connection unit_H 1620 is a function unit through which the PGW_A 30 connects to the SGW_A 35 and/or the PCRF_A 60 and/or the ePDG_A 65 and/or the AAA_A 55 and/or the TWAG_A 74 and/or the PDN_A 5. The network connection unit_H 1620 is a transmission and/or reception unit through which the PGW_A 30 transmits and/or receives user data and/or control data to and/or from the SGW_A 35 and/or the PCRF_A 60 and/or the ePDG_A 65 and/or the AAA_A 55 and/or the TWAG_A 74 and/or the PDN_A 5.

The storage unit_H 1640 is a function unit for storing programs, data, and the like necessary for each operation of the PGW_A 30. The storage unit_H 1640 is constituted of, for example, a semiconductor memory, a Hard Disk Drive (HDD), or the like.

The storage unit_H 1640 may store at least the identification information and/or the control information and/or the flag and/or the parameter included in the control message transmitted and/or received in a communication procedure that will be described later.

As illustrated in FIG. 16A, the storage unit_H 1640 stores an EPS bearer context 1642. Note that the EPS bearer context may be stored in such a manner that an EPS bearer context stored for each UE, an EPS bearer context stored for each APN, an EPS bearer context stored for each PDU session, and an EPS bearer context stored for each bearer are separately stored.

FIG. 17B illustrates information elements included in the EPS bearer context stored for each UE. As illustrated in FIG. 17B, the EPS bearer context stored for each UE includes IMSI, an IMSI-unauthenticated-indicator, an ME Identity, MSISDN, a RAT type, and Network-initiated Session Establishment Capability.

The EPS bearer context for each UE may include information for identifying a communication path to be an efficient path.

The IMSI is identification information to be assigned to a user using the UE.

The IMSI-unauthenticated-indicator is instruction information indicating that this IMSI is not authenticated.

The ME Identity is an ID of the UE, and may be the IMEI/IMISV, for example.

The MSISDN represents a basic phone number of the UE. The MSISDN is indicated by the storage unit of the HSS_A 50.

The RAT type indicates a recent Radio Access Technology (RAT) of the UE. The RAT type may be, for example, the E-UTRA (LTE), the UTRA, or the like, or may be 5G RAT or WLAN.

The Network-initiated Session Establishment Capability is information indicating whether a network-initiated session establishment procedure can be performed. The Network-initiated Session Establishment Capability may be further classified into UE Network-initiated Session Establishment Capability indicating that the UE_A 10 allows the network-initiated session establishment procedure and NW Network-initiated Session Establishment Capability indicating that the core network_A 90 allows the network-initiated session establishment procedure.

Next, FIG. 17C illustrates the EPS bearer context stored for each APN. As illustrated in FIG. 17C, the EPS bearer context stored for each APN of the PGW storage unit includes APN in use. Note that the EPS bearer context stored for each APN may be stored for each Data Network Identifier.

The APN in Use (Data Network Identifier) is an APN recently utilized. This APN may include identification information about the network and identification information about a default operator. Moreover, the APN in Use (Data Network Identifier) may be information for identifying the data network with which the PDU session is to be established.

Furthermore, FIG. 17D illustrates the EPS bearer context for each PDU session stored for each PDU session. As illustrated in FIG. 17D, the EPS bearer context for each PDU session includes an Assigned Session Type (Assigned PDN Type), an IP Address, a SGW F-TEID, a PGW F-TEID, a Default Bearer, and a Mobility Type.

The Assigned Session Type (Assigned PDN Type) is information indicating the PDU session type. The PDU session type may be of IP type or non-IP type. Moreover, in a case that the PDU session type is of IP type, the Assigned Session Type may further include information indicating the PDN type assigned by the network. Note that the PDN type may be of IPv4 type, IPv6 type, or IPv4v6 type.

The IP Address is an IP address allocated to the UE. The IP address may be an IPv4 address, an IPv6 address, or an IPv6 prefix. Note that, in a case that the Assigned Session Type (Assigned PDN Type) indicates non-IP, the Assigned Session Type may not necessarily include any IP Address element.

The SGW F-TEID is information for identifying the SGW_A 35. The SGW F-TEID may include the IP address of the SGW_A 35 or may include the TEID of the SGW_A 35.

The PGW F-TEID is information for identifying the PGW_A 30. The PGW F-TEID may include the IP address of the PGW_A 30 or may include the TEID of the PGW_A 30.

The Default Bearer is information acquired from the core network_A 90 at the time of establishing a PDU session and is EPS bearer identification information for identifying a default bearer associated with the PDU session.

The Mobility Type is information indicating the granularity of mobility. Further, the Mobility Type may be information indicating the type of service continuity.

Furthermore, FIG. 17E illustrates the EPS bearer context stored for each EPS bearer. As illustrated in FIG. 17E, the EPS context includes an EPS Bearer ID, a TFT, a PGW F-TEID, and a SGW F-TEID.

The EPS Bearer ID is the identification information for identifying the EPS bearer for a UE connection via the E-UTRAN.

Note that the EPS Bearer ID may be EPS bearer identification information for identifying the dedicated bearer. Hence, the EPS Bearer ID may be identification information for identifying an EPS bearer different from the default bearer.

The TFT is an abbreviation of a "Traffic Flow Template", and indicates all packet filters associated with the EPS bearer.

The PGW F-TEID is information for identifying the PGW_A 30. The PGW F-TEID may include the IP address of the PGW_A 30 or may include the TEID of the PGW_A 30.

The SGW F-TEID is information for identifying the SGW_A 35. The SGW F-TEID may include the IP address of the SGW_A 35 or may include the TEID of the SGW_A 35.

1.3. Description of Communication Procedure Next, a communication procedure according to the present embodiment will be described with reference to FIG. 18.

Here, before describing the detailed steps of each procedure, in order to avoid redundant descriptions, terminology specific to the present embodiment and primary identification information used in each procedure will be described beforehand.

A single-type PDU session(s) in the present embodiment is one or multiple PDU sessions supporting first Service continuity. Further, single-type PDU sessions in the present embodiment may be further divided into first, second, and third single types for management.

Here, the first Service continuity is Service continuity of establishing, in a state where a first PDU session is established, a second PDU session, and switching communication for which transmission and/or reception has been performed in the first PDU session to the second PDU session and to thereby continue the communication. Furthermore, in the first Service continuity, the first session may be released in a case of switching for the communication. Furthermore, in the first Service continuity, switching at the time of session establishment and disconnection of communication may be performed according to mobility type.

Here, the first PDU session is a first PDU session established first among PDU sessions constituting single-type PDU sessions.

Hence, single-type PDU sessions form a session group including such a first session and a second session. Note that in a transient state where the second session is established and the first session is to be released, multiple single-type PDU sessions may be established.

A first single-type PDU session(s) in the present embodiment is one or multiple PDU sessions supporting first Service continuity.

A second single-type PDU session(s) in the present embodiment is one or multiple PDU sessions supporting first Service continuity. Furthermore, each PDU session of second single-type PDU sessions may be established for a single Data Network (DN).

Furthermore, each PDU session of second single-type PDU sessions may be established in association with a single APN and/or a single TFT and/or a single application (application identification information) and/or a single service (service identification information).

Furthermore, each PDU session of second single-type PDU sessions may be established in a single network slice.

A third single-type PDU session(s) in the present embodiment is one or multiple PDU sessions supporting first Service continuity.

Furthermore, PDU sessions of third single-type PDU sessions may be established for different DNs.

Furthermore, PDU sessions of third single-type PDU sessions may be associated with different APNs.

Furthermore, PDU sessions of third single-type PDU sessions may be established in different network slices.

As described above, in the present embodiment, the PDU session group capable of performing the first Session continuity may be managed as single-type PDU sessions. Furthermore, the single-type PDU sessions may be managed as different single-type PDU sessions according to the above-described first, second, and third single types. Furthermore, in a case that multiple DNs are configured, multiple first single-type PDU sessions may be managed for each DN. Multiple second single-type PDU sessions may be managed for each APN, TFT, or application. Multiple third single-type PDN sessions may be managed for each network slice.

A multi-type PDU session(s) in the present embodiment is one or multiple PDU sessions supporting second Service continuity. Multi-type PDU sessions in the present embodiment may be further divided into first, second, and third multi-types for management.

Here, the second Service continuity is Service continuity of establishing, in a state where a first PDU session is established, a second PDU session, and switching communication for which transmission and/or reception has been performed in the first PDU session to the second PDU session and thereby continuing the communication. Furthermore, in the second Service continuity, the first session may be released in a case of switching for the communication. The second Service continuity is Service continuity in which, in a state where multiple PDU sessions are established, switching between the sessions is performed for communication to thereby continue the communication. Note that, in the second Service continuity, the first PDU session, which is the source of the switching, may be maintained in a case of switching for the communication.

In other words, in the second Service continuity, communication performed in a certain PDU session can be switched from the certain PDU session to another PDU session in a state where multiple PDU sessions are established. Note that, in the second Service continuity, switching at the time of establishing a session and disconnection of communication may be performed according to mobility type.

Here, the first PDU session is a first PDU session established first among PDU sessions constituting single-type PDU sessions. Moreover, the multi-type PDU sessions may include three or more PDU sessions instead of being limited to the first and second PDU sessions.

Note that, in the present embodiment, identification information for identifying each of single-type PDU sessions and information for identifying each of PDU sessions constituting the single-type PDU sessions may be managed separately. The identification information for identifying single-type PDU sessions and information for identifying first PDU session constituting the single-type PDU sessions may be managed using the same identification information, or the identification information of the second PDU session may be used as identification information of the single-type PDU sessions in a case of release of the first PDU session. Furthermore, in a case of release of the first PDU session, identification information for identifying the first PDU session may be used as the identification information of the second PDU session.

A first multi-type PDU session(s) in the present embodiment is one or multiple PDU sessions supporting second Service continuity.

A second multi-type PDU session(s) in the present embodiment is one or multiple PDU sessions supporting second Service continuity.

Furthermore, each PDU session of second multi-type PDU sessions may be established for a single Data Network (DN).

Furthermore, each PDU session of second multi-type PDU sessions may be associated with a single APN and/or a single TFT and/or a single application (application identification information) and/or a single service (service identification information).

Furthermore, each PDU session of second multi-type PDU sessions may be established in a single network slice.

A third multi-type PDU session(s) in the present embodiment is one or multiple PDU sessions supporting second Service continuity.

Furthermore, PDU sessions of third multi-type PDU sessions may be established for different DNs.

Furthermore, PDU sessions of third multi-type PDU sessions may be established in association with different APNs.

Furthermore, PDU sessions of third multi-type PDU sessions may be established in different network slices.

As described above, in the present embodiment, the PDU session group capable of performing the second Session continuity may be managed as multi-type PDU sessions. Furthermore, the multi-type PDU sessions may be managed as different multi-type PDU sessions according to the above-described first, second, and third types. Furthermore, in a case that multiple DNs are configured, multiple first multi-type PDU sessions may be managed for each DN. Multiple second multi-type PDU sessions may be managed for each APN, TFT, or application. Multiple third multi-type PDN sessions may be managed for each network slice.

Note that, in the present embodiment, identification information for identifying each of multi-type PDU sessions and information for identifying each of PDU sessions constituting the single-type PDU sessions may be managed separately. Identification information for identifying the multi-type PDU sessions and identification information for identifying the first PDU session constituting the multi-type PDU session may be managed using the same identification information.

A first state, a second state, and a third state in the present embodiment will be described with reference to FIG. 4. In the example in FIG. 4, the first PDU session is a PDU session established between the UE_A 10 and the PGW_A 30. More specifically, the first PDU session may be a PDU session established between the UE_A 10 and the PGW_A 30 via the access network and the SGW_A 35. Moreover, the first PDU session may be a PDU session established between the UE_A 10 and the PGW_A 30 via the access network, the MME_A 40, and the SGW_A 35.

The second PDU session is a PDU session established between the UE_A 10 and the SCEF_A 46. More specifically, the second PDU session may be a PDU session established between the UE_A 10 and the SCEF_A 46 via the access network and the MME_A 40.

The first state in the present embodiment is a state where the UE_A 10 is registered in the core network A 90. In the first state, the UE_A 10 and/or the MME_A 40 and/or the SGW_A 35 and/or the PGW_A 30 and/or the SCEF_A 46 may, or may not necessarily, have established a PDU session. Note that the first state may be a state where a PDU session has not been established.

The second state in the present embodiment is a state where the UE_A 10 and the core network_A 90 have established the first PDU session. Here, the first session may be established in the attach procedure. In this case, the state for making the attach procedure completed may be the second state, instead of the first state.

The third state in the present embodiment is a state where the UE_A 10 and the core network A 90 have established a second PDU session and also a state where the first or the second Service continuity is completed.

Note that the first or second Service continuity may be performed based on the establishment of the second PDU session or may be performed at any timing after the establishment of the second session.

Furthermore, release of the first PDU session may be performed based on performing of the first or second Service continuity or may be performed at any timing after the first or second Service continuity is performed.

Figure 4:
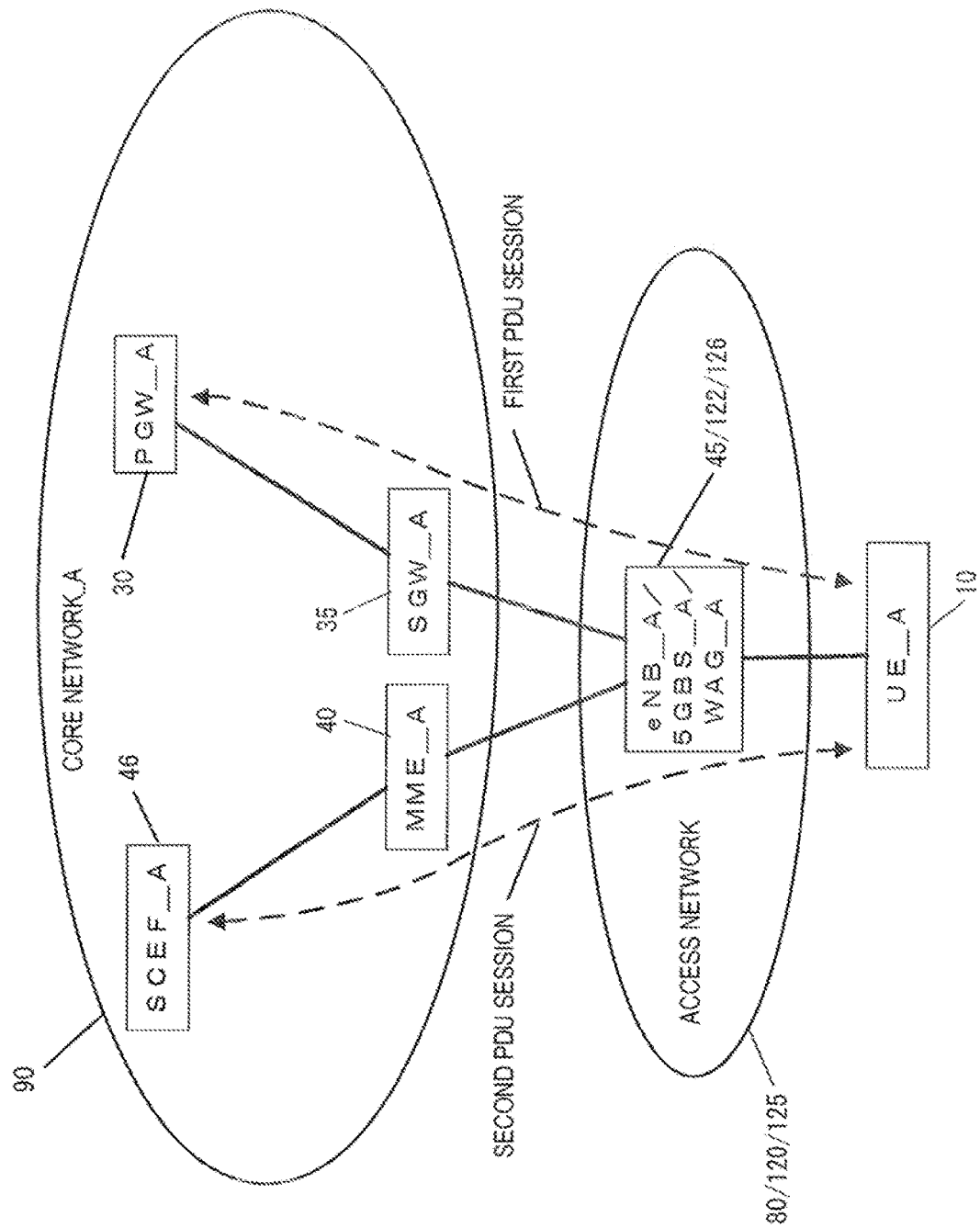
FIG. 4 is a diagram illustrating a PDU session established state.

Here, in the example in FIG. 4, a description has been given by assuming that the first PDU session is a PDU session established between the UE_A 10 and the PGW_A 30 and that the second PDU session is a PDU session established between the UE_A 10 and the SCEF_A 46.

However, the first PDU session and the second PDU session need not be limited to this. The first PDU session may be a PDU session established between the UE_A 10 and the SCEF_A 46, and the second PDU session may be a PDU session established between the UE_A 10 and the PGW_A 30.

Alternatively, the first PDU session may be a PDU session established between the UE_A 10 and the SCEF_A 46, and the second PDU session may be a PDU session established by the UE_A 10 with a SCEF different from the SCEF_A 46.

Alternatively, the first PDU session may be a PDU session established between the UE_A 10 and the PGW_A 30, and the second PDU session may be a PDU session established by the UE_A 10 with a PGW different from the PGW_A 30.

As described above, the UE_A 10 can continue a service by switching, for communication, between PDU sessions established with different gateways, such as the PGW_A 30 and the SCEF_A 46, connecting between the core network_A 90 and the DN.

This allows, for example, that, in a case of moving of the UE_A 10 that has established a PDU session with a certain gateway device, the UE_A 10 can switch, for the communication, from the PDU session to a PDU session established with another gateway device that is located geologically close to the UE_A 10. Hence, the Service continuity described in the present embodiment can perform optimization of delivery traffic, optimal communication path selection, and the like.

First identification information in the present embodiment is information indicating an access network to which the UE_A 10 is connectable. Furthermore, the first identification information may be information indicating the priority level of an access network to which the UE_A 10 is connectable.

Note that the access network in the present embodiment may be a 3GPP access network or may be a non-3GPP access network. Furthermore, the 3GPP access network may be an E-UTRAN, an access network for the LTE, or an access network for 5G. Furthermore, the non-3GPP access network may be a WLAN access network.

Second identification information in the present embodiment is information indicating an access network to which the network is connectable. Furthermore, the second identification information may be information indicating the priority level of an access network to which the network is connectable.

Third identification information in the present embodiment is information indicating that a network-initiated session establishment procedure is allowed.

Fourth identification information in the present embodiment is information (NW capability) indicating that the network is capable of a network-initiated session establishment procedure. Furthermore, the fourth identification information may be capability information of the core network_A 90 indicating that network-initiated session establishment can be performed. Furthermore, the fourth identification information may be information indicating that a network-initiated session establishment procedure is allowed to be performed after reception of identification information.

Fifth identification information in the present embodiment is information (UE capability) indicating that the UE_A 10 is capable of performing a network-initiated session establishment procedure. Furthermore, the fourth identification information may be capability information of the UE_A 10 indicating that network-initiated session establishment can be performed. Furthermore, the fifth identification information may be information indicating that a network-initiated session establishment procedure is allowed to be performed after reception of identification information.

Sixth identification information in the present embodiment is information indicating a requested session type. The sixth identification information may indicate IP or non-IP.

Seventh identification information in the present embodiment may be information indicating the IP Address of the UE_A 10. Note that the IP address may be an IPv4 address, an IPv6 address, or an IPv6 prefix. Furthermore, the seventh identification information may be information indicating a requested type of IP address of the UE_A 10. Note that allocation of the IP address of the UE_A 10 may be performed by the PGW_A 30 or may be performed by the MME_A 40.

Eighth identification information in the present embodiment is information indicating whether or not to establish a Data Radio Bearer (DRB), which is a radio bearer for transmitting and/or receiving user data. Furthermore, the eighth identification information may be information indicating a requested type of radio bearer to be used for transmission and/or reception of user data. Note that the type of the radio bearer to be used for transmission and/or reception of user data may be a Data Radio Bearer (DRB) or a Signalling Radio Bearer (SRB). Furthermore, the eighth identification information may include requested information related to transmission and/or reception of user data. For example, the eighth identification information may include a requested TFT.

Ninth identification information in the present embodiment is information for identifying data network that is a destination of establishment of a requested PDU session. The information for identifying a data network may be an Access Point Name (APN). The ninth identification information may be application identification information for identifying an application or service identification information for identifying a service, associated with a PDU session requested to be established.

Tenth identification information in the present embodiment is information indicating a requested mobility type.

The eleventh identification information in the present embodiment is information indicating an allowed session type. The eleventh identification information may indicate IP or non-IP.

Twelfth identification information in the present embodiment may be information indicating the IP address of the UE_A 10. Note that the IP address may be an IPv4 address, an IPv6 address, or an IPv6 prefix. Furthermore, the twelfth identification information may be information indicating an allowed type of IP address of the UE_A 10. Note that allocation of the IP address of the UE_A 10 may be performed by the PGW_A 30 or may be performed by the MME_A 40.

Thirteenth identification information in the present embodiment is information indicating whether or not a Data Radio Bearer (DRB), which is a radio bearer for transmitting and/or receiving user data is established. Furthermore, the thirteenth identification information may be information indicating an allowed type of radio bearer to be used for transmission and/or reception of user data. Note that the type of the radio bearer to be used for transmission and/or reception of user data may be a Data Radio Bearer (DRB) or a Signalling Radio Bearer (SRB). Furthermore, the thirteenth identification information may include allowed information related to transmission and/or reception of user data. For example, the thirteenth identification information may include an allowed TFT.

Fourteenth identification information in the present embodiment is information for identifying a data network that is the destination of establishment of an allowed PDU session. Note that the information for identifying a data network may be an Access Point Name (APN). The fourteenth identification information may be application identification information for identifying an application or service identification information for identifying a service, associated with a PDU session allowed to be established.

Fifteenth identification information in the present embodiment is information indicating an allowed mobility type.

Sixteenth identification information in the present embodiment is capability information of a UE (UE capability) indicating that a session supporting Service Continuity can be established. Furthermore, the sixteenth identification information may be capability information of a UE (UE capability) indicating that a session with which communication can be continued by switching, for the communication, the session to a different session can be established. Furthermore, the sixteenth identification information may be information for allowing that service continuity can be performed after reception of identification information.

Seventeenth identification information in the present embodiment is capability information of a network (NW capability) indicating that a session supporting Service Continuity can be established. Furthermore, the seventeenth identification information may be capability information of a network (NW capability) indicating that a session with which communication can be continued by switching, for the communication, the session to a different session can be established. Furthermore, the seventeenth identification information may be information for allowing that service continuity can be performed after reception of identification information.

Eighteenth identification information in the present embodiment is capability information of a UE (UE capability) indicating that Service Continuity is supported between sessions established for a single Data Network (DN). Furthermore, the eighteenth identification information may be capability information of a UE (UE capability) indicating that a session with which communication can be continued by switching, for the communication, the session to a different session established for a single DN can be established.

The eighteenth identification information may be capability information of a UE (UE capability) indicating that Service Continuity is supported between sessions associated with a single APN and/or a TFT and/or an application (application identification information) and/or a service (service identification information). The eighteenth identification information may be capability information of a UE (UE capability) indicating that a session with which communication can be continued by switching, for the communication, the session to a different session associated with a single APN and/or a TFT and/or an application (application identification information) and/or a service (service identification information) can be established.

The eighteenth identification information may be capability information of a UE (UE capability) indicating that Service Continuity is supported between sessions established in a single network slice. Furthermore, the eighteenth identification information may be capability information of a UE (UE capability) indicating that a session with which communication can be continued by switching the session to a different session established in the same network slice can be established.

Nineteenth identification information in the present embodiment is capability information of a network (NW capability) indicating that Service Continuity is supported between sessions established for a single DN. Furthermore, the nineteenth identification information may be capability information of a network (NW capability) indicating that a session with which communication can be continued by switching, for the communication, the session to a different session established for a single DN can be established.

The nineteenth identification information may be capability information of a network (NW capability) indicating that Service Continuity is supported between sessions associated with a single APN and/or a TFT and/or an application (application identification information) and/or a service (service identification information). The nineteenth identification information may be capability information of a network (NW capability) indicating that a session with which communication can be continued by switching, for the communication, the session to a different session associated with a single APN and/or a TFT and/or an application (application identification information) and/or a service (service identification information) can be established.

The nineteenth identification information may be capability information of a U network (NW capability) indicating that Service Continuity is supported between sessions established in a single network slice. Furthermore, the nineteenth identification information may be capability information of a network (NW capability) indicating that a session with which communication can be continued by switching, for communication, the session to a different session established in the same network slice can be established.

Twentieth identification information in the present embodiment is capability information of a UE (UE capability) indicating that Service Continuity is supported between sessions established for different DNs. The twentieth identification information may be capability information of a UE (UE capability) indicating that Service Continuity is supported between sessions associated with different APNs.

Furthermore, the twentieth identification information may be capability information of a UE (UE capability) indicating that a session with which communication can be continued by switching, for the communication, the session to a different session established with a different DN can be established. Furthermore, the twentieth identification information may be capability information of a UE (UE capability) indicating that a session with which communication can be continued by switching, for the communication, the session to a different session associated with a different APN can be established.

The twentieth identification information may be capability information of a UE (UE capability) indicating that Service Continuity is supported between sessions established in different network slices. Furthermore, the twentieth identification information may be capability information of a UE (UE capability) indicating that a session with which communication can be continued by switching, for the communication, the session to a different session established in a different network slice can be established. Twenty-first identification information in the present embodiment is capability information of a network (NW capability) indicating that Service Continuity between different sessions established in different DNs is supported. Furthermore, the twenty-first identification information may be capability information of a network (NW capability) indicating that Service Continuity is supported between sessions associated with different APNs.

Furthermore, the twenty-first identification information may be capability information of a network (NW capability) indicating that a session with which communication can be continued by switching, for the communication, the session to a different session established with a different DN can be established. Furthermore, the twenty-first identification information may be capability information of a network (NW capability) indicating that a session with which communication can be continued by switching, for the communication, the session to a different session associated with a different APN can be established.

The twenty-first identification information may be capability information of a network (NW capability) indicating that Service Continuity is supported between sessions established in different network slices. Furthermore, the twenty-first identification information may be capability information of a network (NW capability) indicating that a session with which communication can be continued by switching the session to a different session established in a different network slice can be established.

Twenty-second identification information in the present embodiment is capability information of a UE (UE capability) indicating that multiple sessions supporting Service Continuity can be established. Furthermore, the twenty-second identification information may be capability information of a UE (UE capability) indicating that multiple sessions with which communication can be continued by switching, for the communication, any of the sessions to a different session can be established. Furthermore, the twenty-second identification information may be information for allowing that service continuity can be performed after reception of identification information.

Twenty-third identification information in the present embodiment is capability information of a network (NW capability) indicating that multiple sessions supporting Service Continuity can be established. Furthermore, the twenty-third identification information may be capability information of a network (NW capability) indicating that multiple sessions with which communication can be continued by switching, for the communication, any of the sessions to a different session can be established. Furthermore, the twenty-third identification information may be information for allowing that service continuity can be performed after reception of identification information.

Twenty-fourth identification information in the present embodiment is capability information of a UE (UE capability) indicating that multiple sessions supporting Service Continuity between sessions established for a single DN can be established. Furthermore, the twenty-fourth identification information may be capability information of a UE (UE capability) indicating that multiple sessions with which communication can be continued by switching, for the communication, any of the sessions to a different session established for a single DN can be established.

Furthermore, the twenty-fourth identification information may be capability information of a UE (UE capability) indicating that multiple sessions that are associated with a single APN and/or a TFT and/or an application (application identification information) and/or a service (service identification information) and that can be switched between each other for communication can be established. Furthermore, the twenty-fourth identification information may be capability information of a UE (UE capability) indicating that multiple sessions that are associated with a single APN and/or a TFT and/or an application (application identification information) and/or a service (service identification information) and that can be switched between each other for communication can be established.

The twenty-fourth identification information may be capability information of a UE (UE capability) indicating that multiple sessions capable of Service Continuity between sessions established in a single network slice can be established. Furthermore, the twenty-fourth identification information may be capability information of a UE (UE capability) indicating that multiple sessions with which communication can be continued by switching among the sessions established in the same network slice for communication can be established.

Twenty-fifth identification information in the present embodiment is capability information of a network (NW capability) indicating that multiple sessions supporting Service Continuity between sessions established for a single DN can be established.

Furthermore, the twenty-fifth identification information may be capability information of a network (NW capability) indicating that multiple sessions with which communication can be continued by switching, for the communication, any of the sessions to a different session established for a single DN can be established.

Furthermore, the twenty-fifth identification information may be capability information of a network (NW capability) indicating that multiple sessions that are associated with a single APN and/or a TFT and/or an application (application identification information) and/or a service (service identification information) and that can be switched between each other for communication can be established. Furthermore, the twenty-fifth identification information may be capability information of a network (NW capability) indicating that multiple sessions that are associated with a single APN and/or a TFT and/or an application (application identification information) and/or a service (service identification information) and that can be switched between each other for communication can be established.

The twenty-fifth identification information may be capability information of a network (NW capability) indicating that multiple sessions capable of Service Continuity between sessions established in a single network slice can be established. Furthermore, the twenty-fifth identification information may be capability information of a network (NW capability) indicating that multiple sessions with which communication can be continued by switching among the sessions established in the same network slice for communication can be established.

Twenty-sixth identification information in the present embodiment is capability information of a UE (UE capability) indicating that multiple sessions supporting Service Continuity between sessions established for different DNs can be established. The twenty-sixth identification information may be capability information of a UE (UE capability) indicating that multiple sessions supporting Service Continuity between sessions associated with different APNs can be established.

Furthermore, the twenty-sixth identification information may be capability information of a UE (UE capability) indicating that multiple sessions with which communication can be continued by switching, for the communication, any of the sessions to a different session established with a different DN can be established. Furthermore, the twenty-sixth identification information may be capability information of a UE (UE capability) indicating that multiple sessions with which communication can be continued by switching, for the communication, any of the sessions to a different session associated with a different APN can be established.

The twenty-sixth identification information may be capability information of a UE (UE capability) indicating that multiple sessions supporting Service Continuity between sessions established in a different network slice can be established. Furthermore, the twenty-sixth identification information may be capability information of a UE (UE capability) indicating that multiple session with which communication can be continued by switching, for communication, any of the sessions to a different session established in the different network slice can be established.

Twenty-seventh identification information in the present embodiment is capability information of a network (NW capability) indicating that multiple sessions supporting Service Continuity between sessions established for different DNs can be established.

Furthermore, the twenty-seventh identification information may be capability information of a network (NW capability) indicating that multiple sessions supporting Service Continuity between sessions associated with different APNs can be established.

Furthermore, the twenty-seventh identification information may be capability information of a network (NW capability) indicating that multiple sessions with which communication can be continued by switching, for the communication, any of the sessions to a different session established with a different DN can be established. Furthermore, the twenty-seventh identification information may be capability information of a UE (capability information of a network (NW capability)) indicating that multiple sessions with which communication can be continued by switching, for the communication, any of the sessions to a different session associated with a different APN can be established.

The twenty-seventh identification information may be capability information of a network (NW capability) indicating that multiple sessions supporting Service Continuity between sessions established in a different network slice can be established. Furthermore, the twenty-seventh identification information may be capability information of a network (NW capability) indicating that multiple sessions with which communication can be continued by switching, for communication, any of the sessions to a different session established in a different network slice can be established.

Twenty-eighth identification information in the present embodiment is information indicating that establishment of an Initial Session corresponding to the first and/or second and/or third single-type PDU session is requested. Furthermore, the twenty-eighth identification information may be information indicating a first and/or second and/or third single-type PDU session.

Twenty-ninth identification information in the present embodiment may be information indicating that establishment of an Initial Session corresponding to the first and/or second and/or third single-type PDU session is allowed. The twenty-ninth identification information may be information for identifying the first and/or second and/or third single-type PDU session allowed to be established.

Furthermore, the twenty-ninth identification information may be information indicating that the session to be established is the first and/or second and/or third single-type PDU session. Furthermore, the twenty-ninth identification information may be information indicating that the session to be established is an Initial Session corresponding to the first and/or second and/or third single-type PDU session.

Furthermore, the twenty-ninth identification information may be information for identifying a session allowed to be established. In addition, the twenty-ninth identification information may include information for identifying single-type PDU sessions including a PDU session to be established.

Thirtieth identification information in the present embodiment is information indicating that establishment of an Additional Session corresponding to the first and/or second and/or third single-type PDU session is requested. Furthermore, the thirtieth identification information may be information indicating the first and/or second and/or third single-type PDU session. Furthermore, the thirtieth identification information may be information for identifying another session included in the single-type sessions. In other words, the thirtieth identification information may be information for identifying a PDU session established in the first PDU session establishment procedure and/or a PDU session currently used for communication. Furthermore, the thirtieth identification information may be information indicating that the PDU session established in the first PDU session establishment procedure and/or the PDU session currently used for communication is to be released. In addition, the thirtieth identification information may include information for identifying a single-type PDU session including a PDU session to be established or released.

Thirty-first identification information in the present embodiment may be information indicating that establishment of an Additional Session corresponding to the first and/or second and/or third single-type PDU session is allowed. Furthermore, the thirty-first identification information may be information for identifying the first and/or second and/or third single-type PDU session allowed to be established.

Furthermore, the thirty-first identification information may be information indicating that the session to be established is the first and/or second and/or third single-type PDU session. Furthermore, the thirty-first identification information may be information indicating that the session to be established is an Additional Session corresponding to the first and/or second and/or third single-type PDU session.

Furthermore, the thirty-first identification information may be information for identifying a session allowed to be established. Furthermore, the thirty-first identification information may be information for identifying another session included in the single-type sessions. In other words, the thirty-first identification information may be information for identifying a PDU session established in the first PDU session establishment procedure and/or a PDU session currently used for communication. In addition, the thirty-first identification information may include information for identifying single-type PDU sessions including a PDU session to be established.

Furthermore, the thirty-first identification information may be information indicating that sessions have been switched and/or service continuity in a single-type PDU session has been performed. Furthermore, the thirty-first identification information may be information for identifying another session included in single-type sessions (such as the Initial Session or the session currently used for communication). Furthermore, the thirty-first identification information may be information for indicating release of another session included in the single-type sessions. In other words, the thirty-first identification information may be information indicating that a PDU session established in the first PDU session establishment procedure and/or a PDU session currently used for communication is released. In addition, the thirty-first identification information may include information for identifying a single-type PDU session including a PDU session to be established or released.

Thirty-second identification information in the present embodiment is information indicating that establishment of an Initial Session corresponding to the first and/or second and/or third single-type PDU session is requested. Furthermore, the thirty-second identification information may be information indicating the first and/or second and/or third single-type PDU session.

Thirty-third identification information in the present embodiment is information indicating that establishment of an Initial Session corresponding to the first and/or second and/or third single-type PDU session is allowed. Furthermore, the thirty-third identification information may be information for identifying the first and/or second and/or third single-type PDU session allowed to be established.

Furthermore, the thirty-third identification information may be information indicating that the session to be established is the first and/or second and/or third single-type PDU session. Furthermore, the thirty-third identification information may be information indicating that the session to be established is an Initial Session corresponding to the first and/or second and/or third single-type PDU session.

Furthermore, the thirty-third identification information may be information for identifying a session allowed to be established. In addition, the thirty-third identification information may include information for identifying single-type PDU sessions including a PDU session to be established.

Thirty-fourth identification information in the present embodiment is information indicating that establishment of an Additional Session corresponding to the first and/or second and/or third single-type PDU session is requested. Furthermore, the thirty-fourth identification information may be information indicating the first and/or second and/or third single-type PDU session. Furthermore, the thirty-fourth identification information may be information for identifying another session included in the single-type sessions. In other words, the thirty-fourth identification information may be information for identifying a PDU session established in the first PDU session establishment procedure and/or a PDU session currently used for communication. Furthermore, the thirty-fourth identification information may be information indicating that the PDU session established in the first PDU session establishment procedure and/or the PDU session currently used for communication is to be released. In addition, the thirty-fourth identification information may include information for identifying a single-type PDU session including a PDU session to be established or released.

Thirty-fifth identification information in the present embodiment is information indicating that establishment of an Additional Session corresponding to the first and/or second and/or third single-type PDU session is allowed. Furthermore, the thirty-fifth identification information may be information for identifying the first and/or second and/or third single-type PDU session allowed to be established.

Furthermore, the thirty-fifth identification information may be information indicating that the session to be established is the first and/or second and/or third single-type PDU session. Furthermore, the thirty-fifth identification information may be information indicating that the session to be established is an Additional Session corresponding to the first and/or second and/or third single-type PDU session.

Furthermore, the thirty-fifth identification information may be information for identifying a session allowed to be established. Furthermore, the thirty-fifth identification information may be information for identifying another session included in single-type sessions (such as the Initial Session or the session currently used for communication).

Furthermore, the thirty-fifth identification information may be information indicating that sessions have been switched and/or service continuity in a single-type PDU session has been performed.

Furthermore, the thirty-fifth identification information may be information for identifying another session included in the single-type sessions. In other words, the thirty-fifth identification information may be information for identifying a PDU session established in the first PDU session establishment procedure and/or a PDU session currently used for communication.

Furthermore, the thirty-fifth identification information may be information for indicating release of another session included in the single-type sessions. In other words, the thirty-fifth identification information may be information indicating that a PDU session established in the first PDU session establishment procedure and/or a PDU session currently used for communication is released. In addition, the thirty-fifth identification information may include information for identifying a single-type PDU session including a PDU session to be established or released.

Thirty-sixth identification information in the present embodiment is information indicating that establishment of an Initial Session corresponding to a first and/or second and/or third multi-type PDU session is requested. Furthermore, the thirty-sixth identification information may be information indicating a first and/or second and/or third multi-type PDU session.

Thirty-seventh identification information in the present embodiment is information indicating that establishment of an Initial Session corresponding to the first and/or second and/or third multi-type PDU session is allowed. Furthermore, the thirty-seventh identification information may be information for identifying the first and/or second and/or third multi-type PDU session allowed to be established.

Furthermore, the thirty-seventh identification information may be information indicating that the session to be established is the first and/or second and/or third multi-type PDU session. Furthermore, the thirty-seventh identification information may be information indicating that the session to be established is an Initial Session corresponding to the first and/or second and/or third multi-type PDU session.

Furthermore, the thirty-seventh identification information may be information for identifying a session allowed to be established. In addition, the thirty-seventh identification information may include information for identifying multi-type PDU sessions including a PDU session to be established.

Thirty-eighth identification information in the present embodiment may be information indicating that establishment of an Additional Session corresponding to the first and/or second and/or third multi-type PDU session is requested. Furthermore, the thirty-eighth identification information may be information indicating the first and/or second and/or third multi-type PDU session. Furthermore, the thirty-eighth identification information may be information for identifying another session included in multi-type sessions. In other words, the thirty-eighth identification information may be information for identifying a PDU session established in the first PDU session establishment procedure and/or a PDU session currently used for communication. Furthermore, the thirty-eighth identification information may be information indicating that the PDU session established in the first PDU session establishment procedure and/or the PDU session currently used for communication is maintained without being released.

Thirty-ninth identification information in the present embodiment may be information indicating that establishment of an Additional Session corresponding to the first and/or second and/or third multi-type PDU session is allowed. Furthermore, the thirty-ninth identification information may be information for identifying the first and/or second and/or third multi-type PDU session allowed to be established.

Furthermore, the thirty-ninth identification information may be information indicating that the session to be established is the first and/or second and/or third multi-type PDU session. Furthermore, the thirty-ninth identification information may be information indicating that the session to be established is an Additional Session corresponding to the first and/or second and/or third multi-type PDU session.

Furthermore, the thirty-ninth identification information may be information for identifying a session allowed to be established. Furthermore, the thirty-ninth identification information may be information for identifying another session included in multi-type sessions. In other words, the thirty-ninth identification information may be information for identifying a PDU session established in the first PDU session establishment procedure and/or a PDU session currently used for communication.

Furthermore, the thirty-ninth identification information may be information indicating that sessions have been switched and/or service continuity in a multi-type PDU session has been performed. Furthermore, the thirty-ninth identification information may be information indicating that the PDU session established in the first PDU session establishment procedure and/or the PDU session currently used for communication is maintained without being released.

Fortieth identification information in the present embodiment is information indicating that establishment of an Initial Session corresponding to the first and/or second and/or third multi-type PDU session is requested. Furthermore, the forty-first identification information may be information indicating the first and/or second and/or third multi-type PDU session.

Forty-first identification information in the present embodiment is information indicating that establishment of an Initial Session corresponding to the first and/or second and/or third multi-type PDU session is allowed. Furthermore, the forty-first identification information may be information for identifying the first and/or second and/or third multi-type PDU session allowed to be established.

Furthermore, the forty-first identification information may be information indicating that the session to be established is the first and/or second and/or third multi-type PDU session. Furthermore, the forty-first identification information may be information indicating that the session to be established is an Initial Session corresponding to the first and/or second and/or third multi-type PDU session.

Furthermore, the forty-first identification information may be information for identifying a session allowed to be established.

Forty-second identification information in the present embodiment may be information indicating that establishment of an Additional Session corresponding to the first and/or second and/or third multi-type PDU session is requested. Furthermore, the forty-second identification information may be information indicating the first and/or second and/or third multi-type PDU session. Furthermore, the forty-second identification information may be information for identifying another session included in multi-type sessions. In other words, the forty-second identification information may be information for identifying a PDU session established in the first PDU session establishment procedure and/or a PDU session currently used for communication. Furthermore, the forty-second identification information may be information indicating that the PDU session established in the first PDU session establishment procedure and/or the PDU session currently used for communication is maintained without being released.

Forty-third identification information in the present embodiment may be information indicating that establishment of an Additional Session corresponding to the first and/or second and/or third multi-type PDU session is allowed. Furthermore, the forty-third identification information may be information for identifying the first and/or second and/or third multi-type PDU session allowed to be established.

Furthermore, the forty-third identification information may be information indicating that the session to be established is the first and/or second and/or third multi-type PDU session. Furthermore, the forty-third identification information may be information indicating that the session to be established is an Additional Session corresponding to the first and/or second and/or third multi-type PDU session.

Furthermore, the forty-third identification information may be information for identifying a session allowed to be established. Furthermore, the forty-third identification information may be information for identifying another session included in multi-type sessions. In other words, the forty-third identification information may be information for identifying a PDU session established in the first PDU session establishment procedure and/or a PDU session currently used for communication.

Furthermore, the forty-third identification information may be information indicating that sessions have been switched and/or service continuity in a multi-type PDU session has been performed. Furthermore, the forty-third identification information may be information indicating that the PDU session established in the first PDU session establishment procedure and/or the PDU session currently used for communication is maintained without being released.

Forty-fourth identification information in the present embodiment is information indicating that switching of a session is requested. Furthermore, the forty-fourth identification information may be information for identifying a multi-type session currently used for communication. Furthermore, the forty-fourth identification information may be information for identifying a multi-type session to be a switching destination.

Furthermore, the forty-fourth identification information may be information indicating that a switching source PDU session is maintained without being released.

Forty-fifth identification information in the present embodiment is information indicating that switching of a session is allowed. Furthermore, the forty-fifth identification information may be information for identifying a first and/or second and/or third multi-type PDU session allowed to be switched.

Furthermore, the forty-fifth identification information may be information indicating that the session to be switched is the first and/or second and/or third multi-type PDU session. Furthermore, the forty-fifth identification information may be information for identifying a session allowed to be switched.

Furthermore, the forty-fifth identification information may be information for identifying a switching destination session. Furthermore, the forty-fifth identification information may be information for identifying a switching source session. Furthermore, the forty-fifth identification information may be information indicating that sessions have been switched and/or service continuity in a multi-type PDU session has been performed.

Furthermore, the forty-fifth identification information may be information indicating that a switching source PDU session is maintained without being released.

Forty-sixth identification information in the present embodiment is information indicating that switching of a session is requested. Furthermore, the forty-sixth identification information may be information for identifying a multi-type session currently used in communication. Furthermore, the forty-sixth identification information may be information for identifying a multi-type session to be a switching destination.

Furthermore, the forty-sixth identification information may be information indicating that a switching source PDU session is maintained without being released.

Forty-seventh identification information in the present embodiment is information indicating that switching of a session is allowed. Furthermore, the forty-seventh identification information may be information for identifying the first and/or second and/or third multi-type PDU session allowed to be switched.

Furthermore, the forty-seventh identification information may be information indicating that the session to be switched is the first and/or second and/or third multi-type PDU session. Furthermore, the forty-seventh identification information may be information for identifying a session allowed to be switched. Furthermore, the forty-seventh identification information may be information for identifying a switching destination session.

Furthermore, the forty-seventh identification information may be information for identifying a switching source session. Furthermore, the forty-seventh identification information may be information indicating that sessions have been switched and/or service continuity in a multi-type PDU session has been performed.

Furthermore, the forty-seventh identification information may be information indicating that a switching source PDU session is maintained without being released.

Figure 18:
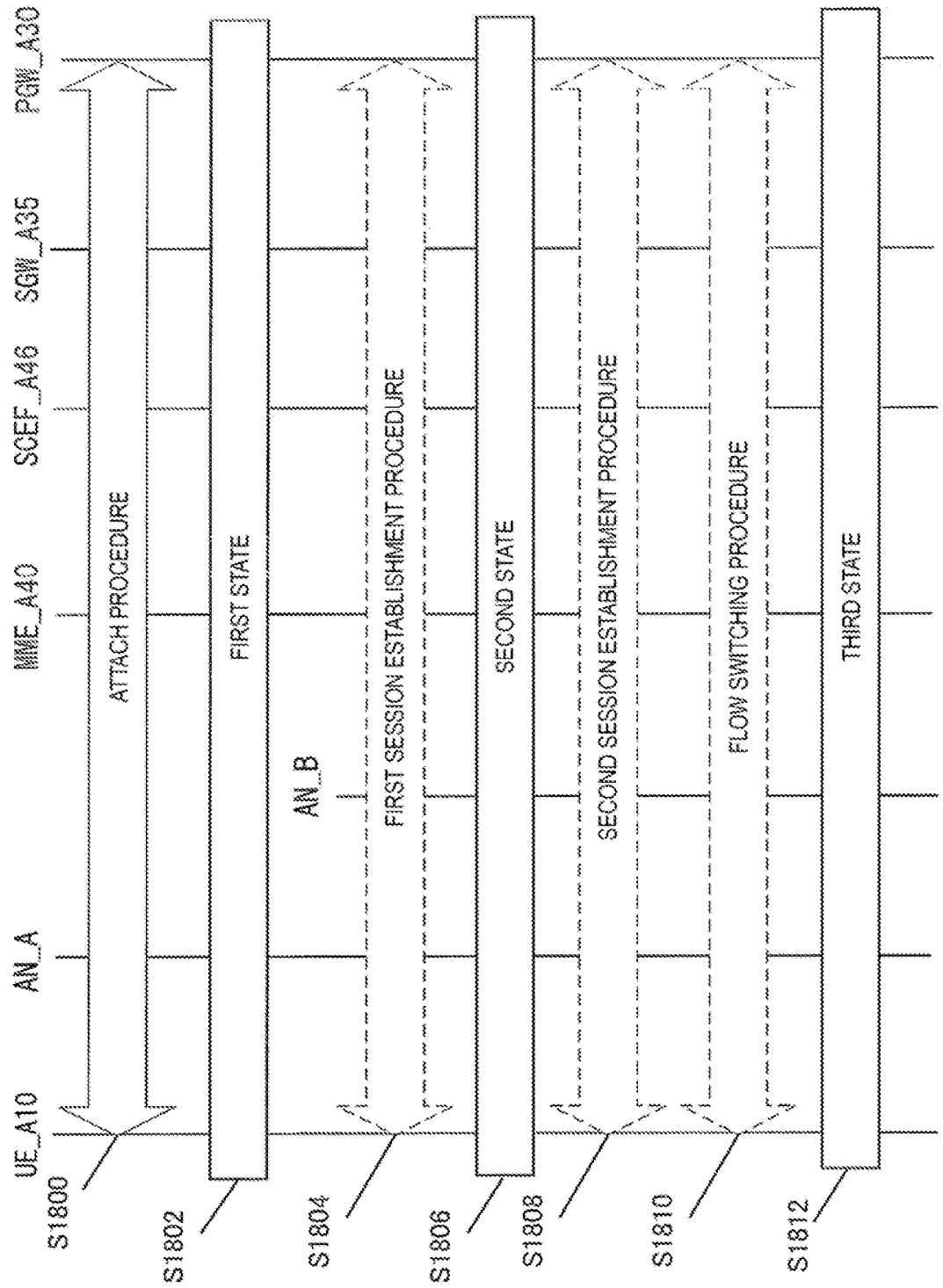
FIG. 18 is a diagram illustrating an overview of a communication procedure.

As illustrated in FIG. 18. in the communication procedure in the present embodiment, an attach procedure (S18000) is performed first. Through the attach procedure, the UE_A 10 connects to the core network_A 90. The UE_A 10 and/or the MME_A 40 and/or SGW_A 35 and/or PGW_A 30 and/or the SCEF_A 46 may exchange various kinds of capability information of the UE_A 10 and/or the core network_A 90 in the attach procedure. Specifically, information indicating capability of supporting network-initiated session establishment and/or information indicating capability of supported Service Continuity may be exchanged.

Details of the attach procedure will be described later.

In a case of completion of the attach procedure, the UE_A 10 and/or the MME_A 40 and/or the SGW_A 35 and/or the PGW_A 30 and/or the SCEF_A 46 change to the first state (S1802).

Next, a first PDU session establishment procedure (S1804) is performed. The first PDU session establishment procedure may be an initial PDU session establishment procedure for establishing the first PDU session. The PDU session to be established may be a single-type PDU session or a multi-type PDU session. More specifically, the PDU session to be established may be any one of the first to third single-type PDU sessions or any of the first to third multi-type PDU sessions. Moreover, the first PDU session establishment procedure may be performed according to any of a UE-initiated PDU session establishment procedure, a first network-initiated PDU session establishment procedure and a second network-initiated PDU session establishment procedure that will be described later.

Here, the first PDU session establishment procedure of the UE-initiated PDU session establishment procedure may be performed in a case that establishment of a UE-initiated single-type PDU session or multi-type PDU session is possible based on the attach procedure.

More specifically, in the attach procedure, the UE_A 10 may start the first PDU session establishment procedure, based on the reception of one or more pieces of identification information among the second identification information, the seventeenth identification information, the nineteenth identification information, the twenty-first identification information, the twenty-third identification information, the twenty-fifth identification information, and the twenty-seventh identification information.

The first and second network-initiated PDU session establishment procedures may be performed in a case that establishment of a network-initiated single-type PDU session or multi-type PDU session is possible based on the attach procedure.

More specifically, in the attach procedure, the MME_A 40 may start the first PDU session establishment procedure, based on transmission of one or more pieces of identification information among the second identification information, the fourth identification information, the seventeenth identification information, the nineteenth identification information, the twenty-first identification information, the twenty-third identification information, the twenty-fifth identification information, and the twenty-seventh identification information. Alternatively, the MME_A 40 may start the first PDU session establishment procedure, based on the reception of one or more pieces of identification information among the first identification information, the third identification information, the fifth identification information, the sixteenth identification information, the eighteenth identification information, the twentieth identification information, the twenty-second identification information, the twenty-fourth identification information, and the twenty-sixth identification information.

In a case of requesting PDU session establishment of a single-type PDU session, the twenty-eighth identification information may be transmitted and/or received in a PDU session establishment request message and/or a create session request message in the UE-initiated PDU session establishment procedure. Furthermore, in a case that the PDU session establishment of the single-type PDU session is allowed, the twenty-ninth identification information may be transmitted and/or received in a PDU session establishment request message and/or a PDU session establishment accept message and/or a session response request message and/or a create session response message in the UE-initiated PDU session establishment procedure.

In a case of requesting PDU session establishment of a multi-type PDU session, the thirty-sixth identification information may be transmitted and/or received in a PDU session establishment request message and/or a create session request message in the UE-initiated PDU session establishment procedure. Furthermore, in a case that the PDU session establishment of the multi-type PDU session is allowed, the thirty-seventh identification information may be transmitted and/or received in a PDU session establishment request message and/or a PDU session establishment accept message and/or a session response request message and/or a create session response message in the UE-initiated PDU session establishment procedure.

In a case of requesting PDU session establishment of the single-type PDU session, the thirty-second identification information may be transmitted and/or received in a PDU session establishment request message and/or a create session request message in the first network-initiated PDU session establishment procedure, or may be transmitted and/or received in a first PDU session establishment request message message and/or a create session request message in the second network-initiated PDU session establishment procedure. Furthermore, in a case that the PDU session establishment of single-type PDU session is allowed, the thirty-third identification information may be transmitted and/or received in a PDU session establishment accept message and/or a create session response message in the first network-initiated PDU session establishment procedure, or may be transmitted and/or received in a second PDU session establishment request message message and/or a create session response message in the second network-initiated PDU session establishment procedure.

In a case of requesting PDU session establishment of the multi-type PDU session, the fortieth identification information may be transmitted and/or received in a PDU session establishment request message and/or a create session request message in the first network-initiated PDU session establishment procedure, or may be transmitted and/or received in a first PDU session establishment request message message and/or a create session request message in the second network-initiated PDU session establishment procedure. Furthermore, in a case that the PDU session establishment of multi-type PDU session is allowed, the forty-first identification information may be transmitted and/or received in a PDU session establishment accept message and/or a create session response message in the first network-initiated PDU session establishment procedure, or may be transmitted and/or received in a second PDU session establishment request message message and/or a create session response message in the second network-initiated PDU session establishment procedure.

Furthermore, the UE_A 10 and/or the MME_A 40 and/or the SGW_A 35 and/or the PGW_A 30 and/or the SCEF_A 46 may request, determine, and/or recognize the type of PDU session to be established, in the above-described first PDU session establishment procedure. More specifically, the UE_A 10 and/or the MME_A 40 and/or the SGW_A 35 and/or the PGW_A 30 and/or the SCEF_A 46 may request and/or determine a type of single-type PDU session of the PDU session to be established, based on the twenty-eighth identification information and/or the thirty-second identification information, or may request and/or determine a type of multi-type PDU session of the PDU session to be established, based on the thirty-sixth identification information and/or the fortieth identification information.

Furthermore, the UE_A 10 and/or the MME_A 40 and/or the SGW_A 35 and/or the PGW_A 30 and/or the SCEF_A 46 may recognize a type of a single-type PDU session of the established PDU session, based on the twenty-ninth identification information and/or the thirty-third identification information, or may recognize a type of multi-type PDU session of the established PDU session, based on the thirty-seventh identification information and/or the forty-first identification information.

Moreover, the UE_A 10 and/or the MME_A 40 and/or the SGW_A 35 and/or the PGW_A 30 and/or the SCEF_A 46 may select and/or determine an APN and/or a TFT and/or an application and/or a data network and/or a network slice and/or an access network associated with a PDU session to be established, based on various kinds of capability information, in the first PDU session establishment procedure.

Note that the first PDU session establishment procedure may be performed in the above-described attach procedure. In this case, the PDU session establishment request message may be transmitted and/or received in an attach request message transmitted from the UE_A 10 to the MME_A 40. Furthermore, the PDU session establishment accept message may be transmitted and/or received in the attach accept message transmitted from the MME_A 40 to the UE_A 10. In addition, the PDU session establishment complete message may be transmitted and/or received in an attach complete message transmitted from the UE_A 10 to the MME_A 40.

Through the above-described procedure, the UE_A 10 and/or the MME_A 40 and/or the SGW_A 35 and/or the PGW_A 30 and/or the SCEF_A 46 changes to the second state (S1806).

Next, a second PDU session establishment procedure (S1808) is performed. The second PDU session establishment procedure may be an additional PDU session establishment procedure for establishing the second PDU session. The PDU session to be established may be a single-type PDU session or a multi-type PDU session. More specifically, the PDU session to be established may be any one of the first to third single-type PDU sessions or any of the first to third multi-type PDU sessions.

Moreover, the second PDU session establishment procedure may be performed according to any of a UE-initiated PDU session establishment procedure, a first network-initiated PDU session establishment procedure and a second network-initiated PDU session establishment procedure to be described later.

Here, the second PDU session establishment procedure of the UE-initiated PDU session establishment procedure may be performed in a case that UE-initiated establishment of a single-type PDU session or multi-type PDU session is possible based on the attach procedure.

More specifically, the case that UE-initiated establishment of a single-type PDU session or multi-type PDU session is possible based on the attach procedure may be a case that the UE_A 10 has received one or more pieces of identification information among the second identification information, the seventeenth identification information, the nineteenth identification information, the twenty-first identification information, the twenty-third identification information, the twenty-fifth identification information, and the twenty-seventh identification information in the attach procedure.

The second PDU session establishment procedure of the first and second network-initiated PDU session establishment procedures may be performed in a case that network-initiated establishment of a single-type PDU session or multi-type PDU session is possible based on the attach procedure.

More specifically, the case that network-initiated establishment of a single-type PDU session or multi-type PDU session is possible based on the attach procedure may be a case that the MME_A 40 has transmitted one or more pieces of identification information among the second identification information, the fourth identification information, the seventeenth identification information, the nineteenth identification information, the twenty-first identification information, the twenty-third identification information, the twenty-fifth identification information, and the twenty-seventh identification information in the attach procedure. Alternatively, the case may be a case that the MME_A 40 has received one or more pieces of identification information among the first identification information, the third identification information, the fifth identification information, the sixteenth identification information, the eighteenth identification information, the twentieth identification information, the twenty-second identification information, the twenty-fourth identification information, and the twenty-sixth identification information.

Note that, in a case that the second PDU session establishment procedure is a UE-initiated PDU session establishment procedure, the UE_A 10 and/or the MME_A 40 and/or the SGW_A 35 and/or the PGW_A 30 and/or the SCEF_A 46 may transmit the thirtieth identification information and/or the thirty-first identification information and/or thirty-eighth identification information and/or the thirty-ninth identification information in a message in the UE-initiated PDU session establishment procedure that will be described later.

Here, in a case that UE-initiated establishment of a single-type PDU session or multi-type PDU session is possible based on the attach procedure, the thirtieth identification information and/or the thirty-first identification information and/or the thirty-eighth identification information and/or the thirty-ninth identification information may be included in a message in the UE-initiated PDU session establishment procedure.

More specifically, in a case of requesting PDU session establishment of a single-type PDU session, the thirtieth identification information may be transmitted and/or received in a PDU session establishment request message and/or a create session request message in the UE-initiated PDU session establishment procedure. Furthermore, in a case that the PDU session establishment of the single-type PDU session is allowed, the thirty-first identification information may be transmitted and/or received in a PDU session establishment request message and/or a PDU session establishment accept message and/or a session response request message and/or a create session response message in the UE-initiated PDU session establishment procedure.

In a case of requesting PDU session establishment of a multi-type PDU session, the thirty-eighth identification information may be transmitted and/or received in a PDU session establishment request message and/or a create session request message in the UE-initiated PDU session establishment procedure. Furthermore, in a case that the PDU session establishment of the multi-type PDU session is allowed, the thirty-ninth identification information may be transmitted and/or received in a PDU session establishment request message and/or a PDU session establishment accept message and/or a session response request message and/or a create session response message in the UE-initiated PDU session establishment procedure.

Furthermore, in a case that the second PDU session establishment procedure is a network-initiated PDU session establishment procedure, the UE_A 10 and/or the MME_A 40 and/or the SGW_A 35 and/or the PGW_A 30 and/or the SCEF_A 46 may transmit the thirty-fourth identification information and/or the thirty-fifth identification information and/or forty-second identification information and/or the forty-third identification information in a message in the first network-initiated PDU session establishment procedure and/or a message in the second network-initiated PDU session establishment procedure that will be described later.

Here, in a case that network-initiated establishment of a single-type PDU session or multi-type PDU session is possible based on the attach procedure, the thirty-fourth identification information and/or the thirty-fifth identification information and/or the forty-second identification information and/or the forty-third identification information may be included in a message in the UE-initiated PDU session establishment procedure.

More specifically, in a case of requesting PDU session establishment of the single-type PDU session, the thirty-fourth identification information may be transmitted and/or received in a PDU session establishment request message and/or a create session request message in the first network-initiated PDU session establishment procedure, or may be transmitted and/or received in a first PDU session establishment request message message and/or a create session request message in the second network-initiated PDU session establishment procedure. Furthermore, in a case that the PDU session establishment of single-type PDU session is allowed, the thirty-fifth identification information may be transmitted and/or received in a PDU session establishment accept message and/or a create session response message in the first network-initiated PDU session establishment procedure, or may be transmitted and/or received in a second PDU session establishment request message message and/or a create session response message in the second network-initiated PDU session establishment procedure.

In a case of requesting PDU session establishment of the multi-type PDU session, the forty-second identification information may be transmitted and/or received in a PDU session establishment request message and/or a create session request message in the first network-initiated PDU session establishment procedure, or may be transmitted and/or received in a first PDU session establishment request message message and/or a create session request message in the second network-initiated PDU session establishment procedure. Furthermore, in a case that the PDU session establishment of multi-type PDU session is allowed, the forty-third identification information may be transmitted and/or received in a PDU session establishment accept message and/or a create session response message in the first network-initiated PDU session establishment procedure, or may be transmitted and/or received in a second PDU session establishment request message message and/or a create session response message in the second network-initiated PDU session establishment procedure.

Furthermore, the UE_A 10 and/or the MME_A 40 and/or the SGW_A 35 and/or the PGW_A 30 and/or the SCEF_A 46 may request, determine, and/or recognize the type of PDU session to be established, in the above-described second PDU session establishment procedure. More specifically, the UE_A 10 and/or the MME_A 40 and/or the SGW_A 35 and/or the PGW_A 30 and/or the SCEF_A 46 may request and/or determine a type of single-type PDU session of the PDU session to be established, based on the thirtieth identification information and/or the thirty-fourth identification information, or may request and/or determine a type of multi-type PDU session of the PDU session to be established, based on the thirty-eighth identification information and/or the forty-second identification information.

Furthermore, the UE_A 10 and/or the MME_A 40 and/or the SGW_A 35 and/or the PGW_A 30 and/or the SCEF_A 46 may recognize a type of a single-type PDU session of the established PDU session, based on the thirty-first identification information and/or the thirty-fifth identification information, or may recognize a type of multi-type PDU session of the established PDU session, based on the thirty-ninth identification information and/or the forty-third identification information.

Furthermore, the UE_A 10 and/or the MME_A 40 and/or the SGW_A 35 and/or the PGW_A 30 and/or the SCEF_A 46 may release the PDU session established in the first PDU session establishment procedure and/or the PDU session currently used for the communication, based on the thirty-first identification information and/or the thirty-fifth identification information, or may maintain, instead of releasing, the PDU session established in the first PDU session establishment procedure and/or the PDU session currently used for the communication, based on the thirty-ninth identification information and/or the forty-third identification information.

Moreover, the UE_A 10 and/or the MME_A 40 and/or the SGW_A 35 and/or the PGW_A 30 and/or the SCEF_A 46 may select and/or determine an APN and/or a TFT and/or an application and/or a data network and/or a network slice and/or an access network associated with a PDU session to be established, based on various kinds of capability information, in the second PDU session establishment procedure.

Note that, in a case that the second single-type PDU session or the second multi-type PDU session has been established, the APN and/or the TFT and/or the application and/or the data network and/or the network slice and/or the access network selected and/or determined in the second PDU session establishment procedure may be the same as those selected and/or determined in the first PDU session establishment procedure.

In a case that the third single-type PDU session or the third multi-type PDU session has been established, the APN and/or the TFT and/or the application and/or the data network and/or the network slice and/or the access network selected and/or determined in the second PDU session establishment procedure may be different from those selected and/or determined in the first PDU session establishment procedure.

The UE_A 10 and/or the MME_A 40 and/or the SGW_A 35 and/or the PGW_A 30 and/or the SCEF_A 46 may update information for controlling transmission and/or reception of user data, following the second PDU session establishment procedure. Specifically, based on the second PDU session establishment procedure, each apparatus may change a PDU session to be used for transmission and/or reception of user data to a PDU session established in the second PDU session establishment procedure. Note that information for controlling transmission and/or reception of user data may be a TFT.

Moreover, in a case that the PDU session to be established is a single-type PDU session, each apparatus may release the PDU session established before performing the second PDU session establishment procedure, in a case of update of the information for controlling transmission and/or reception of user data. More specifically, each apparatus may delete the context related to the already-established PDU session in a case of update of the information for controlling transmission and/or reception of user data.

Note that, in a case that the PDU session to be established is a multi-type PDU session, update of the information for controlling transmission and/or reception of user data may be performed by a flow switching procedure (S1810) instead of being performed with the second PDU session establishment procedure. The flow switching procedure is a procedure for switching a PDU session to be used for transmission and/or reception of user data.

The UE_A 10 and/or the MME_A 40 and/or the SGW_A 35 and/or the PGW_A 30 and/or the SCEF_A 46 may change a PDU session to be used for transmission and/or reception of user data to a PDU session established in the second PDU session establishment procedure, based on the flow switching procedure.

The flow switching procedure may include a UE-initiated flow switching procedure and a network-initiated flow switching procedure. Details of the flow switching procedure will be described later.

Through the above-described procedure, the UE_A 10 and/or the MME_A 40 and/or the SGW_A 35 and/or the PGW_A 30 and/or the SCEF_A 46 changes to the third state (S1812).

1.3.1. Attach Procedure Example

First, an example of an attach procedure will be described.

The attach procedure is a procedure which is started on the initiative of the UE_A 10. The attach procedure is a procedure for the UE_A 10 to connect to a network. In other words, the attach procedure is a procedure for connecting to an access network, and is a procedure for further connecting to a core network through the access network.

A trigger when the UE_A 10 starts the attach procedure may be a time when the terminal is switched on, or the like. The UE_A 10 may start at an arbitrary timing in a case that the UE_A 10 is not connected to the core network_A 90 regardless of the above.

Moreover, the UE_A 10 may, or may not necessarily, establish a PDU session with the core network_A 90 in a case of completion of the attach procedure. In other words, the UE_A 10 may, or may not necessarily, establish a PDU session with the PGW_A 30 and/or the SCEF_A 46 in a case of completion of the attach procedure.

Note that, in a case that a PDU session is established in the attach procedure, a message in the first PDU session establishment procedure that will be described later may be transmitted and/or received together with a message in the attach procedure.

Figure 19:
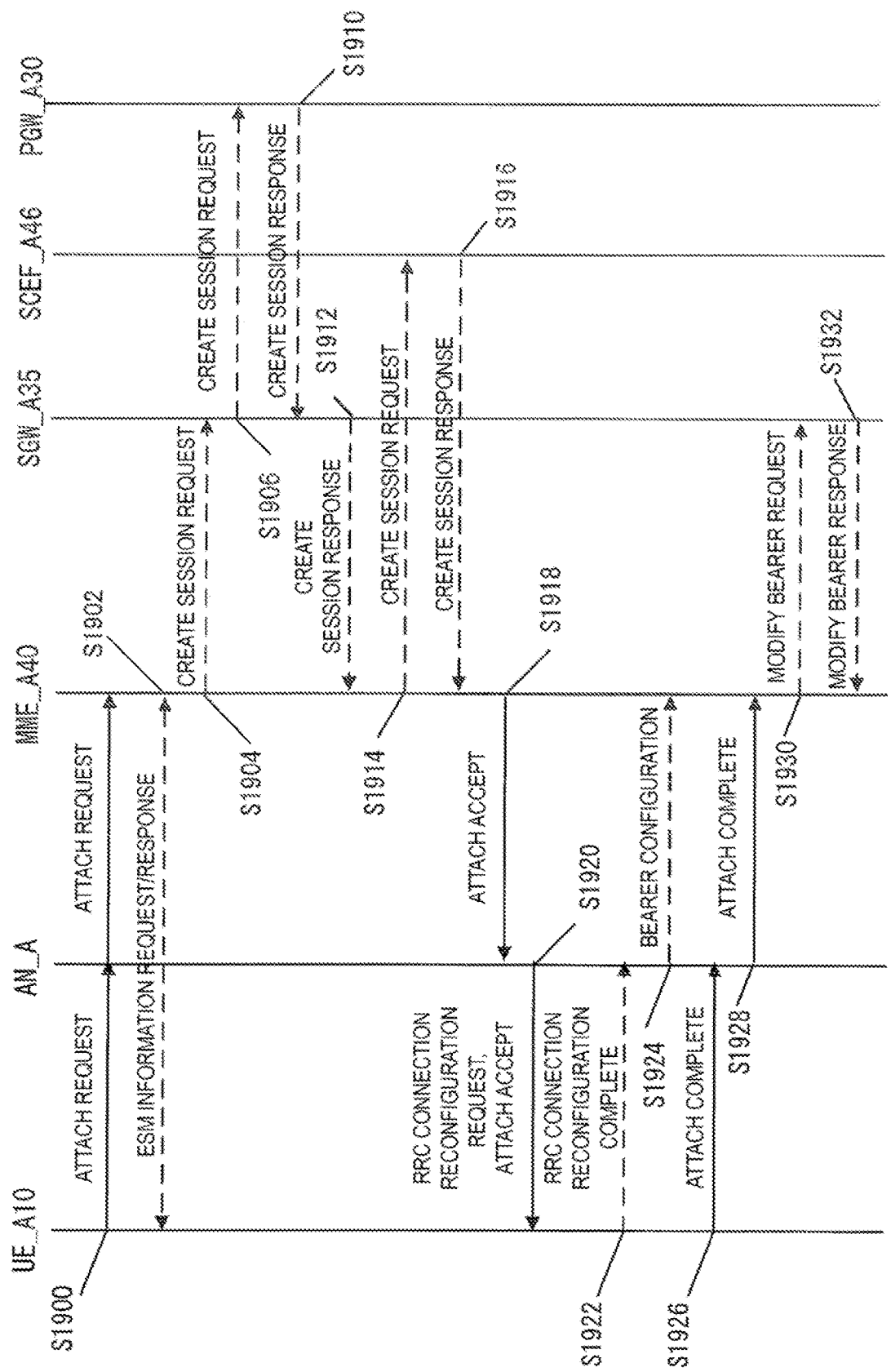
FIG. 19 is a diagram illustrating an attach procedure.

Hereinafter, the steps of the attach procedure will be described with reference to FIG. 19.

First, the UE_A 10 transmits an attach request message to the MME_A 40 (S1900). Note that the UE_A 10 may transmit the attach request message to an apparatus in an access network, and the transmitted attach request message may be transferred to the MME_A 40 via the apparatus in the access network.

Note that selection of an access network and/or an apparatus in an access network may be performed based on information held by the UE_A 10 or may be performed based on information received from a network in advance.

Additionally, the UE_A 10 may transmit a PDU session establishment request message with the attach request message. Hereinafter, in the description of the present embodiment, the attach request message is described as a message in which the attach request message and the PDU session establishment request message are combined. Furthermore, in the description of this procedure, in a case that an expression "identification information is included in the attach request message" is used, the expression means that the identification information is included in the attach request message and/or the PDU session establishment request message.

The UE_A 10 may transmit, in the attach request message, one or more pieces of identification information among the first identification information, the third identification information, the fifth identification information, the sixteenth identification information, the eighteenth identification information, the twentieth identification information, the twenty-second identification information, the twenty-fourth identification information, and the twenty-sixth identification information at least. The UE_A 10 may indicate that the network-initiated PDU session establishment procedure is supported or may indicate capability of supported Service Continuity, by transmitting the attach request message including one or more pieces of identification information among the first identification information, the third identification information, the fifth identification information, the sixteenth identification information, the eighteenth identification information, the twentieth identification information, the twenty-second identification information, the twenty-fourth identification information, and the twenty-sixth identification information.

Here, the UE_A 10 may transmit one or more pieces of identification information among the first identification information, the third identification information, the fifth identification information, the sixteenth identification information, the eighteenth identification information, the twentieth identification information, the twenty-second identification information, the twenty-fourth identification information, and the twenty-sixth identification information in a control message different from the attach request message in the attach procedure, instead of transmitting the one or more pieces of identification information in the attach request message to the MME_A 40.

For example, after transmitting the attach request message, the UE_A 10 may perform a request of EPS Session Management (ESM) information, and a transmission and/or reception procedure of a control message which responds based on the request (S1902).

To be more specific, the MME_A 40 transmits an ESM request message to the UE_A 10. The UE_A 10 receives the ESM request message and transmits a response message to the MME_A 40. In this operation, the UE_A 10 may transmit, in the response message, one or more pieces of identification information among the first identification information, the third identification information, the fifth identification information, the sixteenth identification information, the eighteenth identification information, the twentieth identification information, the twenty-second identification information, the twenty-fourth identification information, and the twenty-sixth identification information.

Here, the UE_A 10 may encrypt and transmit the ESM response message. Furthermore, the UE_A 10 may receive information for encrypting the ESM response message from the MME_A 40. The MME_A 40 may transmit information for encrypting a NAS message to the UE_A 10 with the reception of the attach request message. Note that the NAS message for which the information for encrypting the NAS message is transmitted may be a Security Mode Command message.

The MME_A 40 receives the attach request message. Furthermore, the MME_A 40 acquires one or more pieces of identification information among the first identification information, the third identification information, the fifth identification information, the sixteenth identification information, the eighteenth identification information, the twentieth identification information, the twenty-second identification information, the twenty-fourth identification information, and the twenty-sixth identification information, based on the reception of the attach request message or the reception of the ESM response message. Note that the MME_A 40 may store the acquired identification information.

The MME_A 40 may select and/or determine a type of PDU session that can be established, or may be determine whether or not to establish a PDU session in the attach procedure, based on information included in the attach request message and/or subscriber information and/or an operator policy and/or identification information held by the MME_A 40.

Furthermore, the MME_A 40 may determine to establish the PDU session in the attach procedure, by receiving, with the attach request message, a session establishment request message that will be described later together with the UE-initiated session establishment procedure or any piece of identification information included in the session establishment request message. In other cases, the MME_A 40 may determine not to establish the PDU session in the attach procedure.

In a case of establishing a PDU session in the attach procedure, the MME_A 40 may select and/or determine an apparatus to be used in the PDU session, based on information included in the attach request message and/or subscriber information and/or an operator policy and/or identification information held by the MME_A 40. Specifically, the MME_A 40 may select the SGW_A 35 and/or the PGW_A 30 as a destination of the PDU session establishment or may select the SCEF_A 46 as a destination of the PDU session establishment.

Note that, in a case of establishing a PDU session with the PGW_A 30, the MME_A 40 performs the procedure from S1904 to S1912 with the SGW_A 35 and/or the PGW_A 30.

Specifically, in a case of establishing a PDU session with the PGW_A 30, the MME_A 40 transmits a create session request message to the SGW_A 35 (S1904). The MME_A 40 may transmit, in the create session request message, one or more pieces of identification information among the first identification information to the fifth identification information and/or the sixteenth identification information to the twenty-seventh identification information at least.

The SGW_A 35 receives the create session request message transmitted from the MME_A 40. Furthermore, the SGW_A 35 acquires one or more pieces of identification information among the first identification information to the fifth identification information and/or the sixteenth identification information to the twenty-seventh identification information, based on the reception of the create session request message.

Note that the SGW_A 35 may store the acquired identification information.

Based on the reception of the create session request message, the SGW_A 35 transmits the create session request message to the PGW_A 30 (S1906). The SGW_A 35 may transmit, in the create session request message, one or more pieces of identification information among the first identification information to the fifth identification information and/or the sixteenth identification information to the twenty-seventh identification information at least.

The PGW_A 30 receives the create session request message transmitted from the SGW_A 35. Furthermore, the PGW_A 30 acquires one or more pieces of identification information among the first identification information to the fifth identification information and/or the sixteenth identification information to the twenty-seventh identification information, based on the reception of the create session request message. Note that the PGW_A 30 may store the acquired identification information.

Based on the reception of the create session request message, the PGW_A 30 transmits a create session response message to the SGW_A 35 (S1910). The PGW_A 30 may transmit, in the create session response message, one or more pieces of identification information among the second identification information, the fourth identification information, the seventeenth identification information, the nineteenth identification information, the twenty-first identification information, the twenty-third identification information, the twenty-fifth identification information, and the twenty-seventh identification information at least.

The SGW_A 35 receives the create session response message transmitted from the PGW_A 30. Furthermore, the SGW_A 35 acquires one or more pieces of identification information among the first identification information to the fifth identification information and/or the sixteenth identification information to the twenty-seventh identification information, based on the reception of the create session response message. Note that the SGW_A 35 may store the acquired identification information.

Based on the reception of the create session response message, the SGW_A 35 transmits the create session response message to the MME_A 40 (S1912). The SGW_A 35 may transmit, in the create session response message, one or more pieces of identification information among the first identification information to the fifth identification information and/or the sixteenth identification information to the twenty-seventh identification information at least.

The MME_A 40 receives the create session response message transmitted from the SGW_A 35. Furthermore, the MME_A 40 acquires one or more pieces of identification information among the first identification information to the fifth identification information and/or the sixteenth identification information to the twenty-seventh identification information, based on the reception of the create session response message. Note that the MME_A 40 may store the acquired identification information.

In a case of establishing a PDU session with the SCEF_A 46, the MME_A 40 performs the procedure from S1914 to S1916 with the SCEF_A 46.

Specifically, in a case of establishing a PDU session with the SCEF_A 46, the MME_A 40 transmits a create session request message to the SCEF_A 46 (S1914). The MME_A 40 may transmit, in the create session request message, one or more pieces of identification information among the first identification information to the fifth identification information and/or the sixteenth identification information to the twenty-seventh identification information at least.

The SCEF_A 46 receives the create session request message transmitted from the MME_A 40. Furthermore, the SCEF_A 46 acquires one or more pieces of identification information among the first identification information to the fifth identification information and/or the sixteenth identification information to the twenty-seventh identification information, based on the reception of the create session request message. Note that the SCEF_A 46 may store the acquired identification information.

Based on the reception of the create session request message, the SCEF_A 46 transmits the create session request message to the MME_A 40 (S1916). The SCEF_A 46 may transmit, in the create session response message, one or more pieces of identification information among the first identification information to the fifth identification information and/or the sixteenth identification information to the twenty-seventh identification information at least.

The MME_A 40 receives the create session response message transmitted from the SCEF_A 46. Furthermore, the MME_A 40 acquires one or more pieces of identification information among the first identification information to the fifth identification information and/or the sixteenth identification information to the twenty-seventh identification information, based on the reception of the create session response message. Note that the MME_A 40 may store the acquired identification information.

Note that, in a case of not establishing a PDU session in the attach procedure, the MME_A 40 may not necessarily perform the procedure from S1904 to S1916.

Based on the reception of the attach request message, and/or selection and/or determination of a type of PDU session that can be established, and/or the reception of the create session response message, the MME_A 40 transmits an attach accept message to the apparatus in the access network (S1918).

The MME_A 40 may transmit PDU session establishment accept together with the attach accept message. Hereinafter, in the description of this procedure, the attach accept message is described as a message in which the attach accept message and the PDU session establishment accept are combined. Furthermore, in the description of this procedure, in a case that an expression "identification information is included in the attach accept message" is used, the expression means that the identification information is included in the attach accept message and/or the PDU session establishment accept.

The MME_A 40 may include, in the attach accept message, one or more pieces of identification information among the second identification information, the fourth identification information, the seventeenth identification information, the nineteenth identification information, the twenty-first identification information, the twenty-third identification information, the twenty-fifth identification information, and the twenty-seventh identification information at least.

Note that the attach accept message may be a response message to the attach request message.

The apparatus in the access network receives the attach accept message, and transmits an RRC message including the attach accept message to the UE_A 10 (S1920). Note that the RRC message may be an RRC connection reconfiguration request message or a direct transfer message. Alternatively, the RRC message may be another message between the access network and the UE_A 10.

The UE_A 10 receives the RRC message including the attach accept message. Furthermore, in a case that one or more pieces of identification information among the second identification information, the fourth identification information, the seventeenth identification information, the nineteenth identification information, the twenty-first identification information, the twenty-third identification information, the twenty-fifth identification information, and the twenty-seventh identification information are included in the attach accept message, the UE_A 10 acquires the included pieces of identification information. Note that the UE_A 10 may store the acquired pieces of identification information.

Based on the reception of the attach accept message and/or information included in the attach accept message, the UE_A 10 may recognize whether or not the network-initiated PDU session establishment procedure is supported, may recognize the type of supported access network, or may recognize the type of supported Service Continuity.

More specifically, the UE_A 10 may recognize that the network-initiated session establishment procedure is supported, based on the fourth identification information.

The UE_A 10 may recognize a supported access network, based on the second identification information.

The UE_A 10 may recognize that establishment of the first single-type PDU session is supported, based on the seventeenth identification information, may recognize that establishment of the second single-type PDU session is supported, based on the nineteenth identification information, or may recognize that establishment of the third single-type PDU session is supported, based on the twenty-first identification information.

Furthermore, the UE_A 10 may recognize that establishment of the first multi-type PDU session is supported, based on the twenty-third identification information, may recognize that establishment of the second multi-type PDU session is supported, based on the twenty-fifth identification information, or may recognize that establishment of the third multi-type PDU session is supported, based on the twenty-seventh identification information.

In order to respond to the received RRC message, the UE_A 10 transmits the RRC message to the apparatus in the access network (S1922). The RRC message may be an RRC connection reconfiguration complete message.

The apparatus in the access network receives an RRC connection reconfiguration message and transmits a bearer configuration message to the MME_A 40, based on the reception (S1924).

Note that, in a case of not establishing a PDU session in the attach procedure, the procedure from S1922 to S1924 may be omitted.

The UE_A 10 transmits an RRC message including an attach complete message to the apparatus in the access network, based on the reception of the attach accept message (S1926). Here, the attach complete message may be a response message to the attach accept message. Note that the RRC message to be transmitted while including the attach complete message may be a Direct Transfer message.

The apparatus in the access network receives the RRC message including the attach complete message and transmits the attach complete message to the MME_A 40 (S1928).

The MME_A 40 receives the attach complete message.

The MME_A 40 may transmit a modify bearer request message to the SGW_A 35, based on the reception of the attach complete message (S1930).

The SGW_A 35 receives the modify bearer request message.

The SGW_A 35 may transmit a modify bearer response message to the MME_A 40, based on the reception of the modify bearer request message (S1932).

Note that the modify bearer request message may be a response message to the modify bearer request message.

The MME_A 40 receives the modify bearer response message.

By the above-described steps, the UE_A 10 connects to the network, and completes the attach procedure. With the completion of the attach procedure, the UE_A 10 and/or the core network_A 90 can recognize and store whether or not the network-initiated session establishment procedure is supported, and/or the type of supported access network and/or the type of supported Service Continuity.

1.3.2. Examples of PDU Session Establishment Procedure

Next, examples of the PDU session establishment procedure will be described.

The PDU session establishment procedure includes a UE-initiated PDU session establishment procedure, which starts under the initiative of the UE_A 10, and a network-initiated PDU session establishment procedure. Note that the PDU session establishment procedure is a procedure in which the UE_A 10 establishes a PDU session to be used for transmission and/or reception of user data, with the core network_A 90. The UE_A 10 and/or the MME_A 40 and/or the SGW_A 35 and/or the PGW_A 30 and/or the SCEF_A 46 establishes a communication path for transmission and/or reception of user data with the data network, through the PDU session establishment procedure.

Note that the PDU session establishment procedure may be performed at any timing after the attach. Moreover, the PDU session establishment procedure under the initiative of the UE_A 10 may be performed in the attach procedure performed at initial connection to the core network A_A 90, for example, when the terminal is switched on. The network-initiated PDU session establishment procedure may be performed based on the reception of user data and/or a control message from the data network by the PGW_A 30 and/or the SCEF_A 46, or may be performed based on update of the operator policy.

The UE_A 10 establishes the PDU session with the PGW_A 30 and/or the SCEF_A 46 in a case of completion of the PDU session establishment procedure. Note that the UE_A 10 and/or the core network_A 90 can establish multiple PDU sessions by performing the PDU session establishment procedure multiple times.

The UE_A 10 and/or the core network_A 90 performs the PDU session establishment procedure by including, in individual messages, identification information indicating an APN and/or a TFT and/or an application and/or a data network and/or a network slice and/or an access network different from those associated with the established PDU session, and can thereby newly establish a PDU session with the different APN and/or TFT and/or application and/or data network and/or network slice and/or access network corresponding to that included the individual message.

Alternatively, the UE_A 10 and/or the core network_A 90 performs the PDU session establishment procedure by including, in individual messages, identification information indicating an APN and/or a TFT and/or an application and/or a data network and/or a network slice and/or an access network that are the same as those associated with the established PDU session, and can thereby newly establish a PDU session with the same APN and/or TFT and/or application and/or data network and/or network slice and/or access network corresponding to that included the individual message.

1.3.2.1. Example of UE-Initiated PDU Session Establishment Procedure

Figure 20:
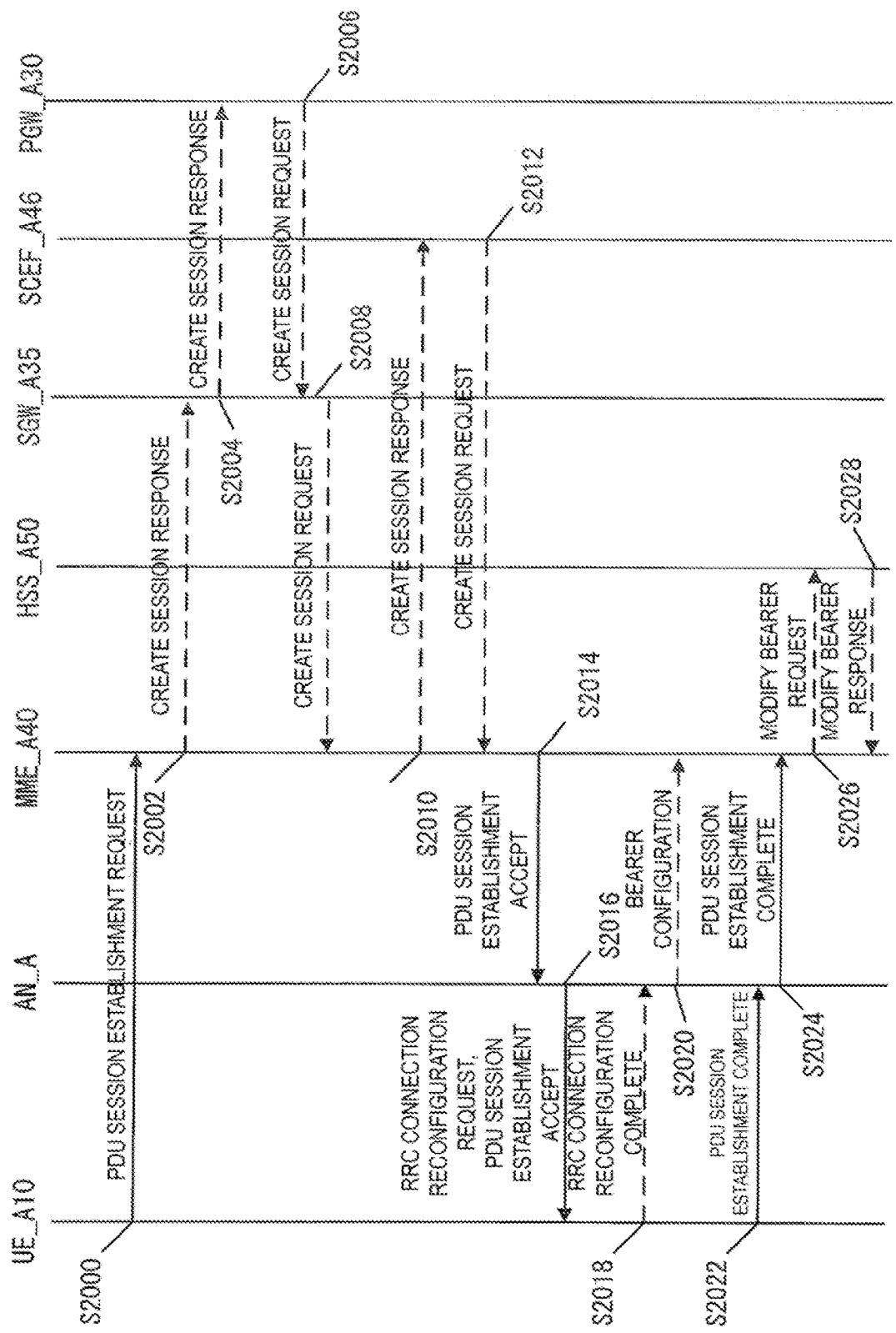
FIG. 20 is a diagram illustrating a UE-initiated PDU session establishment procedure.

Next, an example of steps of the UE-initiated PDU session procedure will be described with reference to FIG. 20.

Note that the UE-initiated PDU session establishment procedure is a procedure for establishing a PDU session with the PGW_A 30 and/or the SCEF_A 46 under the initiative of the UE.

First, the UE_A 10 selects an access network to be used to establish a PDU session. Note that, for the selection of an access network, the UE_A 10 may use information acquired from a network in the attach procedure, may use information acquired from a network outside the attach procedure, or may use information stored in the UE_A 10.

Next, the UE_A 10 initiates the UE-initiated PDU session establishment procedure by transmitting a PDU session establishment request message to the MME_A 40 via the selected access network to start (S2000). Note that the UE_A 10 may transmit the PDU session establishment request message to an apparatus in the selected access network, and the transmitted PDU session establishment request message may be transferred to the MME_A 40 via the apparatus in the selected access network.

The UE_A 10 may include, in the PDU session establishment request message, one or more pieces of identification information among the first identification information, the sixth identification information, the seventh identification information, the eighth identification information, the ninth identification information, the tenth identification information, the sixteenth identification information, the eighteenth identification information, the twentieth identification information, the twenty-second identification information, the twenty-fourth identification information, and the twenty-sixth identification information, and transmit them.

The UE_A 10 may indicate capability of supported Service Continuity by transmitting the PDU session establishment request message including one or more pieces of identification information among the sixteenth identification information, the eighteenth identification information, the twentieth identification information, the twenty-second identification information, the twenty-fourth identification information, and the twenty-sixth identification information. The UE_A 10 may request in more detail the type of PDU session to be established, by transmitting the PDU session establishment request message including one or more pieces of identification information among the sixth identification information to the tenth identification information.

The MME_A 40 receives the PDU session establishment request message transmitted from the UE_A 10. Furthermore, based on the reception of the PDU session establishment request message, the MME_A 40 acquires one or more pieces of identification information among the first identification information, the sixth identification information, the seventh identification information, the eighth identification information, the ninth identification information, the tenth identification information, the sixteenth identification information, the eighteenth identification information, the twentieth identification information, the twenty-second identification information, the twenty-fourth identification information, and the twenty-sixth identification information. Note that the MME_A 40 may store the acquired identification information.

Based on the reception of the PDU session establishment request message and/or information included in the PDU session establishment request message, the MME_A 40 may recognize the type of supported Service Continuity or may recognize that the PDU session has been established.

More specifically, the MME_A 40 may recognize that establishment of the first single-type PDU session is supported by the UE_A 10, based on the sixteenth identification information, may recognize that establishment of the second single-type PDU session is supported by the UE_A 10, based on the eighteenth identification information, or may recognize that establishment of the third single-type PDU session is supported by the UE_A 10, based on the twentieth identification information.

Furthermore, the MME_A 40 may recognize that establishment of the first multi-type PDU session is supported by the UE_A 10, based on the twenty-second identification information, may recognize that establishment of the second multi-type PDU session is supported by the UE_A 10, based on the twenty-fourth identification information, or may recognize that establishment of the third multi-type PDU session is supported by the UE_A 10, based on the twenty-sixth identification information.

The MME_A 40 may recognize in more detail the type of PDU session requested by the UE_A 10 to establish, based on one or more pieces of identification information among the sixth identification information to the tenth identification information. For example, the MME_A 40 may recognize the IP address allocated to the UE_A 10, based on the seventh identification information.

The MME_A 40 may store one or more pieces of identification information among the sixth identification information to the fifteenth identification information in association with the PDU session to be established. In other words, the PDU session to be established may be associated with the one or more pieces of identification information among the sixth identification information to the fifteenth identification information. For example, the PDU session to be established may be associated with the IP address allocated to the UE_A 10.

The MME_A 40 may select and/or determine a type of PDU session that can be established, based on information included in the PDU session establishment request message and/or subscriber information and/or an operator policy and/or identification information held by the MME_A 40.

The MME_A 40 may select and/or determine an apparatus used for a PDU session to be established, based on information included in the PDU session establishment request message and/or subscriber information and/or an operator policy and/or identification information held by the MME_A 40. Specifically, the MME_A 40 may select the SGW_A 35 and/or the PGW_A 30 as a destination of the PDU session establishment or may select the SCEF_A 46 as a destination of the PDU session establishment.

Here, in a case of establishing a PDU session with the PGW_A 30, the MME_A 40 performs the procedures from S2002 to S2008 with the SGW_A 35 and/or the PGW_A 30.

Specifically, in a case of establishing a PDU session with the PGW_A 30, the MME_A 40 transmits a create session request message to the SGW_A 35 (S2002). The MME_A 40 may transmit, in the create session request message, one or more pieces of identification information among the sixth identification information to the twenty-seventh identification information at least.

The SGW_A 35 receives the create session request message transmitted from the MME_A 40. Furthermore, the SGW_A 35 acquires one or more pieces of identification information among the sixth identification information to the twenty-seventh identification information, based on the reception of the create session request message. Note that the SGW_A 35 may store the acquired identification information.

Based on the reception of the create session request message, the SGW_A 35 transmits the create session request message to the PGW_A 30 (S2004). The SGW_A 35 may transmit, in the create session request message, one or more pieces of identification information among the sixth identification information to the twenty-seventh identification information at least.

The PGW_A 30 receives the create session request message transmitted from the SGW_A 35. Furthermore, the PGW_A 30 acquires one or more pieces of identification information among the sixth identification information to the twenty-seventh identification information, based on the reception of the create session request message. Note that the PGW_A 30 may store the acquired identification information.

Based on the reception of the create session request message, the PGW_A 30 transmits a create session response message to the SGW_A 35 (S2006). The PGW_A 30 may transmit, in the create session response message, one or more pieces of identification information among the eleventh identification information, the twelfth identification information, the thirteenth identification information, the fourteenth identification information, the fifteenth identification information, the seventeenth identification information, the nineteenth identification information, the twenty-first identification information, the twenty-third identification information, the twenty-fifth identification information, and the twenty-seventh identification information at least.

The SGW_A 35 receives the create session response message transmitted from the PGW_A 30. Furthermore, based on the reception of the create session response message, the SGW_A 35 acquires one or more pieces of identification information among the eleventh identification information, the twelfth identification information, the thirteenth identification information, the fourteenth identification information, the fifteenth identification information, the seventeenth identification information, the nineteenth identification information, the twenty-first identification information, the twenty-third identification information, the twenty-fifth identification information, and the twenty-seventh identification information. Note that the SGW_A 35 may store the acquired identification information.

Based on the reception of the create session response message, the SGW_A 35 transmits the create session response message to the MME_A 40 (S2008). The SGW_A 35 may transmit, in the create session response message, one or more pieces of identification information among the eleventh identification information, the twelfth identification information, the thirteenth identification information, the fourteenth identification information, the fifteenth identification information, the seventeenth identification information, the nineteenth identification information, the twenty-first identification information, the twenty-third identification information, the twenty-fifth identification information, and the twenty-seventh identification information at least.

The MME_A 40 receives the create session response message transmitted from the SGW_A 35. Furthermore, based on the reception of the create session response message, the MME_A 40 acquires one or more pieces of identification information among the eleventh identification information, the twelfth identification information, the thirteenth identification information, the fourteenth identification information, the fifteenth identification information, the seventeenth identification information, the nineteenth identification information, the twenty-first identification information, the twenty-third identification information, the twenty-fifth identification information, and the twenty-seventh identification information. Note that the MME_A 40 may store the acquired identification information.

In a case of establishing a PDU session with the SCEF_A 46, the MME_A 40 performs the procedure from S2010 to S2012 with the SCEF_A 46.

Specifically, in a case of establishing a PDU session with the SCEF_A 46, the MME_A 40 transmits a create session request message to the SCEF_A 46 (S2010). The MME_A 40 may transmit, in the create session request message, one or more pieces of identification information among the sixth identification information to the twenty-seventh identification information at least.

The SCEF_A 46 receives the create session request message transmitted from the MME_A 40. Furthermore, the SCEF_A 46 acquires one or more pieces of identification information among the sixth identification information to the twenty-seventh identification information, based on the reception of the create session request message. Note that the SCEF_A 46 may store the acquired identification information.

Based on the reception of the create session request message, the SCEF_A 46 transmits the create session request message to the MME_A 40 (S2012). The SCEF_A 46 may transmit, in the create session response message, one or more pieces of identification information among the eleventh identification information, the twelfth identification information, the thirteenth identification information, the fourteenth identification information, the fifteenth identification information, the seventeenth identification information, the nineteenth identification information, the twenty-first identification information, the twenty-third identification information, the twenty-fifth identification information, and the twenty-seventh identification information at least.

The MME_A 40 receives the create session response message transmitted from the SCEF_A 46. Furthermore, based on the reception of the create session response message, the MME_A 40 acquires one or more pieces of identification information among the eleventh identification information, the twelfth identification information, the thirteenth identification information, the fourteenth identification information, the fifteenth identification information, the seventeenth identification information, the nineteenth identification information, the twenty-first identification information, the twenty-third identification information, the twenty-fifth identification information, and the twenty-seventh identification information. Note that the MME_A 40 may store the acquired identification information.

Based on the reception of the PDU session establishment request message and/or selection and/or determination of a type of PDU session that can be established and/or the reception of the create session response message, the MME_A 40 transmits a PDU session establishment accept message to an apparatus in the access network (S2014).

The MME_A 40 may include, in the PDU session establishment accept message, one or more pieces of identification information among the eleventh identification information, the twelfth identification information, the thirteenth identification information, the fourteenth identification information, the fifteenth identification information, the seventeenth identification information, the nineteenth identification information, the twenty-first identification information, the twenty-third identification information, the twenty-fifth identification information, and the twenty-seventh identification information at least.

Note that the PDU session establishment accept message may be a response message to the PDU session establishment request message.

The apparatus in the access network receives the PDU session establishment accept message and transmits an RRC message including the PDU session establishment accept message to the UE_A 10 (S2016). Note that the RRC message may be an RRC connection reconfiguration request message. Alternatively, the RRC message may be another message between the access network and the UE_A 10.

The UE_A 10 receives the RRC message including the PDU session establishment accept message. Furthermore, in a case that one or more pieces of identification information among the eleventh identification information, the twelfth identification information, the thirteenth identification information, the fourteenth identification information, the fifteenth identification information, the seventeenth identification information, the nineteenth identification information, the twenty-first identification information, the twenty-third identification information, the twenty-fifth identification information, and the twenty-seventh identification information are included in the PDU session establishment accept message, the UE_A 10 acquires the included pieces of identification information. Note that the UE_A 10 may store the acquired pieces of identification information.

Based on the reception of the PDU session establishment accept message and/or information included in the PDU session establishment accept message, the UE_A 10 may recognize the type of supported Service Continuity or may recognize that the PDU session has been established.

More specifically, the UE_A 10 may recognize that establishment of the first single-type PDU session is supported by a network, based on the seventeenth identification information, may recognize that establishment of the second single-type PDU session is supported by a network, based on the nineteenth identification information, or may recognize that establishment of the third single-type PDU session is supported by a network, based on the twenty-first identification information.

Furthermore, the UE_A 10 may recognize that establishment of the first multi-type PDU session is supported by a network, based on the twenty-third identification information, may recognize that establishment of the second multi-type PDU session is supported by a network, based on the twenty-fifth identification information, or may recognize that establishment of the third multi-type PDU session is supported by a network, based on the twenty-seventh identification information.

The UE_A 10 may recognize in more detail the type of established PDU session, based on one or more pieces of identification information among the eleventh identification information to the fifteenth identification information. For example, the UE_A 10 may recognize the IP address allocated to the UE_A 10, based on the twelfth identification information.

The UE_A 10 may store one or more pieces of identification information among the sixth identification information to the fifteenth identification information in association with the PDU session to be established. In other words, the PDU session to be established may be associated with the one or more pieces of identification information among the sixth identification information to the fifteenth identification information. For example, the PDU session to be established may be associated with the IP address allocated to the UE_A 10.

In order to respond to the received RRC message, the UE_A 10 may transmit the RRC message to an apparatus in the access network (S2018). The RRC message may be an RRC connection reconfiguration complete message.

The apparatus in the access network may receive the RRC connection reconfiguration message and transmit a bearer configuration message to the MME_A 40, based on the reception (S2020).

The UE_A 10 transmits the RRC message including a PDU session establishment complete message to an apparatus in the access network, based on the reception of the PDU session establishment accept message (S2022). Here, the PDU session establishment complete message may be a response message to the PDU session establishment accept message. Note that the RRC message to be transmitted while including the PDU session establishment complete message may be a Direct Transfer message.

The apparatus in the access network receives the RRC message including the PDU session establishment complete message and transmits the PDU session establishment complete message to the MME_A 40 (S2024).

The MME_A 40 receives the PDU session establishment complete message.

The MME_A 40 may transmit a modify bearer request message to the SGW_A 35, based on the reception of the PDU session establishment complete message (S2026).

The SGW_A 35 receives the modify bearer request message.

The SGW_A 35 may transmit a modify bearer response message to the MME_A 40, based on the reception of the modify bearer request message (S2028).

Note that the modify bearer request message may be a response message to the modify bearer request message.

The MME_A 40 receives the modify bearer response message.

Through the above steps, the UE-initiated PDU session establishment procedure is completed. With the completion of the UE-initiated PDU session establishment procedure, the UE_A 10 and/or the core network A 90 can establish the PDU session. Moreover, with the completion of the UE-initiated PDU session establishment procedure, the UE_A 10 and/or the core network_A 90 can recognize and store the type of supported Service Continuity.

Specifically, the UE_A 10 and/or the MME_A 40 and/or the SGW_A 35 and/or the PGW_A 30 and/or the SCEF_A 46 may recognize that establishment of the first single-type PDU session is supported, based on the sixteenth identification information and/or the seventeenth identification information, may recognize that establishment of the second single-type PDU session is supported, based on the eighteenth identification information and/or the nineteenth identification information, or may recognize that establishment of the third single-type PDU session is supported, based on the twentieth identification information and/or the twenty-first identification information.

Furthermore, the UE_A 10 and/or the MME_A 40 and/or the SGW_A 35 and/or the PGW_A 30 and/or the SCEF_A 46 may recognize that establishment of the first multi-type PDU session is supported, based on the twenty-second identification information and/or the twenty-third identification information, may recognize that establishment of the second multi-type PDU session is supported, based on the twenty-fourth identification information and/or the twenty-fifth identification information, or may recognize that establishment of the third multi-type PDU session is supported, based on the twenty-sixth identification information and/or the twenty-seventh identification information.

1.3.2.2. Examples of Network-Initiated PDU Session Establishment Procedure

Next, examples of the steps of the network-initiated PDU session establishment procedure will be described. Note that the network-initiated PDU session establishment procedure is a procedure for establishing a PDU session between the UE_A 10 and the PGW_A 30 and/or the SCEF_A 46 under the initiative of the PGW_A 30 and/or the SCEF_A 46 and/or the MME_A 40. The network-initiated PDU session establishment procedure may include a first network-initiated PDU session establishment procedure and a second network-initiated PDU session establishment procedure.

Figure 21:
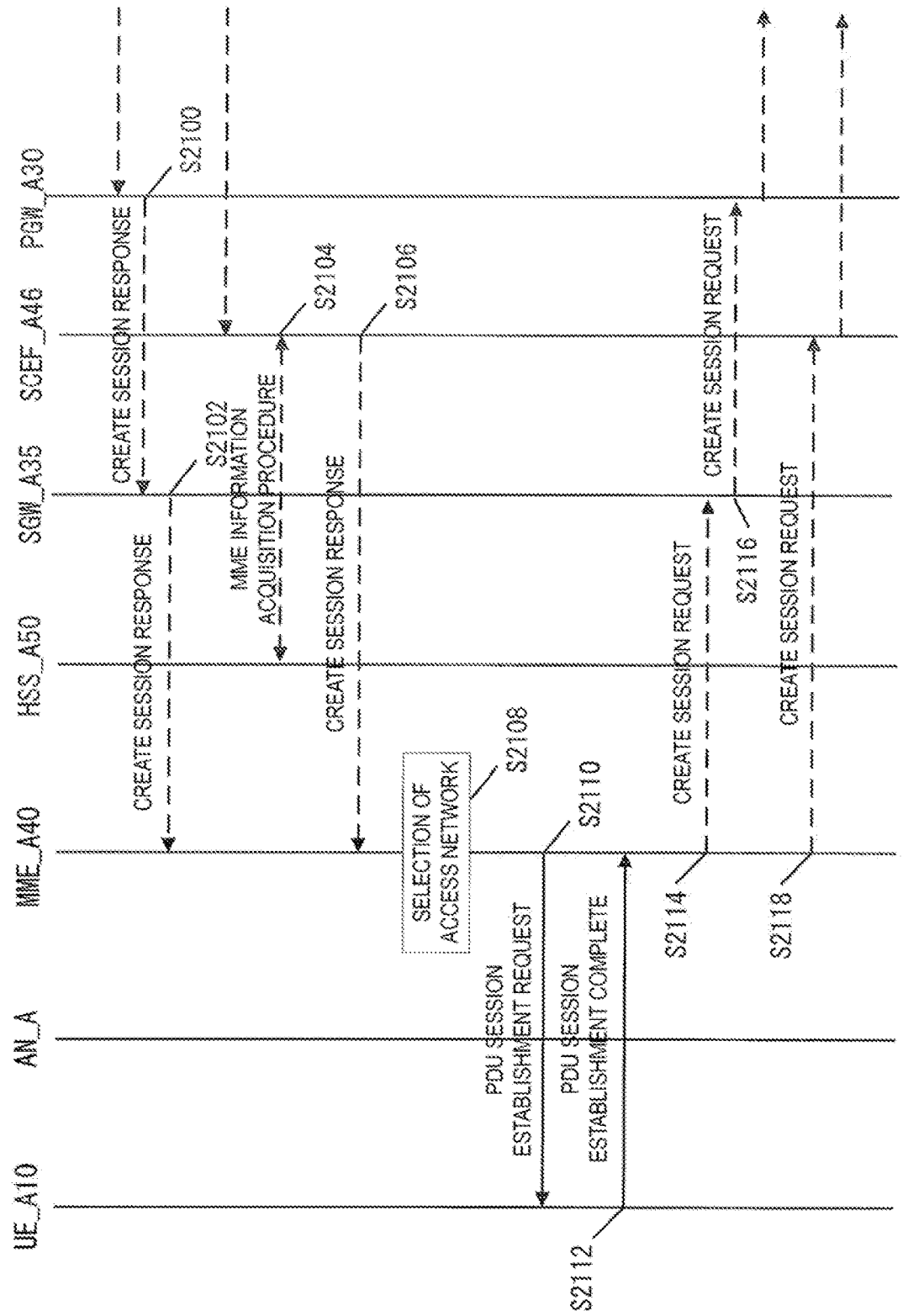
FIG. 21 is a diagram illustrating a first network-initiated PDU session establishment procedure.

1.3.2.2.1. Example of First Network-Initiated PDU Session Establishment Procedure Next, an example of the steps of the first network-initiated PDU session establishment procedure will be described with reference to FIG. 21. The first network-initiated PDU session establishment procedure is a procedure in which the core network A 90 selects an access network to be used for establishment of a PDU session and establishes a PDU session with the UE_A 10.

The first network-initiated PDU session establishment procedure includes a PGW_A 30 initiated procedure, a SCEF_A 46 initiated procedure, and a MME_A 40 initiated procedure. Note that the procedure in S2100 to S2102 is performed in the PGW_A 30 initiated procedure, while the procedure in S2104 to S2106 is performed in the SCEF_A 46 initiated procedure. Moreover, in the MME_A 40 initiated procedure, the procedure is started from S2108 without performing the procedure in S2100 to S2106. Alternatively, the MME_A 40 may transmit a control message for creating a session under the initiative of a network to the PGW_A 30, and the PGW_A may start the PGW_A 30 initiated procedure, based on the reception of the control message transmitted from the MME_A 40. Similarly, the MME_A 40 may transmit a control message for creating a session under the initiative of a network to the SCEF_A 46, and the SCEF_A 46 may start the SCEF_A 46 initiated procedure, based on the reception of the control message transmitted from the MME_A 40. In this case, the MME_A 40 may perform a process of selecting an access network (S2108) before the transmission of the control message. Note that the MME_A 40 may transmit, in the control message, one or more pieces of identification information among the second identification information, the sixth identification information, the seventh identification information, the eighth identification information, the ninth identification information, the tenth identification information, the seventeenth identification information, the nineteenth identification information, the twenty-first identification information, the twenty-third identification information, the twenty-fifth identification information, and the twenty-seventh identification information at least.

First, a description will be given of the steps of the procedure from S2100 to S2106.

In a case of the PGW_30 initiated procedure, the PGW_A 30 transmits a create session request message to the SGW_A 35 (S2100). The PGW_A 30 may transmit, in the create session request message, one or more pieces of identification information among the second identification information, the sixth identification information, the seventh identification information, the eighth identification information, the ninth identification information, the tenth identification information, the seventeenth identification information, the nineteenth identification information, the twenty-first identification information, the twenty-third identification information, the twenty-fifth identification information, and the twenty-seventh identification information at least.

The SGW_A 35 receives the create session request message transmitted from the PGW_A 30. Furthermore, based on the reception of the create session request message, the SGW_A 35 acquires one or more pieces of identification information among the second identification information, the sixth identification information, the seventh identification information, the eighth identification information, the ninth identification information, the tenth identification information, the seventeenth identification information, the nineteenth identification information, the twenty-first identification information, the twenty-third identification information, the twenty-fifth identification information, and the twenty-seventh identification information. Note that the SGW_A 35 may store the acquired identification information.

The SGW_A 35 transmits the create session request message to the MME_A 40 (S2102). The SGW_A 35 may transmit, in the create session request message, one or more pieces of identification information among the second identification information, the sixth identification information, the seventh identification information, the eighth identification information, the ninth identification information, the tenth identification information, the seventeenth identification information, the nineteenth identification information, the twenty-first identification information, the twenty-third identification information, the twenty-fifth identification information, and the twenty-seventh identification information at least.

The MME_A 40 receives the create session request message transmitted from the SGW_A 35. Furthermore, based on the reception of the create session request message, the MME_A 40 acquires one or more pieces of identification information among the second identification information, the sixth identification information, the seventh identification information, the eighth identification information, the ninth identification information, the tenth identification information, the seventeenth identification information, the nineteenth identification information, the twenty-first identification information, the twenty-third identification information, the twenty-fifth identification information, and the twenty-seventh identification information. Note that the MME_A 40 may store the acquired identification information.

Next, in a case of the SCEF_A 46 initiated procedure, the SCEF_A 46 performs a MME information acquisition procedure with the HSS_A 50 (S2104). Based on the MME information acquisition procedure, the SCEF_A 46 selects and/or determines the MME_A 40 to be used for establishment of the PDU session and acquires information of the MME_A 40. Note that the SCEF_A 46 may select and/or determine the MME_A 40 to be used for establishment of the PDU session in a method other than the MME information acquisition procedure.

Based on the selection and/or determination of the MME_A 40 to be used for the establishment of the PDU session, the SCEF_A 46 transmits a create session request message to the SGW_A 35 (S2106). The PGW_A 30 may transmit, in the create session request message, one or more pieces of identification information among the second identification information, the sixth identification information, the seventh identification information, the eighth identification information, the ninth identification information, the tenth identification information, the seventeenth identification information, the nineteenth identification information, the twenty-first identification information, the twenty-third identification information, the twenty-fifth identification information, and the twenty-seventh identification information at least.

The MME_A 40 receives the create session request message transmitted from the SCEF_A 46. Furthermore, based on the reception of the create session request message, the MME_A 40 acquires one or more pieces of identification information among the second identification information, the sixth identification information, the seventh identification information, the eighth identification information, the ninth identification information, the tenth identification information, the seventeenth identification information, the nineteenth identification information, the twenty-first identification information, the twenty-third identification information, the twenty-fifth identification information, and the twenty-seventh identification information. Note that the MME_A 40 may store the acquired identification information.

Through the above steps, the procedure from S2100 to S2106 ends.

Next, the MME_A 40 selects an access network to be used for a PDU session to be established (S2108). Note that the MME_A 40 may perform selection of an access network, based on the reception of the create session request message, or may perform selection of an access network in a case of update of the operator policy or at any timing. For the selection of an access network, the MME_A 40 may use information acquired from the UE_A 10 in a procedure, such as the attach procedure, may use the operator policy, or may use information stored in the MME_A 40.

Based on the selection of an access network to be used for the PDU session to be established, the MME_A 40 transmits a PDU session establishment request message to the UE_A 10 (S2110). The MME_A 40 may transmit, in the PDU session establishment request message, one or more pieces of identification information among the second identification information, the sixth identification information, the seventh identification information, the eighth identification information, the ninth identification information, the tenth identification information, the seventeenth identification information, the nineteenth identification information, the twenty-first identification information, the twenty-third identification information, the twenty-fifth identification information, and the twenty-seventh identification information at least.

The MME_A 40 and/or the core network_A 90 may indicate capability of supported Service Continuity by transmitting the PDU session establishment request message including one or more pieces of identification information among the seventeenth identification information, the nineteenth identification information, the twenty-first identification information, the twenty-third identification information, the twenty-fifth identification information, and the twenty-seventh identification information.

The MME_A 40 and/or the core network_A 90 may request in more detail the type of PDU session to establish, by transmitting the PDU session establishment request message including one or more pieces of identification information among the sixth identification information to the tenth identification information.

Note that the MME_A 40 may transmit the PDU session establishment request message to an apparatus in the selected access network, and the transmitted PDU session establishment request message may be transferred to the UE_A 10 via the apparatus in the access network. In this case, the apparatus in the access network may transmit the PDU session establishment request message in an RRC message. Note that the RRC message may be an RRC connection reconfiguration request message.

The UE_A 10 receives the PDU session establishment request message transmitted from the MME_A 40 and/or the RRC message transmitted from the apparatus in the access network. Furthermore, based on the reception of the PDU session establishment request message, the UE_A 10 acquires one or more pieces of identification information among the second identification information, the sixth identification information, the seventh identification information, the eighth identification information, the ninth identification information, the tenth identification information, the seventeenth identification information, the nineteenth identification information, the twenty-first identification information, the twenty-third identification information, the twenty-fifth identification information, and the twenty-seventh identification information. Note that the UE_A 10 may store the acquired pieces of identification information.

Based on the reception of the PDU session establishment request message and/or information included in the PDU session establishment request message, the UE_A 10 may recognize the type of supported Service Continuity or may recognize that the PDU session has been established.

More specifically, the UE_A 10 may recognize that establishment of the first single-type PDU session is supported by a network, based on the seventeenth identification information, may recognize that establishment of the second single-type PDU session is supported by a network, based on the nineteenth identification information, or may recognize that establishment of the third single-type PDU session is supported by a network, based on the twenty-first identification information.

Furthermore, the UE_A 10 may recognize that establishment of the first multi-type PDU session is supported by a network, based on the twenty-third identification information, may recognize that establishment of the second multi-type PDU session is supported by a network, based on the twenty-fifth identification information, or may recognize that establishment of the third multi-type PDU session is supported by a network, based on the twenty-seventh identification information.

The UE_A 10 may recognize in more detail the type of PDU session to be established, based on one or more pieces of identification information among the sixth identification information to the tenth identification information. For example, the UE_A 10 may recognize the IP address allocated to the UE_A 10, based on the seventh identification information.

The UE_A 10 may store one or more pieces of identification information among the sixth identification information to the fifteenth identification information in association with the PDU session to be established. In other words, the PDU session to be established may be associated with the one or more pieces of identification information among the sixth identification information to the fifteenth identification information. For example, the PDU session to be established may be associated with the IP address allocated to the UE_A 10.

Based on the reception of the PDU session establishment request message, the UE_A 10 transmits a PDU session establishment accept message to the MME_A 40 (S2112). The UE_A 10 may transmit, in the PDU session establishment accept message, one or more pieces of identification information among the eleventh identification information, the twelfth identification information, the thirteenth identification information, the fourteenth identification information, the fifteenth identification information, the sixteenth identification information, the eighteenth identification information, the twentieth identification information, the twenty-second identification information, the twenty-fourth identification information, and the twenty-sixth identification information at least.

Note that the UE_A 10 may transmit the PDU session establishment accept message to an apparatus in the access network, and the transmitted PDU session establishment accept message may be transferred to the MME_A 40 via the apparatus in the access network. In this case, the UE_A 10 may transmit the PDU session establishment accept message in an RRC message. Note that the RRC message may be a direct transfer message.

Based on the reception of the RRC message, the UE_A 10 may transmit an RRC message to an apparatus in the access network, separately from transmission of the PDU session establishment accept message. In this case, the RRC message may be an RRC connection reconfiguration complete message.

The MME_A 40 receives the PDU session establishment accept message transmitted from the UE_A 10. Furthermore, based on the reception of the PDU session establishment accept message, the MME_A 40 acquires one or more pieces of identification information among the eleventh identification information, the twelfth identification information, the thirteenth identification information, the fourteenth identification information, the fifteenth identification information, the sixteenth identification information, the eighteenth identification information, the twentieth identification information, the twenty-second identification information, the twenty-fourth identification information, and the twenty-sixth identification information. Note that the MME_A 40 may store the acquired identification information.

Based on the reception of the PDU session establishment accept message and/or information included in the PDU session establishment accept message, the MME_A 40 may recognize the type of supported Service Continuity or may recognize that the PDU session has been established.

More specifically, the MME_A 40 may recognize that establishment of the first single-type PDU session is supported by the UE_A 10, based on the sixteenth identification information, may recognize that establishment of the second single-type PDU session is supported by the UE_A 10, based on the eighteenth identification information, or may recognize that establishment of the third single-type PDU session is supported by the UE_A 10, based on the twentieth identification information.

Furthermore, the MME_A 40 may recognize that establishment of the first multi-type PDU session is supported by the UE_A 10, based on the twenty-second identification information, may recognize that establishment of the second multi-type PDU session is supported by the UE_A 10, based on the twenty-fourth identification information, or may recognize that establishment of the third multi-type PDU session is supported by the UE_A 10, based on the twenty-sixth identification information.

The MME_A 40 may recognize in more detail the type of PDU session to be established, based on one or more pieces of identification information among the eleventh identification information to the fifteenth identification information. For example, the MME_A 40 may recognize the IP address allocated to the UE_A 10, based on the twelfth identification information.

The MME_A 40 may store one or more pieces of identification information among the sixth identification information to the fifteenth identification information in association with the PDU session to be established. In other words, the PDU session to be established may be associated with the one or more pieces of identification information among the sixth identification information to the fifteenth identification information. For example, the PDU session to be established may be associated with the IP address allocated to the UE_A 10.

Next, based on the reception of the PDU session establishment accept message, the MME_A 40 transmits a create session response message.

In a case that the first network-initiated PDU session establishment procedure is under the initiative of the PGW_A 30, the MME_A 40 transmits the create session response message to the SGW_A 35, based on the reception of the PDU session establishment accept message (S2114). The MME_A 40 may transmit, in the create session response message, one or more pieces of identification information among the eleventh identification information, the twelfth identification information, the thirteenth identification information, the fourteenth identification information, the fifteenth identification information, the sixteenth identification information, the eighteenth identification information, the twentieth identification information, the twenty-second identification information, the twenty-fourth identification information, and the twenty-sixth identification information at least.

The SGW_A 35 receives the create session response message transmitted from the MME_A 40. Furthermore, based on the reception of the create session response message, the SGW_A 35 acquires one or more pieces of identification information among the eleventh identification information, the twelfth identification information, the thirteenth identification information, the fourteenth identification information, the fifteenth identification information, the sixteenth identification information, the eighteenth identification information, the twentieth identification information, the twenty-second identification information, the twenty-fourth identification information, and the twenty-sixth identification information. Note that the SGW_A 35 may store the acquired identification information.

Based on the reception of the create session response message, the SGW_A 35 transmits the create session response message to the PGW_A 30 (S2116). The SGW_A 35 may transmit, in the create session response message, one or more pieces of identification information among the eleventh identification information, the twelfth identification information, the thirteenth identification information, the fourteenth identification information, the fifteenth identification information, the sixteenth identification information, the eighteenth identification information, the twentieth identification information, the twenty-second identification information, the twenty-fourth identification information, and the twenty-sixth identification information at least.

The PGW_A 30 receives the create session response message transmitted from the SGW_A 35. Furthermore, based on the reception of the create session response message, the PGW_A 30 acquires one or more pieces of identification information among the eleventh identification information, the twelfth identification information, the thirteenth identification information, the fourteenth identification information, the fifteenth identification information, the sixteenth identification information, the eighteenth identification information, the twentieth identification information, the twenty-second identification information, the twenty-fourth identification information, and the twenty-sixth identification information. Note that the PGW_A 30 may store the acquired identification information.

In a case that the first network-initiated PDU session establishment procedure is under the initiative of the SCEF_A 46, the MME_A 40 transmits a create session response message to the SCEF_A 46, based on the reception of the PDU session establishment accept message. (S2118). The MME_A 40 may transmit, in the create session response message, one or more pieces of identification information among the eleventh identification information, the twelfth identification information, the thirteenth identification information, the fourteenth identification information, the fifteenth identification information, the sixteenth identification information, the eighteenth identification information, the twentieth identification information, the twenty-second identification information, the twenty-fourth identification information, and the twenty-sixth identification information at least.

The SCEF_A 46 receives the create session response message transmitted from the MME_A 40. Furthermore, based on the reception of the create session response message, the SCEF_A 46 acquires one or more pieces of identification information among the eleventh identification information, the twelfth identification information, the thirteenth identification information, the fourteenth identification information, the fifteenth identification information, the sixteenth identification information, the eighteenth identification information, the twentieth identification information, the twenty-second identification information, the twenty-fourth identification information, and the twenty-sixth identification information. Note that the SCEF_A 46 may store the acquired identification information.

Moreover, in a case that the first network-initiated PDU session establishment procedure is under the initiative of the MME_A 40, the procedure from S2114 to S2118 may be omitted.

Through the above steps, the first network-initiated PDU session establishment procedure is completed. With the completion of the first network-initiated PDU session establishment procedure, the UE_A 10 and/or the core network_A 90 can establish the PDU session. Moreover, with the completion of the first network-initiated PDU session establishment procedure, the UE_A 10 and/or the core network_A 90 can recognize and store the type of supported Service Continuity.

Specifically, the UE_A 10 and/or the MME_A 40 and/or the SGW_A 35 and/or the PGW_A 30 and/or the SCEF_A 46 may recognize that establishment of the first single-type PDU session is supported, based on the sixteenth identification information and/or the seventeenth identification information, may recognize that establishment of the second single-type PDU session is supported, based on the eighteenth identification information and/or the nineteenth identification information, or may recognize that establishment of the third single-type PDU session is supported, based on the twentieth identification information and/or the twenty-first identification information.

Furthermore, the UE_A 10 and/or the MME_A 40 and/or the SGW_A 35 and/or the PGW_A 30 and/or the SCEF_A 46 may recognize that establishment of the first multi-type PDU session is supported, based on the twenty-second identification information and/or the twenty-third identification information, may recognize that establishment of the second multi-type PDU session is supported, based on the twenty-fourth identification information and/or the twenty-fifth identification information, or may recognize that establishment of the third multi-type PDU session is supported, based on the twenty-sixth identification information and/or the twenty-seventh identification information.

Figure 22:
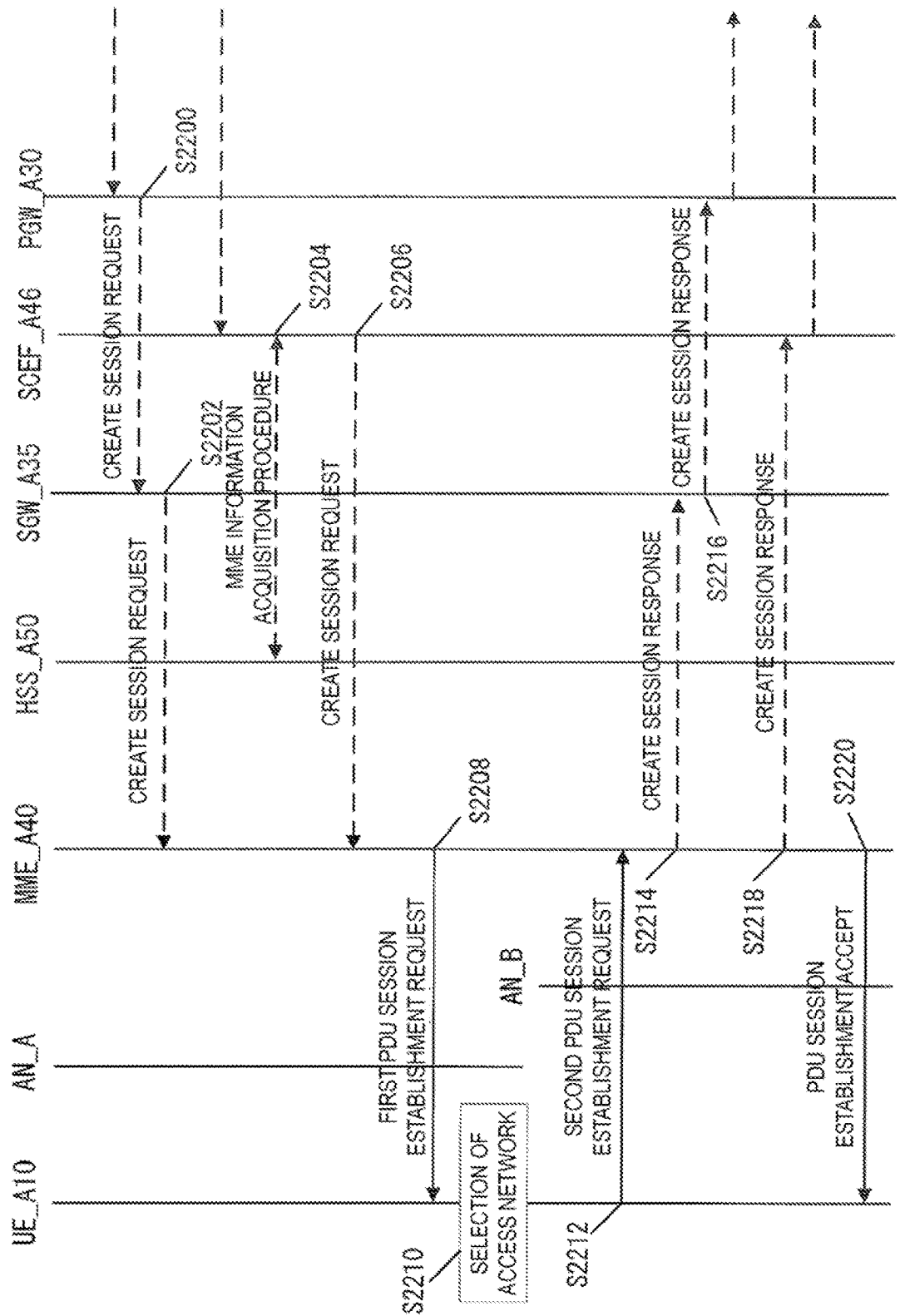
FIG. 22 is a diagram illustrating a second network-initiated PDU session establishment procedure.

1.3.2.2.2. Example of Second Network-Initiated PDU Session Establishment Procedure Next, an example of the steps of the second network-initiated PDU session establishment procedure will be described with reference to FIG. 22. The second network-initiated PDU session establishment procedure is a procedure in which the UE_A 10 selects an access network to be used for establishment of a PDU session to establish a PDU session between the UE_A 10 and the core network A 90.

The second network-initiated PDU session establishment procedure includes a PGW_A 30 initiated procedure, a SCEF_A 46 initiated procedure, and a MME_A 40 initiated procedure. Note that the procedure in S2200 to S2202 is performed in the PGW_A 30 initiated procedure, while the procedure in S2204 to S2206 is performed in the SCEF_A 46 initiated procedure. Moreover, in the MME_A 40 initiated procedure, the procedure is started from S2108 without performing the procedure in S2200 to S2206. Alternatively, the MME_A 40 may transmit a control message for creating a session under the initiative of a network to the PGW_A 30, and the PGW_A may start the PGW_A 30 initiated procedure, based on the reception of the control message transmitted from the MME_A 40. Similarly, the MME_A 40 may transmit a control message for creating a session under the initiative of a network to the SCEF_A 46, and the SCEF_A 46 may start the SCEF_A 46 initiated procedure, based on the reception of the control message transmitted from the MME_A 40. In this case, the MME_A 40 may perform a process of selecting an access network (S2108) before the transmission of the control message. Note that the MME_A 40 may transmit, in the control message, one or more pieces of identification information among the second identification information, the sixth identification information, the seventh identification information, the eighth identification information, the ninth identification information, the tenth identification information, the seventeenth identification information, the nineteenth identification information, the twenty-first identification information, the twenty-third identification information, the twenty-fifth identification information, and the twenty-seventh identification information at least.

Note that the procedure from S2200 to S2206 may be the same as the procedure from S2100 to S2106 in the first network-initiated PDU session establishment procedure. Therefore, description of the steps will be omitted.

Next, the MME_A 40 transmits a first PDU session establishment request message to the UE_A 10 (S2208). The MME_A 40 may transmit, in the first PDU session establishment request message, one or more pieces of identification information among the second identification information, the sixth identification information, the seventh identification information, the eighth identification information, the ninth identification information, the tenth identification information, the seventeenth identification information, the nineteenth identification information, the twenty-first identification information, the twenty-third identification information, the twenty-fifth identification information, and the twenty-seventh identification information at least.

The MME_A 40 and/or the core network_A 90 may indicate capability of supported Service Continuity by transmitting the first PDU session establishment request message including one or more pieces of identification information among the seventeenth identification information, the nineteenth identification information, the twenty-first identification information, the twenty-third identification information, the twenty-fifth identification information, and the twenty-seventh identification information.

The MME_A 40 and/or the core network_A 90 may request in more detail the type of PDU session to establish, by transmitting the first PDU session establishment request message including one or more pieces of identification information among the sixth identification information to the tenth identification information.

Note that the MME_A 40 may transmit the first PDU session establishment request message to an apparatus in the access network A, and the transmitted first PDU session establishment request message may be transferred to the UE_A 10 via the apparatus in the access network A. In this case, the apparatus in the access network A may transmit the first PDU session establishment request message in an RRC message. Note that the RRC message may be a direct transfer message.

Here, the access network used to transmit the first PDU session establishment request message is defined as the access network A. The access network A may be an access network selected by the MME_A 40 or may be an access network selected by another apparatus.

The UE_A 10 receives the first PDU session establishment request message transmitted from the MME_A 40 and/or the RRC message transmitted from an apparatus in the access network. Furthermore, based on the reception of the first PDU session establishment request message, the UE_A 10 acquires one or more pieces of identification information among the second identification information, the sixth identification information, the seventh identification information, the eighth identification information, the ninth identification information, the tenth identification information, the seventeenth identification information, the nineteenth identification information, the twenty-first identification information, the twenty-third identification information, the twenty-fifth identification information, and the twenty-seventh identification information. Note that the UE_A 10 may store the acquired pieces of identification information.

Based on the reception of the first PDU session establishment request message, the UE_A 10 selects an access network to be used for the PDU session to be established (S2210). Note that, for the selection of an access network, the UE_A 10 may use information received in the first PDU session establishment request message, may use information acquired from the network in the attach procedure, may use information acquired from the network outside the attach procedure, or may use information stored in the UE_A 10.

Here, the access network used in the PDU session to be established is defined as an access network B. The access network B may be the same access network as the access network A or may be an access network different from the access network A. Furthermore, the access network B may be an access network selected by the UE_A 10 or may be an access network selected by another apparatus.

In other words, based on the reception of the first PDU session establishment request message, the UE_A 10 may not necessarily select an access network to use in the PDU session to establish.

Based on the reception of the first PDU session establishment request message and/or information included in the first PDU session establishment request message, the UE_A 10 may recognize the type of supported Service Continuity or may recognize that the PDU session has been established.

More specifically, the UE_A 10 may recognize that establishment of the first single-type PDU session is supported by a network, based on the seventeenth identification information, may recognize that establishment of the second single-type PDU session is supported by a network, based on the nineteenth identification information, or may recognize that establishment of the third single-type PDU session is supported by a network, based on the twenty-first identification information.

Furthermore, the UE_A 10 may recognize that establishment of the first multi-type PDU session is supported by a network, based on the twenty-third identification information, may recognize that establishment of the second multi-type PDU session is supported by a network, based on the twenty-fifth identification information, or may recognize that establishment of the third multi-type PDU session is supported by a network, based on the twenty-seventh identification information.

The UE_A 10 may recognize in more detail the type of PDU session to be established, based on one or more pieces of identification information among the sixth identification information to the tenth identification information. For example, the UE_A 10 may recognize the IP address allocated to the UE_A 10, based on the seventh identification information.

The UE_A 10 may store one or more pieces of identification information among the sixth identification information to the fifteenth identification information in association with the PDU session to be established. In other words, the PDU session to be established may be associated with the one or more pieces of identification information among the sixth identification information to the fifteenth identification information. For example, the PDU session to be established may be associated with the IP address allocated to the UE_A 10.

Based on the reception of the PDU session establishment request message and/or the selection of an access network, the UE_A 10 transmits a second PDU session establishment request message to the MME_A 40 (S2212). The UE_A 10 may transmit, in the second PDU session establishment request message, one or more pieces of identification information among the eleventh identification information, the twelfth identification information, the thirteenth identification information, the fourteenth identification information, the fifteenth identification information, the sixteenth identification information, the eighteenth identification information, the twentieth identification information, the twenty-second identification information, the twenty-fourth identification information, and the twenty-sixth identification information at least.

Note that the UE_A 10 may transmit the second PDU session establishment request message to an apparatus in the access network B, and the transmitted second PDU session establishment request message may be transferred to the MME_A 40 via the apparatus in the access network B. In this case, the UE_A 10 may transmit the second PDU session establishment request message in an RRC message.

Furthermore, the UE_A 10 may transmit, or may not necessarily transmit, a response message to the first PDU session establishment request message to the MME_A 40, separately from the second PDU establishment request message. The MME_A 40 may receive, or may not necessarily transmit, the response message to the first PDU session establishment request message transmitted from the UE_A 10. Note that the UE_A 10 may transmit the response message to the first PDU session establishment request message to an apparatus in the access network A, and the transmitted response message to the first PDU session establishment request message may be transferred to the MME_A 40 via the apparatus in the access network A.

The MME_A 40 receives the second PDU session establishment request message transmitted from the UE_A 10. Furthermore, based on the reception of the second PDU session establishment request message, the MME_A 40 acquires one or more pieces of identification information among the eleventh identification information, the twelfth identification information, the thirteenth identification information, the fourteenth identification information, the fifteenth identification information, the sixteenth identification information, the eighteenth identification information, the twentieth identification information, the twenty-second identification information, the twenty-fourth identification information, and the twenty-sixth identification information.

Note that the MME_A 40 may store the acquired identification information.

Based on the reception of the second PDU session establishment request message and/or information included in the second PDU session establishment request message, the MME_A 40 may recognize the type of supported Service Continuity or may recognize that the PDU session has been established.

More specifically, the MME_A 40 may recognize that establishment of the first single-type PDU session is supported by the UE_A 10, based on the sixteenth identification information, may recognize that establishment of the second single-type PDU session is supported by the UE_A 10, based on the eighteenth identification information, or may recognize that establishment of the third single-type PDU session is supported by the UE_A 10, based on the twentieth identification information.

Furthermore, the MME_A 40 may recognize that establishment of the first multi-type PDU session is supported by the UE_A 10, based on the twenty-second identification information, may recognize that establishment of the second multi-type PDU session is supported by the UE_A 10, based on the twenty-fourth identification information, or may recognize that establishment of the third multi-type PDU session is supported by the UE_A 10, based on the twenty-sixth identification information.

The MME_A 40 may recognize in more detail the type of PDU session to be established, based on one or more pieces of identification information among the eleventh identification information to the fifteenth identification information. For example, the MME_A 40 may recognize the IP address allocated to the UE_A 10, based on the twelfth identification information.

The MME_A 40 may store one or more pieces of identification information among the sixth identification information to the fifteenth identification information in association with the PDU session to be established. In other words, the PDU session to be established may be associated with the one or more pieces of identification information among the sixth identification information to the fifteenth identification information. For example, the PDU session to be established may be associated with the IP address allocated to the UE_A 10.

Next, based on the reception of the second PDU session establishment request message, the MME_A 40 transmits a create session response message.

In a case that the second network-initiated PDU session establishment procedure is under the initiative of the PGW_A 30, the procedure from S2214 to S2216 is performed; in a case that the second network-initiated PDU session establishment procedure is a SCEF_A 46 initiated procedure, the procedure to S2218 is performed.

Note that the procedure from S2214 to S2218 may be the same as the procedure from S2114 to S2118 in the first network-initiated PDU session establishment procedure.

Therefore, description of the steps will be omitted.

Based on the reception of the second PDU session establishment request message and/or the transmission of the create session response message, the MME_A 40 transmits a PDU session establishment accept message to the UE_A 10 (S2220).

Note that the MME_A 40 may transmit the PDU session establishment accept message to an apparatus in the access network B, and the transmitted PDU session establishment accept message may be transferred to the UE_A 10 via the apparatus in the access network B. In this case, the apparatus in the access network B may transmit the PDU session establishment accept message in an RRC message.

The UE_A 10 receives the PDU session establishment accept message transmitted from the MME_A 40 and/or the RRC message transmitted from the apparatus in the access network.

The UE_A 10 may transmit a PDU session establishment complete message to the MME_A 40, based on the reception of the PDU session establishment accept message, or may transmit an RRC message to an apparatus in the access network B, based on the reception of the RRC message.

Through the above steps, the second network-initiated PDU session establishment procedure is completed. With the completion of the second network-initiated PDU session establishment procedure, the UE_A 10 and/or the core network_A 90 can establish the PDU session. Moreover, with the completion of the second network-initiated PDU session establishment procedure, the UE_A 10 and/or the core network_A 90 can recognize and store the type of supported Service Continuity.

Specifically, the UE_A 10 and/or the MME_A 40 and/or the SGW_A 35 and/or the PGW_A 30 and/or the SCEF_A 46 may recognize that establishment of the first single-type PDU session is supported, based on the sixteenth identification information and/or the seventeenth identification information, may recognize that establishment of the second single-type PDU session is supported, based on the eighteenth identification information and/or the nineteenth identification information, or may recognize that establishment of the third single-type PDU session is supported, based on the twentieth identification information and/or the twenty-first identification information.

Furthermore, the UE_A 10 and/or the MME_A 40 and/or the SGW_A 35 and/or the PGW_A 30 and/or the SCEF_A 46 may recognize that establishment of the first multi-type PDU session is supported, based on the twenty-second identification information and/or the twenty-third identification information, may recognize that establishment of the second multi-type PDU session is supported, based on the twenty-fourth identification information and/or the twenty-fifth identification information, or may recognize that establishment of the third multi-type PDU session is supported, based on the twenty-sixth identification information and/or the twenty-seventh identification information.

1.3.3. Example of Flow Switching Procedure Next, an example of a flow switching procedure will be described.

The flow switching procedure is a procedure in which the UE_A 10 and/or the core network_A 90 switches a PDU session to be used for transmission and/or reception of user data. The UE_A 10 and/or the MME_A 40 and/or the SGW_A 35 and/or the PGW_A 30 and/or the SCEF_A 46 can switch a PDU session to be used for transmission and/or reception of user data, through the flow switching procedure.

Note that the granularity of user data for switching a PDU session may be a unit of packet, a unit of flow, or a unit of application. The granularity of user data for switching a PDU session is not limited to these. The flow switching procedure may be performed at any timing as long as being performed after multiple PDU sessions are established.

The flow switching procedure includes a UE-initiated flow switching procedure, which is started under the initiative of the UE_A 10, and a network-initiated flow switching procedure.

1.3.3.1. Example of UE-initiated Flow Switching Procedure

Next, an example of the steps of the UE-initiated flow switching procedure will be described. The UE-initiated flow switching procedure is a procedure for switching a PDU session to be used for transmission and/or reception of user data, under the initiative of the UE.

Figure 23:
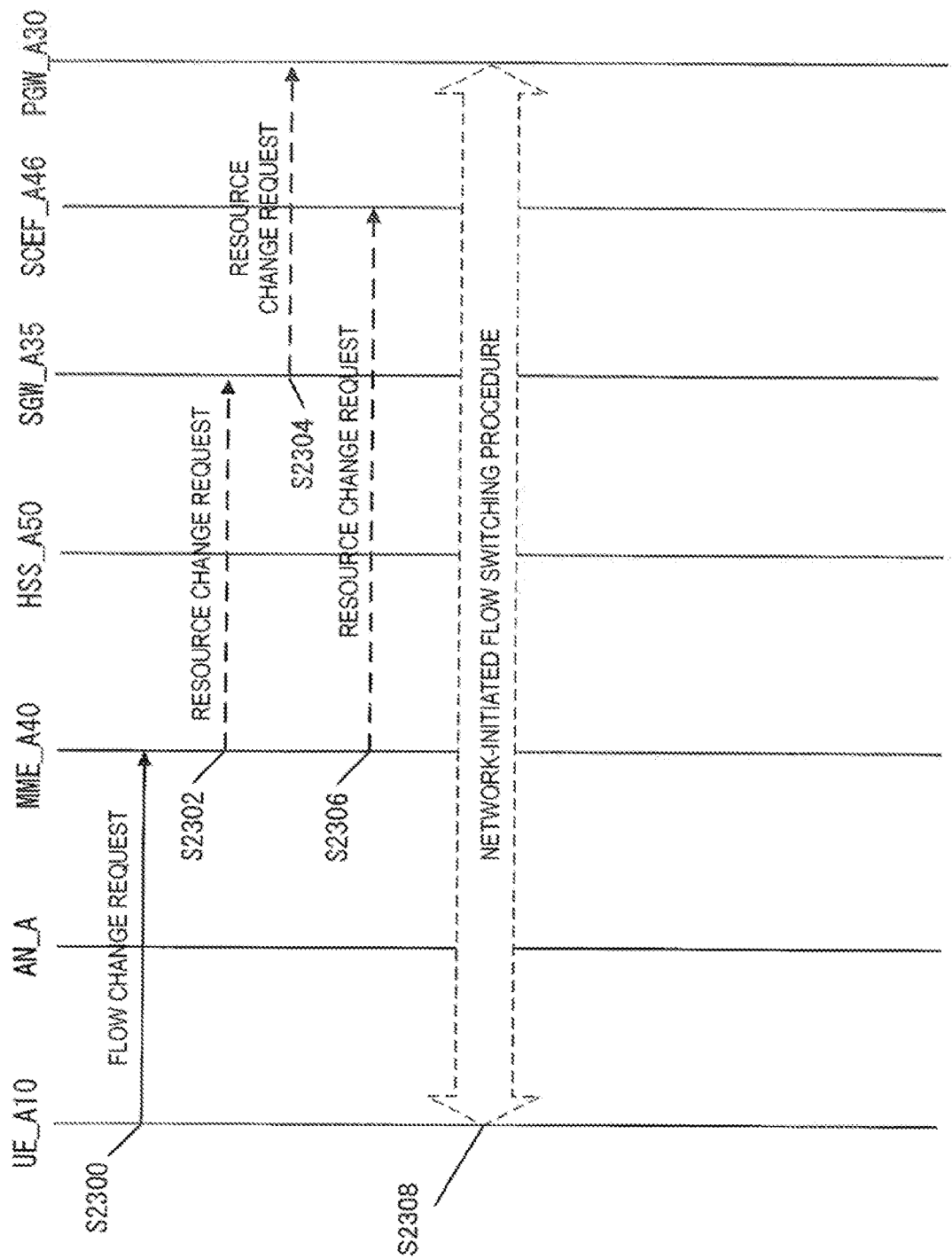
FIG. 23 is a diagram illustrating a UE-initiated flow switching procedure.

The example of the steps of the UE-initiated flow switching procedure will be described with reference to FIG. 23.

The UE_A 10 transmits a flow change request message to the MME_A 40 via the selected access network (S2300). Note that the UE_A 10 may transmit the flow change request message to an apparatus in the access network, and the transmitted flow change request message may be transferred to the MME_A 40 via the apparatus in the selected access network. The UE_A 10 may transmit the forty-fourth identification information in the flow change request message.

The MME_A 40 receives the flow change request message transmitted from the UE_A 10. Furthermore, the MME_A 40 may acquire the forty-fourth identification information, based on the reception of the flow change request message. Note that the MME_A 40 may store the acquired identification information.

The MME_A 40 may identify the switching source PDU session or may identify the switching destination PDU session, based on the reception of the flow change message and/or the forty-fourth identification information.

The MME_A 40 transmits a resource change request message to the apparatus, with which the switching source and/or switching destination PDU session is established, based on the reception of the flow change message and/or the forty-fourth identification information.

Specifically, in a case that the apparatus with which the switching source and/or switching destination PDU session is established is the SGW_A 35 and/or the PGW_A 30, the MME_A 40 transmits the resource change request message to the SGW_A 35 (S2302). Moreover, in a case that the apparatus with which the switching source and/or switching destination PDU session is established is the SCEF_A 46, the MME_A 40 transmits the resource change request message to the SCEF_A 46 (S2306). Note that MME_A 40 may transmit at least the forty-fourth identification information and/or the forty-fifth identification information in the resource change request message.

The SGW_A 35 and/or the SCEF_A 46 receives the resource change request message transmitted from the MME_A 40. Furthermore, the SGW_A 35 and/or the SCEF_A 46 may acquire the forty-fourth identification information and/or the forty-fifth identification information, based on the reception of the resource change request message. Note that the SGW_A 35 and/or the SCEF_A 46 may store the acquired identification information.

Note that, in a case that the SGW_A 35 has received the resource change request message, the SGW_A 35 transmits the resource change request message to the PGW_A 30 (S2306). Note that SGW_A 35 may transmit at least the forty-fourth identification information and/or the forty-fifth identification information in the resource change request message.

The PGW_A 30 receives the resource change request message transmitted from the SGW_A 35. Furthermore, the PGW_A 30 may acquire the forty-fourth identification information and/or the forty-fifth identification information, based on the reception of the resource change request message. Note that the PGW_A 30 may store the acquired identification information.

The PGW_A 30 and/or the SCEF_A 46 performs a network-initiated flow switching procedure that will be described later, based on the reception of the resource change request message (S2308). Specifically, the PGW_A 30 may perform the network-initiated flow switching procedure under the initiative of the PGW_A 30 in a case that the PGW_A 30 has received the resource change request message, and the SCEF_A 46 may perform the network-initiated flow switching procedure under the initiative of the SCEF_A 46 in a case that the SCEF_A 46 has received the resource change request message.

In a case that the network-initiated flow switching procedure is performed in the UE-initiated session establishment procedure, the session modification request message may be a response message to the resource change request message, and the PDU session modification request message may be a flow change request message. Moreover, the forty-sixth identification information included in the session modification request message and/or the PDU session modification request message may be the forty-fifth identification information.

Through the above steps, the UE-initiated flow switching procedure is completed. With the completion of the UE-initiated flow switching procedure, the UE_A 10 and/or the core network A 90 can switch a PDU session to be used for transmission and/or reception of user data.

Specifically, the UE_A 10 and/or the MME_A 40 and/or the SGW_A 35 and/or the PGW_A 30 and/or the SCEF_A 46 may identify the switching source and/or switching destination PDU session, may switch a PDU session to be used for transmission and/or reception of user data, or may recognize that a PDU session to be used for transmission and/or reception of user data has been switched, based on the forty-fourth identification information and/or the forty-fifth identification information.

Furthermore, the UE_A 10 and/or the MME_A 40 and/or the SGW_A 35 and/or the PGW_A 30 and/or the SCEF_A 46 may maintain, instead of releasing, the switching source PDU session, based on the forty-fourth identification information and/or the forty-fifth identification information.

1.3.3.2. Example of Network-Initiated Flow Switching Procedure

Next, an example of steps of the network-initiated flow switching procedure will be described. The network-initiated flow switching procedure is a procedure for switching a PDU session to be used for transmission and/or reception of user data under the initiative of the PGW_A 30 and/or the SCEF_A 46.

Figure 24:
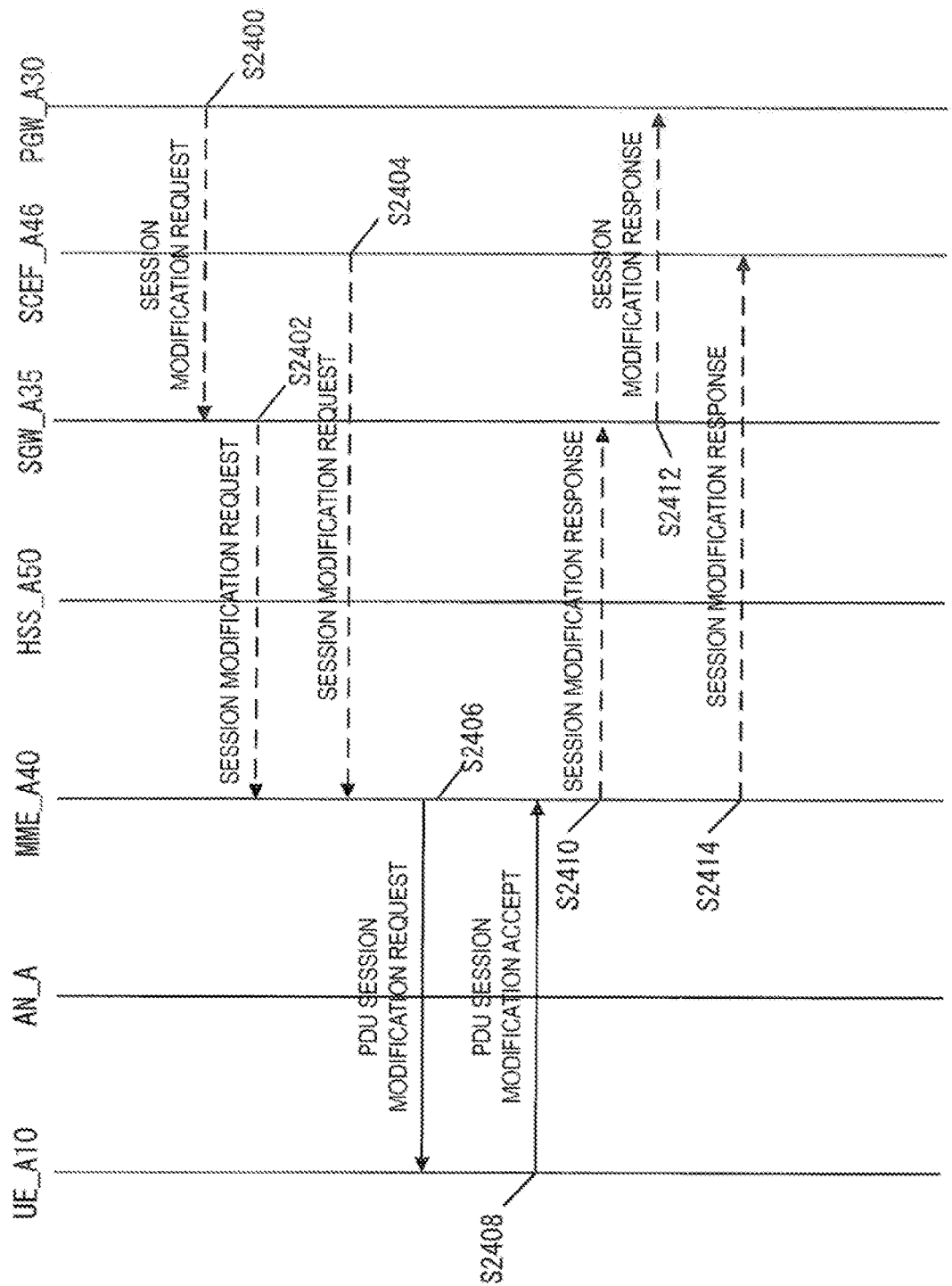
FIG. 24 is a diagram illustrating a network-initiated flow switching procedure.

The example of the steps of the network-initiated flow switching procedure will be described with reference to FIG. 24.

The network-initiated flow switching procedure includes a PGW_A 30 initiated procedure and a SCEF_A 46 initiated procedure. Note that the procedure in S2400 to S2402 is performed in the PGW_A 30 initiated procedure, while the procedure of S2404 is performed in the SCEF_A 46 initiated procedure. Alternatively, in the MME_A 40 initiated procedure, the MME_A 40 may transmit a control message for switching the flow under the initiative of a network to the PGW_A 30, and the PGW_A may start the PGW_A 30 initiated procedure, based on the reception of the control message transmitted from the MME_A 40. Similarly, the MME_A 40 may transmit a control message for switching the flow under the initiative of a network to the SCEF_A 46, and the SCEF_A 46 may start the SCEF_A 46 initiated procedure, based on the reception of the control message transmitted from the MME_A 40. Note that the MME_A 40 may transmit at least the forty-sixth identification information in the control message.

First, a description will be given of the steps of the procedure from S2400 to S2404.

In a case of the PGW_A 30 initiated procedure, the PGW_A 30 transmits a session modification request message to the SGW_A 35 (S2400). The PGW_A 30 may transmit at least the forty-sixth identification information in the session modification request message.

The SGW_A 35 receives the session modification request message transmitted from the PGW_A 30. Furthermore, the SGW_A 35 acquires the forty-sixth identification information, based on the reception of the session modification request message. Note that the SGW_A 35 may store the acquired identification information.

The SGW_A 35 transmits the session modification request message to the MME_A 40 (S2402). The SGW_A 35 may transmit at least the forty-sixth identification information in the session modification request message.

The MME_A 40 receives the session modification request message transmitted from the SGW_A 35. Furthermore, the MME_A 40 acquires the forty-sixth identification information, based on the reception of the session modification request message. Note that the MME_A 40 may store the acquired identification information.

Next, in a case of the SCEF_A 46 initiated procedure, the CEF_A 46 transmits a session modification request message to the SGW_A 35 (S2404). The PGW_A 30 may transmit at least the forty-sixth identification information in the session modification request message.

The MME_A 40 receives the session modification request message transmitted from the SCEF_A 46. Furthermore, the MME_A 40 acquires the forty-sixth identification information, based on the reception of the session modification request message. Note that the MME_A 40 may store the acquired identification information.

Through the above steps, the procedure from S2400 to S2404 ends.

Next, the MME_A 40 transmits a PDU session modification request message to the UE_A 10, based on the reception of the session modification request message (S2406). The MME_A 40 may transmit at least the forty-sixth identification information in the PDU session modification request message.

Note that the MME_A 40 may transmit the PDU session modification request message to an apparatus in the access network, and the transmitted PDU session modification request message may be transferred to the UE_A 10 via the apparatus in the access network. In this case, the apparatus in the access network may transmit the PDU session modification request message in an RRC message. Note that the RRC message may be an RRC connection reconfiguration request message or a direct transfer message.

The UE_A 10 receives the PDU session modification request message transmitted from the MME_A 40 and/or the RRC message transmitted from the apparatus in the access network. Furthermore, the UE_A 10 acquires the forty-sixth identification information, based on the reception of the PDU session modification request message. Note that the UE_A 10 may store the acquired pieces of identification information.

The UE_A 10 may identify the switching source PDU session or may identify the switching destination PDU session, based on the reception of the PDU session modification request message and/or the forty-sixth identification information.

Based on the reception of the PDU session modification request message, the UE_A 10 transmits a PDU session modification accept message to the MME_A 40 (S2408). The UE_A 10 may transmit at least the forty-seventh identification information in the PDU session modification accept message.

Note that the UE_A 10 may transmit the PDU session modification accept message to an apparatus in the access network, and the transmitted PDU session modification accept message may be transferred to the MME_A 40 via the apparatus in the access network. In this case, the UE_A 10 may transmit the PDU session modification accept message in an RRC message. Note that the RRC message may be a direct transfer message.

Based on the reception of the RRC message, the UE_A 10 may transmit an RRC message to an apparatus in the access network, separately from transmission of the PDU session modification accept message. In this case, the RRC message may be an RRC connection reconfiguration complete message.

The MME_A 40 receives the PDU session modification accept message transmitted from the UE_A 10. Furthermore, the MME_A 40 acquires the forty-seventh identification information, based on the reception of the PDU session modification accept message. Note that the MME_A 40 may store the acquired identification information.

The MME_A 40 may recognize that the switching of the PDU session to be used for transmission and/or reception of user data is allowed, based on the reception of the PDU session modification accept message and/or the forty-seventh identification information. The MME_A 40 may identify the switching source PDU session or may identify the switching destination PDU session, based on the forty-seventh identification information.

Next, based on the reception of the PDU session modification accept message, the MME_A 40 transmits a session modification response message.

In a case that the network-initiated flow switching procedure is under the initiative of the PGW_A 30, the MME_A 40 transmits the session modification response message to the SGW_A 35, based on the reception of the PDU session modification accept message (S2410). The MME_A 40 may transmit at least the forty-seventh identification information in the session modification response message.

The SGW_A 35 receives the session modification response message transmitted from the MME_A 40. Furthermore, the SGW_A 35 acquires the forty-seventh identification information, based on the reception of the session modification response message. Note that the SGW_A 35 may store the acquired identification information.

Based on the reception of the session modification response message, the SGW_A 35 transmits the session modification response message to the PGW_A 30 (S2412). The SGW_A 35 may transmit at least the forty-seventh identification information in the session modification response message.

The PGW_A 30 receives the session modification response message transmitted from the SGW_A 35. Furthermore, the PGW_A 30 acquires the forty-seventh identification information, based on the reception of the session modification response message. Note that the PGW_A 30 may store the acquired identification information.

In a case that the network-initiated flow switching procedure is under the initiative of the SCEF_A 46, the MME_A 40 transmits the session modification response message to the SCEF_A 46, based on the reception of the PDU session modification accept message. (S2414). The MME_A 40 may transmit at least the forty-seventh identification information in the session modification response message.

The SCEF_A 46 receives the session modification response message transmitted from the MME_A 40. Furthermore, the SCEF_A 46 acquires the forty-seventh identification information, based on the reception of the session modification response message. Note that the SCEF_A 46 may store the acquired identification information.

Through the above steps, the network-initiated flow switching procedure is completed. With the completion of the network-initiated flow switching procedure, the UE_A 10 and/or the core network A 90 can switch a PDU session to be used for transmission and/or reception of user data.

Specifically, the UE_A 10 and/or the MME_A 40 and/or the SGW_A 35 and/or the PGW_A 30 and/or the SCEF_A 46 may identify the switching source and/or switching destination PDU session, may switch a PDU session to be used for transmission and/or reception of user data, or may recognize that a PDU session to be used for transmission and/or reception of user data has been switched, based on the forty-sixth identification information and/or the forty-seventh identification information.

Furthermore, the UE_A 10 and/or the MME_A 40 and/or the SGW_A 35 and/or the PGW_A 30 and/or the SCEF_A 46 may maintain, instead of releasing, the switching source PDU session, based on the forty-sixth identification information and/or the forty-seventh identification information.
1.3.3. Modified Example of the Present Embodiment Each of the apparatuses in the present embodiment may be an apparatus different from the corresponding apparatus described above.

For example, the MME_A 40 is an apparatus playing a role in mobility management of each apparatus such as the UE_A 10 and/or session management between apparatuses. However, in the core network_A 90 in the present embodiment, the role for mobility management and the role for session management may be played by different apparatuses.

Specifically, a Session Management Entity (SME) may perform a function of session management in the MME_A 40. In this case, the MME_A 40 in the present embodiment may be replaced with a Session Management Entity (SME). Furthermore, each message transmitted from and/or received by the MME_A 40 described in the communication procedure in the present embodiment may be transmitted from and/or received by the SME, and each process performed by the MME_A 40 may be performed by the SME.

2. Modified Example

A program running on an apparatus according to the present invention may serve as a program that controls a Central Processing Unit (CPU) and the like to cause a computer to operate in such a manner as to realize the functions of the embodiments according to the present invention. Programs or the information handled by the programs are temporarily stored into a volatile memory, such as a Random Access Memory (RAM), or stored in a non-volatile memory, such as a flash memory, a Hard Disk Drive (HDD), or another storage device system.

Note that programs for implementing the functions of the embodiments relating to the present invention may be recorded on a computer-readable recording medium. This configuration may be realized by causing a computer system to read the program recorded on this recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically holding a program for a short time period, or another computer-readable recording medium.

Furthermore, each functional block or various characteristics of the apparatuses used in the above-described embodiments may be implemented or performed on an electric circuit, that is, an integrated circuit or multiple integrated circuits, for example. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine. The above-mentioned electric circuits may be constituted of a digital circuit, or may be constituted of an analog circuit. Furthermore, in a case that with advances in semiconductor technology, a circuit integration technology appears that replaces the present integrated circuits, it is also possible for the present invention to use a new integrated circuit based on the technology.

Note that the invention of the present patent application is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention.

Furthermore, a configuration in which a constituent element that achieves the same effect is substituted for the one that is described in the embodiments is also included in the technical scope of the present invention.

REFERENCE SIGNS LIST

1 Communication system
5 PDN_A

10 UE_A
20 UTRAN_A
22 eNB (UTRAN)_A
24 RNC_A
25 GERAN_A
26 BSS_A
30 PGW_A
35 SGW_A
40 MME_A
45 eNB_A
46 SCEF_A
50 HSS_A
55 AAA_A
60 PCRF_A
65 ePDG_A
70 WLAN ANa
72 WLAN APa
74 TWAG_A
75 WLAN ANb
76 WLAN APb
80 LTE AN_A
90 Core network_A
120 5G RAN
122 5GBS_A
125 WLAN ANc
126 WAG_A

The invention claimed is:

1. A User Equipment (UE) comprising: transmission and reception circuitry, wherein in a first procedure for releasing a first existing Protocol Data Unit (PDU) session after a second PDU session has been established, the transmission and reception circuitry is configured for transmitting, to a core network, a message including a first identification information indicating a data network, a second identification information indicating the first existing PDU session, and a third identification information indicating the second PDU session, and the message is transmitted for establishing the second PDU session in the first procedure;
wherein the first identification information, the second identification information and the third identification information are included by the UE as a part of the message in respective different fields of the message.

2. The UE according to claim 1, wherein the transmission and reception circuitry is further configured for receiving the second identification information from the core network in the first procedure.

3. The UE according to claim 1, wherein the transmission and reception circuitry is able to switch a flow from the first PDU session to the second PDU session after the second PDU session has been established.

4. The UE according to claim 1, wherein the first identification information is the same as an identification information indicating a data network that the UE transmitted for establishing the first PDU session.

5. The UE according to claim 1, wherein the first identification information is equivalent to an Access Point Name (APN).

6. A communication control method performed by a User Equipment (UE), the communication control method comprising: in a first procedure for releasing a first existing Protocol Data Unit (PDU) session after a second PDU session has been established, transmitting, to a core network, a message including a first identification information indicating a data network, a second identification information indicating the first existing PDU session, and a third identification information indicating the second PDU session, wherein the message is transmitted for establishing the second PDU session in the first procedure;
wherein the first identification information, the second identification information and the third identification information are included by the UE as a part of the message in respective different fields of the message.

7. The communication control method performed by the UE according to claim 6, the communication control method further comprising: receiving the second identification information from the core network in the first procedure.

8. The communication control method performed by the UE according to claim 6, wherein the UE is able to switch a flow from the first PDU session to the second PDU session after the second PDU session has been established.

9. The communication control method performed by the UE according to claim 6, wherein the first identification information is the same as an identification information indicating a data network that the UE transmitted for establishing the first PDU session.

10. The communication control method performed by the UE according to claim 6, wherein the first identification information is equivalent to an Access Point Name (APN).

11. The UE according to claim 1, wherein the transmission and reception circuitry is able to perform transmitting and receiving user data by using the second PDU session after the second PDU session is established.

12. The communication control method according to claim 6, wherein the UE is able to perform transmitting and receiving user data by using the second PDU session after the second PDU session is established.

* * * * *